United States Patent [19]

Matoba et al.

[11] Patent Number: 5,479,343
[45] Date of Patent: Dec. 26, 1995

[54] PRODUCTION PLANNING SYSTEM

[75] Inventors: Hideaki Matoba, Ebina; Mitsuhiro Enomoto, Fujisawa; Masahiro Watanabe, Kawasaki; Takahiro Tsukishima, Yokohama, all of Japan

[73] Assignee: Hitachi, Ltd., Tokyo, Japan

[21] Appl. No.: 59,227

[22] Filed: May 10, 1993

Related U.S. Application Data

[63] Continuation-in-part of Ser. No. 796,850, Nov. 25, 1991, Pat. No. 5,231,567.

[30] Foreign Application Priority Data

| Nov. 28, 1990 | [JP] | Japan | 2-322305 |
| Jul. 7, 1992 | [JP] | Japan | 4-179852 |
| Jul. 8, 1992 | [JP] | Japan | 4-180787 |
| Dec. 8, 1992 | [JP] | Japan | 4-328186 |

[51] Int. Cl.$^6$ .................................................. G06F 19/00
[52] U.S. Cl. .................................................. 364/401
[58] Field of Search .................................. 364/401, 403, 364/468, 478

[56] References Cited

U.S. PATENT DOCUMENTS

| 4,459,663 | 6/1984 | Dye | 364/468 |
| 5,101,352 | 3/1992 | Rembert | 364/401 |
| 5,193,065 | 3/1993 | Guerindon et al. | 364/468 |
| 5,285,392 | 2/1994 | Kyle et al. | 364/408 |
| 5,369,570 | 11/1994 | Parad | 364/401 |

FOREIGN PATENT DOCUMENTS

| 63-306861 | 12/1988 | Japan |
| 1-166251 | 6/1989 | Japan |
| 2-185351 | 7/1990 | Japan |
| 2-311250 | 12/1990 | Japan |

OTHER PUBLICATIONS

"Parallel Distributed Processing", Remelhart D. E. et al., MIT Press, 1986.

Primary Examiner—Donald E. McElheny, Jr.
Attorney, Agent, or Firm—Fay, Sharpe, Beall, Fagan, Minnich & McKee

[57] ABSTRACT

In a production planning system, the explosion of a product to parts is performed by a specification check device and a design passage judgement device. An MRP calculation control device, a leadtime forecasting device, an MRP explosion calculation device, a work load calculation device and a data input/output device cooperate to estimate a shop load and to calculate a leadtime with a work load and a production capacity taken into consideration, thereby drawing up a production plan. A problem area analysis device analyzes a problematical area in the production plan to display it by graphics of the data input/output device. Various adjustment devices carry out the adjustment of the production plan through a graphic interface.

29 Claims, 59 Drawing Sheets

FIG.22

| PROCESS | PRODUCTION LINE (SHOP) | SHOP GROUP |
|---|---|---|
| FINAL PROCESS ASSEMBLING | ASSEMBLING LINE 1, ASSEMBLING LINE 2, ASSEMBLING LINE 3 | Shop Gr.1 |
| RT ASSEMBLING | PARTS ASSEMBLING LINE 1, PARTS ASSEMBLING LINE 2 | Shop Gr.2 Shop Gr.3 |
| RC WORKING SH WORKING | RC WORKING LINE 1, RC WORKING LINE 2 SH WORKING LINE 1, SH WORKING LINE 2 SH WORKING LINE 3 | Shop Gr.4 |
| HG ASSEMBLING | PARTS ASSEMBLING LINE 3, PARTS ASSEMBLING LINE 4 | Shop Gr.5 |
| HC WORKING CS WORKING EB WORKING | HC WORKING LINE 1, HC WORKING LINE 2 CS WORKING LINE 1, CS WORKING LINE 2 EB WORKING LINE 1 (SUPPLIER: A COMPANY) | Shop Gr.6 Shop Gr.7 OUTSIDE PARTS |

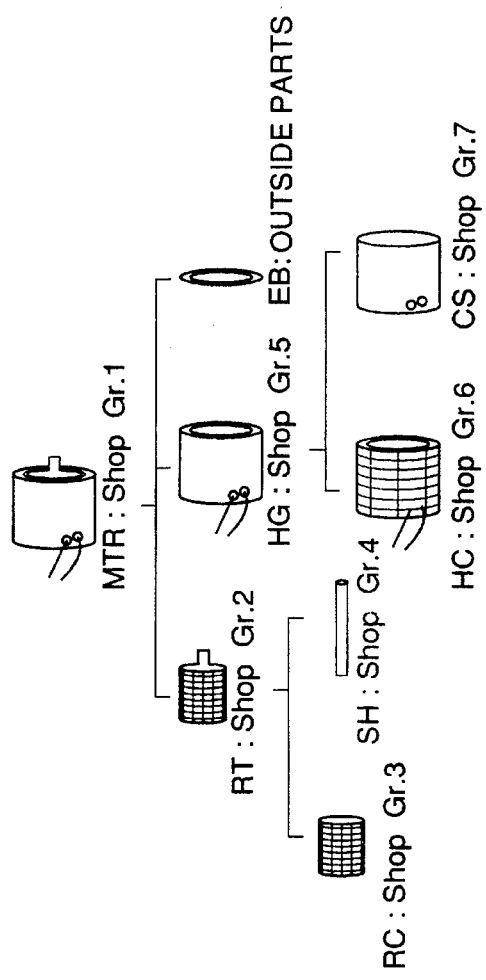

PARTS CONSTRUCTION DIAGRAM AND PARENT/CHILD RELATIONSHIP BETWEEN SHOP GROUPS

FIG. 23

LIST OF ALTERNATIVE SHOPS BY ITEMS

| ITEM / SHOP | SHa | SHb | SHc |
|---|---|---|---|
| shop 8 | PRODUCIBLE | ✕ | PRODUCIBLE |
| shop 9 | ✕ | PRODUCIBLE | PRODUCIBLE |
| shop 10 | PRODUCIBLE | PRODUCIBLE | ✕ |

FIG. 24
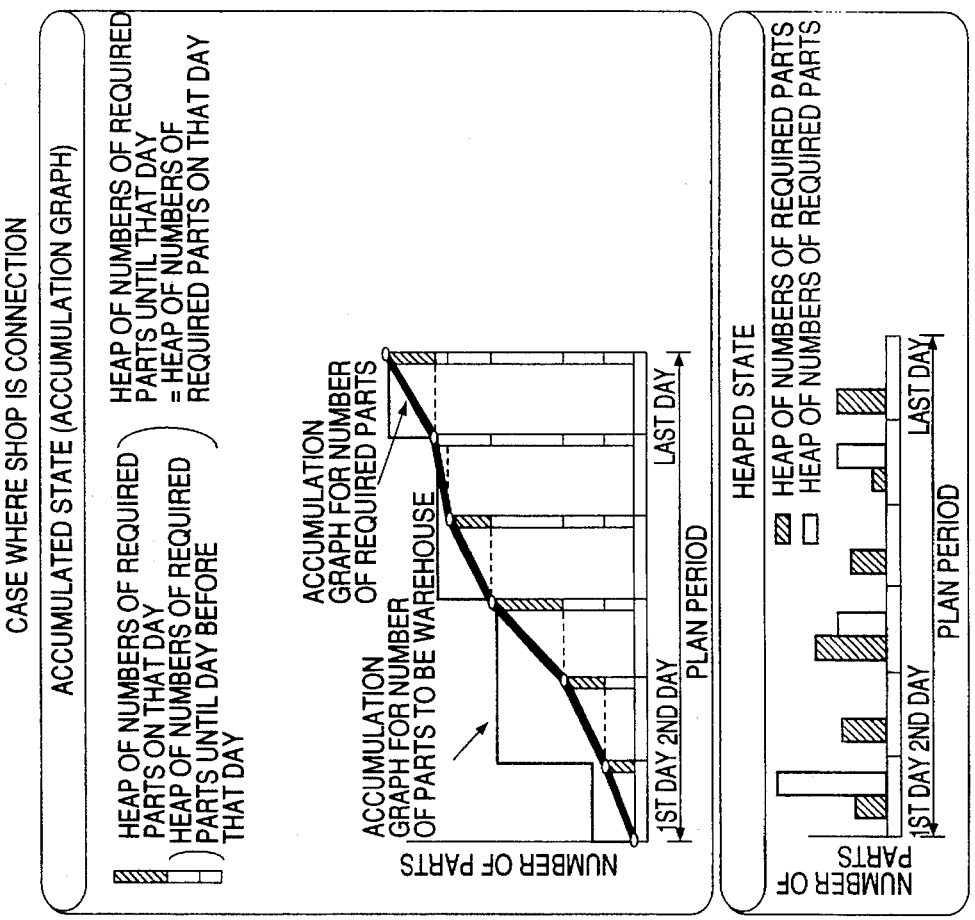
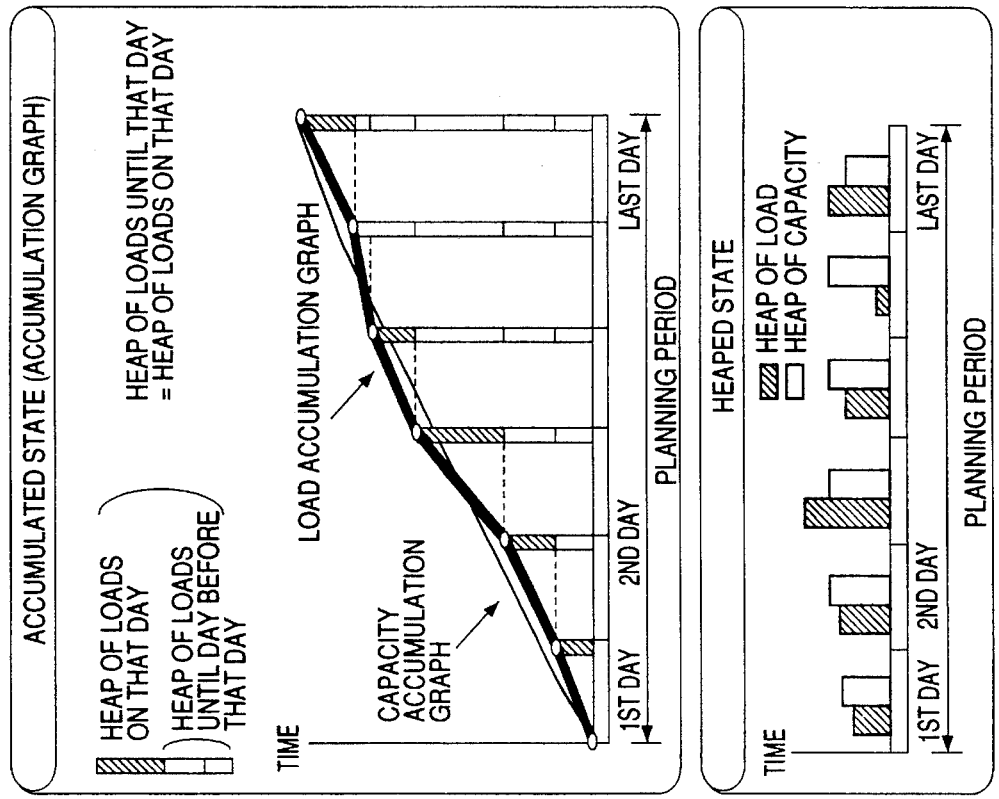
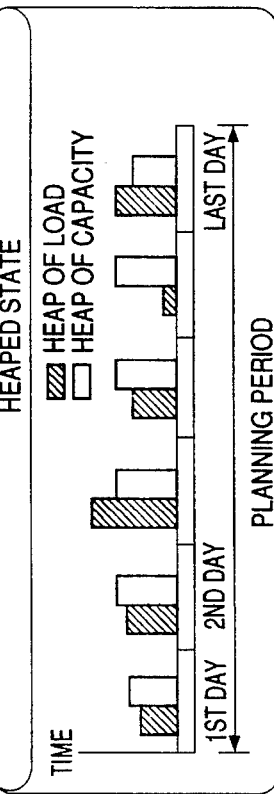

FIG.37

MPS RECORD

| | | |
|---|---|---|
| 1 | ORDER NO. | 12023 |
| | EQUIPMENT TYPE CODE | A·550 |
| | COMPLETION DATE | 920723 |
| | PRODUCTION LOAD | 150 |
| | PRIORITY | 70 |
| 2 | ORDER NO. | 12024 |
| | EQUIPMENT TYPE CODE | B·250 |
| | COMPLETION DATE | 920523 |
| | PRODUCTION LOAD | 100 |
| | PRIORITY | 80 |

← MPS RECORD NO.

MRP RECORD

| | | |
|---|---|---|
| 1 | ORDER NO. | 12023 |
| | ITEM CODE | RT·550 |
| | SHOP | shop4 |
| | PROCESS COMPLETION DATE | 920719 |
| | STARTING DATE | 920718 |
| | PRODUCTION LOAD | 150 |
| | PARENT PARTS MRP NO. | 10 |
| | CHILD PARTS MRP NO. | 25 |
| | BROTHER PARTS MRP NO. | 15 |
| | PRIORITY | 70 |
| 2 | | |

← MRP RECORD NO.

CAPACITY CONSTRAINT RECORD

SHOP 1, PERIOD:

| BY-DAY CAPACITY | UPPER LIMIT | LOWER LIMIT |
|---|---|---|
| 5/21 | 10 | 8 |
| 5/22 | 10 | 8 |
| 5/23 | 8 | 8 |
| ⋮ | | |
| 6/20 | 10 | 8 |

| UPPER LIMIT OF TOTAL CAPACITY IN PERIOD | 250 |
|---|---|
| LOWER LIMIT OF TOTAL CAPACITY IN PERIOD | 180 |

SHOP 2

CONSTRAINT CONDITION DATA

SHOP PRODUCTION PLAN RECORD

SHOP 1, PERIOD:

| | CAPACITY | LOAD(MRP No.) | | |
|---|---|---|---|---|
| 5/21 | 8 | 3 | 7 | ----- |
| 5/22 | 10 | 6 | 8 | ----- |
| 5/23 | 8 | 12 | 18 | ----- | 10 |
| ⋮ | | | ⋮ | |
| 6/20 | 10 | 552 | 589 | ----- |

SHOP 2

PRODUCTION PLAN DATA

FIG.38
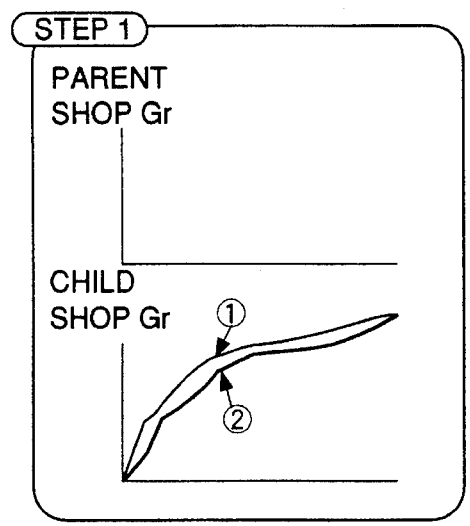
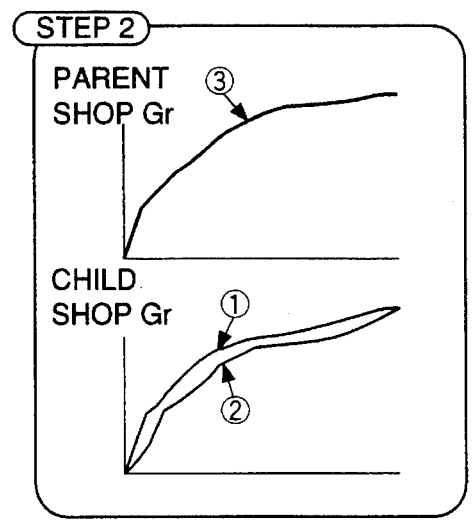
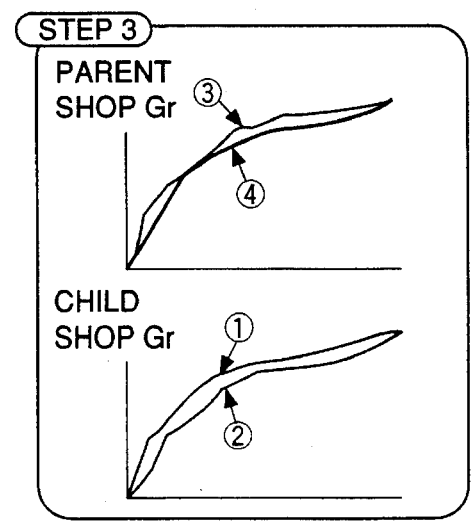

FIG. 44

ACCUMULATION GRAPH DATA

| SHOP GROUP | SHOP | | PERIOD | 5/21 | 5/22 | 5/23 | ... | 6/20 |
|---|---|---|---|---|---|---|---|---|
| 1 | 1 | | BY-DAY UPPER LIMIT CAPACITY ADDITION ACCUMULATION | 10 | 20 | 30 | ... | 230 |
| | | | EARLIEST CAPACITY ACCUMULATION | 10 | 20 | 30 | ... | 230 |
| | | | LATEST LOAD ACCUMULATION | 5 | 8 | 16 | ... | 225 |
| | 50 | | BY-DAY UPPER LIMIT CAPACITY ADDITION ACCUMULATION | | | | ... | |
| | | | EARLIEST CAPACITY ACCUMULATION | | | | ... | |
| | | | LATEST LOAD ACCUMULATION | | | | ... | |
| 2 | 1 | | EARLIEST CAPACITY ACCUMULATION | 35 | 60 | 95 | ... | 750 |
| | | | ORIGINAL SHOP GROUP | 3 | 3 | 6 | ... | 1 |
| | | | LATEST LOAD ACCUMULATION | 10 | 23 | 48 | ... | 742 |
| | 2 | | ...... | | | | ... | |

OVERLOAD DATA

LIST OF OVERLOAD AMOUNTS BY PROBLEM AREA ANALYSIS

| GENERATION OF OVERLOAD (GENERATION OF OVERLOAD IN SHOP/SHOP GROUP) | | SHOP |
|---|---|---|
| PROBLEMATICAL SHOP GROUP | | SHOP GROUP 8 |
| 1 | SHOP NAME | SHOP 12 |
| | PROCESS COMPLETION DATE | MAY 23 |
| | OVERLOAD AMOUNT | 1.5 HOURS |
| 2 | SHOP NAME | SHOP 12 |
| | PROCESS COMPLETION DATE | MAY 30 |
| | OVERLOAD AMOUNT | 4.0 HOURS |
| ... | ......... | |
| 10 | SHOP NAME | SHOP 14 |
| | PROCESS COMPLETION DATE | MAY 25 |
| | OVERLOAD AMOUNT | 2.5 HOURS |

FIG. 45

| RESULT OF CONSTRAINT RELAXATION JUDGEMENT | | | CONSTRAINT RELAXATION IS UNNECESSARY |
|---|---|---|---|
| SHOP GROUP SUBJECTED TO JUDGEMENT | | | SHOP GROUP 8 |
| LIST OF OVERLOAD AMOUNTS BY ANALYSIS | 1 | SHOP NAME | SHOP 12 |
| | | PROCESS COMPLETION DATE | MAY 23 |
| | | OVERLOAD AMOUNT | 1.5 HOURS |
| | | ACCEPTABLE AMOUNT | |
| | 2 | SHOP NAME | SHOP 12 |
| | | PROCESS COMPLETION DATE | MAY 30 |
| | | OVERLOAD AMOUNT | 4.0 HOURS |
| | | ACCEPTABLE AMOUNT | |
| | | | |

FIG. 46

| LIST OF OVERLOAD AMOUNTS ON STARTING DATE | | | |
|---|---|---|---|
| | 1 | SHOP NAME | SHOP 8 |
| | | PROCESS COMPLETION DATE | MAY 23 |
| | | OVERLOAD AMOUNT | 1.5 HOURS |
| | 2 | SHOP NAME | SHOP 9 |
| | | PROCESS COMPLETION DATE | MAY 30 |
| | | OVERLOAD AMOUNT | 4.0 HOURS |
| | ⋮ | | |
| | 10 | SHOP NAME | SHOP 10 |
| | | PROCESS COMPLETION DATE | MAY 25 |
| | | OVERLOAD AMOUNT | 2.5 HOURS |

FIG.49

ADJUSTMENT FORMULATION DATA: A1, A2, A3, ......, B1, B2, B3, ...........

CAPACITY CHANGE TYPE

| TYPE OF ADJUSTMENT | CAPACITY CHANGE | | | |
|---|---|---|---|---|
| PERIOD | 5/21 | 5/22 | ...... | 6/20 |
| shop1 | 8 | 8 | ...... | 10 |
| shop2 | 8 | 10 | ...... | 8 |
| ...... | ...... | ...... | ...... | ...... |
| SHOP | | | | |
| shop30 | 8 | 10 | ...... | 10 |

SHOP CHANGE TYPE

| TYPE OF ADJUSTMENT | SHOP CHANGE |
|---|---|
| 1  MRP NO. | 1635 |
|    PROCESS COMPLETION DATE | 5/25 |
|    ORIGIN OF TRANSFER | shop8 |
|    DESTINATION OF TRANSFER | shop9 |
| 2  MRP NO. | 1721 |
|    PROCESS COMPLETION DATE | 5/28 |
|    ORIGIN OF TRANSFER | shop8 |
|    DESTINATION OF TRANSFER | shop9 |
| ...... | ...... |

MPS CHANGE TYPE

| TYPE OF ADJUSTMENT | GENERATION OF OVERLOAD | MPS PROCESS COMPLETION DATE CHANGE |
|---|---|---|
| SHOP GROUP HAVING OVERLOAD GENERATED | | Shop |
|  | Shop Gr. 8 | |
| 1  SHOP NAME | shop8 | |
|    PROCESS COMPLETION DATE | shop9 | |
|    OVERLOAD AMOUNTS | 1721 | |
| 2  SHOP NAME | 5/28 | |
|    PROCESS COMPLETION DATE | shop8 | |
|    OVERLOAD AMOUNTS | shop9 | |
| LIST OF OVERLOAD AMOUNTS BY PROBLEM ANALYSIS | ...... | |

FIG. 52

| SELECT OBJECT OF PLANNING | | |
|---|---|---|
| PRODUCT MADE OBJECT | PERIOD MADE OBJECT | PRODUCTION LOAD READ ~163 |
| PRODUCT 1 | OCTOBER | |
| PRODUCT 2 | NOVEMBER | PRODUCTION LOAD SET |
| PRODUCT 3 | DECEMBER | |
| PRODUCT 4 | | HOLIDAY-WORK/-OVERTIME SET |
| | | PRODUCTION FRAME SET ~170 |
| | | PLAN/CAPACITY ADJUSTMENT |
| CANCEL   OK | | HELP   PRECEDING PAGE |

FIG.53

PRODUCTION LOAD SET

PRODUCT MADE OBJECT: PRODUCT 1  
PERIOD MADE OBJECT: DECEMBER/ (NUMBER OF OPERATING DAYS: 21 DAYS)  
DELIVERY FOR RECEIPT OF ORDER ON THIS MONTH  
PAGE : 1/20

| PRODUCT NAME CODE | TYPE | PRODUCTION LOAD | | PRICE | STOCK | | BACKLOG | NORMAL STOCK | FORECAST STOCK |
|---|---|---|---|---|---|---|---|---|---|
| | | PLANNED AMOUNT | CHANGED AMOUNT | | FACTORY | MATERIALS CENTER | FACTORY | MATERIALS CENTER | |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |

[ CANCEL ]  [ OK ]

- PRODUCTION LOAD ADJUSTMENT
- CAPACITY SET (ASSEMBLY) — 178
- CAPACITY SET (WORK) — 179
- SUPPLIER'S CAPACITY SET — 180
- PLAN/BUDGET
- PRODUCTION LOAD BY ASSEMBLING PLACES
- HELP
- PRECEDING PAGE

FIG. 54

PRODUCTION LOAD SET

CAPACITY SET (ASSEMBLING PLACE)

PRODUCT MADE OBJECT: PRODUCT 1  181
PERIOD MADE OBJECT: DECEMBER/ (NUMBER OF OPERATING DAYS: 21 DAYS)
PAGE : 1/2   184

| HEAPING PLACE 187 | LOAD STATUS (%) | OPERATING TIME (hr) 182 | ESTIMATED NUMBER OF PERSONS 185 | TOTAL OVERTIME 186 BEFORE CHANGE (hr) | AFTER CHANGE (hr) 188 | TOTAL CAPACITY (%) | ESTIMATED (hr) 183 | UPPER LIMIT (hr) |
|---|---|---|---|---|---|---|---|---|
| ASSEMBLING PLACE 1 | 85 | 160 | 5 | 0 | 0 | 100 | 40 | 60 |
| ASSEMBLING PLACE 2 | 90 | 160 | 6 | 0 | 0 | 100 | 40 | 60 |
| ASSEMBLING PLACE 3 | 120 | 160 | 6 | 32 | 32 | 100 | 40 | 60 |
| ASSEMBLING PLACE 4 | 100 | 160 | 5 | 0 | 0 | 100 | 40 | 60 |
| ASSEMBLING PLACE 5 | 150 | 160 | 5 | 75 | 60 | 135 | 40 | 60 |
| TOTAL | | | | *** | *** | *** | *** | *** |

[ OK ]  [ CANCEL ]

[ OK ]  [ CANCEL ]

CAPACITY ADJUSTMENT
PRODUCTION LOAD ADJUSTMENT PLACE SELECTION   189
HELP  PRECEDING PAGE

FIG. 55

PRODUCTION LOAD SET

DISPLAY OBJECT CHANGE | CAPACITY ADJUSTMENT | PRODUCTION LOAD ADJUSTMENT PLACE SELECTION | HELP | PRECEDING PAGE

CAPACITY SET (WORKING PLACE)

PRODUCT MADE OBJECT: PRODUCT 1   181
PERIOD MADE OBJECT: DECEMBER/ (NUMBER OF OPERATING DAYS: 21 DAYS)
PAGE : 1/4   184

| HEAPING PLACE | LOAD STATUS (%) 187 | OPERATING TIME (hr) 182 | ESTIMATED NUMBER OF PERSONS 185 | TOTAL OVERTIME 186 | | TOTAL CAPACITY (%) 188 | ESTIMATED (hr) 183 | UPPER LIMIT (hr) 184 |
|---|---|---|---|---|---|---|---|---|
| | | | | BEFORE CHANGE (hr) | AFTER CHANGE (hr) | | | |
| WORKING PLACE 1 | 85 | 160 | 5 | 0 | 0 | 100 | 40 | 60 |
| WORKING PLACE 2 | 90 | 160 | 6 | 0 | 0 | 100 | 40 | 60 |
| WORKING PLACE 3 | 120 | 160 | 6 | 32 | 32 | 100 | 40 | 60 |
| WORKING PLACE 4 | 100 | 160 | 5 | 0 | 0 | 100 | 40 | 60 |
| WORKING PLACE 5 | 150 | 160 | 5 | 75 | 60 | 135 | 40 | 60 |
| TOTAL | *** | *** | *** | *** | *** | *** | *** | *** |

OK | CANCEL

OK | CANCEL

FIG.57

| PRODUCT MADE OBJECT: PRODUCT 1 | | | | | | | | | |
|---|---|---|---|---|---|---|---|---|---|
| PRODUCT NAME CODE | TYPE | PRODUCTION LOAD | | PRICE | STOCK | | BACKLOG | | FORECAST STOCK |
| | | PLANNED AMOUNT | CHANGED AMOUNT | | FACTORY | MATERIALS CENTER | FACTORY | MATERIALS CENTER | NORMAL STOCK |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |
| P**** | *** | *** | | *** | *** | *** | *** | *** | *** |

PRODUCTION TYPE LIST (ASSEMBLING PLACE)

PERIOD MADE OBJECT: DECEMBER/ (NUMBER OF OPERATING DAYS: 21 DAYS)

DELIVERY FOR RECEIPT OF ORDER ON THIS MONTH

PAGE : 1/3

PLAN/BUDGET

PRODUCTION LOAD BY PLACES

PRECEDING PAGE

HELP

OK   CANCEL

FIG.58

PRODUCTION LOAD SET (WORKING PLACE)

| | PRODUCTION LOAD ADJUSTMENT | PLAN/BUDGET | PRODUCTION LOAD BY ASSEMBLING PLACES | SUPPLY AMOUNT BY ASSEMBLING PLACES | | PRECEDING PAGE |
|---|---|---|---|---|---|---|
| | | | | | HELP | |

PRODUCT MADE OBJECT: PRODUCT 1
PERIOD MADE OBJECT: DECEMBER/ (NUMBER OF OPERATING DAYS: 21 DAYS)
PAGE : 1/1

DELIVERY FOR RECEIPT OF ORDER ON THIS MONTH

| PRODUCT NAME CODE | TYPE | PRODUCTION LOAD | | PRICE | STOCK | | BACKLOG | | NORMAL STOCK | FORECAST STOCK |
|---|---|---|---|---|---|---|---|---|---|---|
| | | PLANNED AMOUNT | CHANGED AMOUNT | | FACTORY | MATERIALS CENTER | FACTORY | MATERIALS CENTER | | |
| P**** | *** | *** | | *** | *** | *** | *** | *** | *** | *** |
| P**** | *** | *** | | *** | *** | *** | *** | *** | *** | *** |
| P**** | *** | *** | | *** | *** | *** | *** | *** | *** | *** |
| ----- | --- | --- | | --- | --- | --- | --- | --- | --- | --- |
| P**** | *** | *** | | *** | *** | *** | *** | *** | *** | *** |
| ----- | --- | --- | | --- | --- | --- | --- | --- | --- | --- |
| P**** | *** | *** | | *** | *** | *** | *** | *** | *** | *** |
| | *** | | | | | | | | | |

[OK] [CANCEL]

FIG.59

| PRODUCT MADE OBJECT: PRODUCT 1 | | | | | | | | | | |
|---|---|---|---|---|---|---|---|---|---|---|
| | | | | | | | | | | |

PRODUCTION LOAD SET (SUPPLIER PLACE)

PERIOD MADE OBJECT: DECEMBER/ (NUMBER OF OPERATING DAYS: 21 DAYS)

PAGE : 1/1

| PRODUCT NAME CODE | TYPE | PRODUCTION LOAD | | PRICE | STOCK | | BACKLOG | | NORMAL STOCK | FORECAST STOCK |
|---|---|---|---|---|---|---|---|---|---|---|
| | | PLANNED AMOUNT | CHANGED AMOUNT | | FACTORY | MATERIALS CENTER | FACTORY | MATERIALS CENTER | | |
| P**** | *** | *** | ☐ | *** | *** | *** | *** | *** | *** | *** |
| P**** | *** | *** | ☐ | *** | *** | *** | *** | *** | *** | *** |
| P**** | *** | *** | ☐ | *** | *** | *** | *** | *** | *** | *** |
| P**** | *** | --- | --- | --- | --- | --- | --- | --- | --- | --- |
| P**** | *** | *** | ☐ | *** | *** | *** | *** | *** | *** | *** |
| P**** | *** | *** | ☐ | *** | *** | *** | *** | *** | *** | *** |
| | *** | | | | | | | | | |

DELIVERY FOR RECEIPT OF ORDER ON THIS MONTH

[OK] [CANCEL]

PRODUCTION LOAD ADJUSTMENT
PLAN/BUDGET
PRODUCTION LOAD BY ASSEMBLING PLACES
SUPPLY AMOUNT BY ASSEMBLING PLACES
HELP
PRECEDING PAGE

PRODUCTION PLANNING SYSTEM

CROSS REFERENCE TO RELATED APPLICATION

The present application is a Continuation-In-Part of U.S. patent application Ser. No. 07/796,850 filed on Nov. 25, 1991, now U.S. Pat. No. 5,231,567. The disclosure of the application is incorporated herein by reference.

BACKGROUND OF THE INVENTION

The present invention relates to a production planning system, and more particularly to a production planning system including the formulation of a production plan, the adjustment of the production plan, the estimation of a delivery date and a user interface.

In the conventional production plan formulating method as disclosed by JP-A-63-306861, the supply capacity of a parts supply shop and the production capacity of an assembly shop are comparatively examined to adjust and determine a product production load so that the amount of consumption of materials or parts and the amount of supply thereof are balanced with each other.

In the prior art as disclosed by JP-A-1-166251, in the case where a delivery date is to be forecast, an average leadtime is forecast with the processing capacity of each production process and the amount of products passed through the production process or a load amount being taken into consideration. An answer to the estimation of a delivery date is given to a client by determining a forecast delivery date from the forecast value of the average leadtime and comparing the forecast delivery date with a client's requested delivery date, thereby judging whether or not the attainment of the client's requested delivery date is possible.

In a production plan formulating system disclosed by JP-A-2-185351, a change in production plan, in the case where a problem is generated in a production plan, is made not by adjusting or changing the problematical plan but by formulating a new plan again.

JP-A-2-311250 discloses a production plan formulating system which aids in turning a problematical plan into a plan with no problem by adjusting the problematical plan. However, the disclosed system merely aids in a process for formulation of a plan. The evaluation of a plan, the detection of areas to be adjusted and the determination of adjustment must be performed by the person in charge of planning.

In the prior art disclosed by JP-A-63-306861, means for coping with the change or correction of a production plan is only the change of a product production load. In an actual factory, the change or correction of a production plan is generally performed examining countermeasures inclusive of the change of a product production load as well as an increase in production capacity by an extratime work such as overtime work or the shortening of a production period by the setting of an alternative shop in order to solve a problem in the production plan. In the prior art, however, this is not taken into consideration.

Also, in the actual production, a leadtime of each process changes in accordance with an increase/decrease in production load or production capacity. Therefore, if it is desired to formulate an accurate production plan, it is necessary to formulate a production plan with the dynamically changing leadtime being taken into consideration. However, in the above-mentioned prior art, the formulation of an accurate production plan is difficult since the supply capacity and the production capacity are evaluated on the basis of a fixed production tact or a time for arrangement or adjustment.

Also, the causes of the correction of a production plan may include not only an imbalance between in amount of consumption and amount of supply between the parts supply shop and the assembly shop but also an order change request from a client or a business department side. This is also not taken into consideration by the above-mentioned prior art.

Further, in the above-mentioned prior art, a production plan is formulated at one step. However, in a factory to manufacture products for which order change requests from clients or the business department side are received every day, it is general to formulate a detailed plan in regard to a period near the start of product assembly and a macro plan in regard to a period earlier than that. If it is desired to confine the correction of plan to the minimum, thereby improving the plan formulation efficiency, it is required that the macro plan should be formulated taking the production load and the production capacity into consideration.

In the prior art disclosed by the JP-A-1-166251, the judgement of whether or not the attainment of a delivery date is possible, is made from a requested delivery date and a forecast completion date determined using a fixed standard leadtime in which a production status is not taken into consideration. In this case, the determination of the attainment of a delivery date as being possible is made only in the case where the forecast completion date and the requested delivery date coincide with each other or the forecast completion date is earlier than the requested delivery date. In other cases, it is determined that the attainment of a delivery date is not possible.

In a production made to order, the requested specifications of products are generally various depending on clients so that a large variation occurs between production processes and/or work loads thereof. Also, in a production process, the working and assembling processes are linked in a multi-step fashion. In the case where the working process is crowded, the flow of materials becomes more complicated. Therefore, since a production process for each product and a work load of the production process as well as a load and the number of commencements for each production process change greatly, a completion date forecast using a fixed standard leadtime has a large difference from the actual completion date. Accordingly, it is difficult to accurately forecast the possibility of the attainment of a delivery date by use of the forecast completion date.

Also, in the above-mentioned prior art, the comparison of a forecast completion date with a requested delivery date is merely made but a production plan changing/adjusting function or a production capacity adjusting function is not included. Namely, in the case where the lateness for product completion with respect to a client's requested delivery date is forecast, it is necessary to perform the change or adjustment of a production plan and/or the adjustment of a production capacity including countermeasures such as an increase in production capacity by an extratime work such as an overtime work or the shortening of a production period by the use of an alternative shop. However, such an adjusting function is not included by the above-mentioned prior art.

Accordingly, there arise a problem that the forecasting of a completion date is inaccurate and a problem that a lack of a production plan changing or production capacity adjusting function brings about a lateness for the date of delivery of order-accepted products and in its turn results in the loss of a chance of order from a client.

In the prior art disclosed by the JP-A-2-185351, a technique for formulating an executable plan includes formulating a practically executable plan again by repeatedly making the judgement as to the necessity of the relaxation of constraint conditions in the course of a reformulation process to determine and perform the concrete contents of the constraint condition relaxation immediately when the relaxation becomes necessary.

However, such a technique requiring the judgement in the course of the plan formulation includes a problem that a judgement in its broader aspects is missing when compared with various judgements made taking a survey of the whole of a plan and hence an improper relaxation of constraint conditions is made, for example, the constraint condition is relaxed more than required.

In the prior art disclosed by the JP-A-2-311250, even if the person in charge of plan formulation tries to turn an original production plan into an executable plan not by reformulation but by the analysis and adjustment of the original production plan in its broader aspects, this try is accompanied by great difficulties.

First, the person in charge of plan formulation cannot immediately judge whether or not the relaxation of constraint conditions is necessary.

Second, the person in charge of plan formulation cannot immediately see an extent to which the influence of adjustment is exerted.

Third, the person in charge of plan formulation cannot immediately see the degree of an effect attained by the adjustment.

Fourth or in the first place, the person in charge of plan formulation cannot immediately see what matter is problematical in adjusting a plan into an executable one.

As mentioned above, the above-mentioned prior art involves a problem that a lack of a function of analyzing the status of a production plan and a lack of a function of adjusting and formulating a plan brings about many difficulties.

SUMMARY OF THE INVENTION

An object of the present invention made to solve the above-mentioned problems of the prior art is to provide a production planning system including:

(1) a system for automatically judging the necessity of a new design from a requested specification and accurately and rapidly setting a production process for each product and a work load thereof from actual production design data;

(2) a system for automatically determining a production process status, a production capacity and a leadtime for which the result of (1) is taken into consideration and automatically formulating a daily schedule of production on the basis of the determined production process status, production capacity and leadtime;

(3) a system for changing or adjusting a production plan and a production capacity in the case where the attainment of a delivery date is determined as being impossible; and (4) a system for partially automatizing the change/adjustment of a production plan and a production capacity and making a guiding display of a changing/adjusting method.

Means for solving the above subjects is disclosed in the scope of claims for a patent. Namely, embodiments of the present invention are as follows.

(1) There is provided a production planning system comprising a data input/output device having a data input/output display and operation processing function, a leadtime forecasting device for forecasting a leadtime from a production capacity and a work load, an MRP explosion calculation device for performing a material requirement planning calculation and outputting the result of calculation, a work load calculation device for calculating a work load from the result of calculation by the MRP explosion calculation device, an MRP calculation control device for controlling the operations of the leadtime forecasting device, the MRP explosion calculation device and the work load calculation device, a problem area analysis device for analyzing and outputting a problematical area from an output of the MRP explosion calculation device in accordance with an instruction from the data input/output device, a production capacity adjustment device for changing a production capacity in accordance with an instruction from the data input/output device to make an output instruction to the MRP explosion calculation device, and a data retention device, whereby the possibility of execution of a production plan is judged by making a production schedule simulation through the calculation of a leadtime with a work load and a production capacity of each process being taken into consideration.

(2) There is provided a production planning system in which the above construction is additionally provided with a completion date adjustment device, an alternative shop adjustment device, a job procedure adjustment device and a production load adjustment device.

(3) There is provided a production planning system in which the above construction is additionally provided with a plan adjustment device for displaying and carrying out a guideline of the change/adjustment of the production plan and the production capacity.

(4) There is provided a production planning system in which the above construction is additionally provided with a macro production load adjustment device, a macro production capacity adjustment device, and a daily scheduler device for formulating a daily production plan.

(5) There is provided a production planning system in which the above construction is additionally provided with first displaying means for clarifying a problematical area from a by-period load/capacity status and a production chain for each manufacturing shop, second displaying means for on-line displaying a capacity change status by the operation of the production capacity adjustment device and a production process status change associated with the capacity change, third displaying means for on-line displaying a product completion date change status by the operation of the completion date adjustment device and a production process status change associated with the product completion date change, fourth displaying means for on-line displaying an alternative shop change status by the operation of the alternative shop adjustment device and a production process status change associated with the alternative shop change, fifth displaying means for on-line displaying a job starting order change status by the operation of the job starting order adjustment device and a production process status change associated with the job starting order change, and sixth displaying means for on-line displaying a product production load change status by the operation of the production load adjustment device and a production process status change associated with the product production load change.

(6) There is provided a production planning system in which the leadtime forecasting device includes means for determining a work load distribution from the work load and the production capacity and means for determining the leadtime from the work load distribution.

(7) There is provided a production planning system in which the leadtime forecasting device includes means which is based on a pattern conversion method and is inputted with the work load and the production capacity to output the leadtime.

(8) There is provided a production planning system in which the leadtime forecasting device includes means for automatically determining parameters for forecast on the basis of actual production data acquired from a manufacturing system.

(9) There is provided a production planning system in which the plan adjustment device includes a problematical area analysis device, a constraint relaxation judgement device, an efficient constraint relaxation selection device, a constraint relaxation adjustment formulation device, an efficient in-constraint adjustment selection device, an in-constraint adjustment formulation device, and an adjustment formulation control device, whereby there is provided a function by which in order to turn an inexecutable production plan into an executable production plan, the allotted state of each of a capacity and a load at each shop is analyzed to make the analysis of a problematical area, thereby judging the necessity of the relaxation of constraint conditions, and a production plan adjusting method with the relaxation of the constraint conditions taken into consideration and a production plan adjusting method within a range of the constraint conditions are respectively formulated in the case where the relaxation of the constraint conditions is determined as being necessary and in the case where the relaxation of the constraint conditions is determined as being unnecessary.

(10) There is provided a production planning system in which the plan adjustment device further includes an undertaken constraint relaxation determination device having a function of determining the contents of the constraint condition relaxation to be undertaken on the basis of data of efficient constraint relaxation which is output data of the efficient constraint relaxation selection device.

(11) There is provided a production planning system in which the undertaken constraint relaxation determination device includes means for selecting at least one among a plurality of candidate sets each of which includes one set of a constraint condition in the production plan and the content of relaxation of that constraint condition and is provided with a predetermined priority.

(12) It is preferable that the problem area analysis device includes means for forming a load accumulation graph as the accumulation of daily load amounts and a capacity accumulation graph as the accumulation of daily capacity amounts for each shop from the heaped state of a load and the heaped state of a capacity for each shop, means for forming the earliest capacity accumulation graph for each shop within the constraint conditions, the earliest capacity accumulation graph being a capacity accumulation graph formed so that the accumulation of all capacity amounts is completed earliest on a time axis, means for forming the latest load accumulation graph and the latest capacity accumulation graph for each shop within the constraint conditions, the latest load accumulation graph being a load accumulation graph formed so that the accumulation of all load amounts is completed latest on the time axis and the latest capacity accumulation graph being a capacity accumulation graph formed so that the accumulation of all capacity amounts is completed latest on a time axis, means for forming the earliest capacity accumulation graph for each shop group on the basis of the earliest capacity accumulation graph for each shop, means for forming the latest load accumulation graph for each shop group on the basis of the latest load accumulation graph for each shop, means for comparing the earliest capacity accumulation graph and the latest load accumulation graph for each shop group to determine a planned date of interest and an overload amount at that time, and means for comparing the earliest capacity accumulation graph and the latest load accumulation graph for each shop to determine a planned date of interest and an overload amount at that time.

(13) There may be provided a production plan adjusting system in which the means for forming the earliest capacity accumulation graph for each shop within the constraint conditions include means for combining a by-day upper limit capacity addition accumulation graph formed by the addition of upper limit capacities by days toward the future from the first day of a production plan period at a shop of interest and a by-day lower limit capacity subtraction accumulation graph formed by the subtraction of lower limit capacities by days from an upper limit capacity in the production plan period heaped on the last day of the production plan period toward the past from the last day to form the earliest capacity accumulation graph in the shop of interest.

(14) It is preferable that the constraint relaxation judgement device includes means for judging whether or not there exists a shop group in which an overload state is generated, means for judging whether or not a shop group with a overload state generated is a shop group for the final assembling process, means for judging whether or not a planned date on which an overload state is generated at a certain shop group and an overload amount at that time can be removed by a shop change for a job in the certain shop group, and means for judging whether or not a planned date on which an overload state is generated at a certain shop group and an overload amount at that time can be removed by a shop change for a job in a shop group in a stream lower than the certain shop group.

(15) Further, there may be provided a production plan adjusting system in which the means for judging whether or not a planned date on which an overload state is generated at a certain shop group and an overload amount at that time can be removed by a shop change for a job in the certain shop group, include means for determining an acceptable load amount for each shop in the certain shop group from a by-day upper limit capacity addition accumulation graph formed by the accumulation of upper limit capacities by days for that shop in accordance with the lapse of time and a load accumulation graph formed by the accumulation of loads by days for that shop in accordance with the lapse of time, the acceptable load amount being a load amount capable of being accepted at that shop, and means for comparing an overload amount when an overload state is generated and the acceptable load amount at each shop to judge whether or not the removal of the overload amount is possible by a shop change for a job in the certain shop group.

(16) Also, there may be considered a production plan adjusting system in which the production plan adjustment device further includes an undertaken in-constraint adjustment determination device having a function of determining an adjustment method to be undertaken on the basis of data of efficient in-constraint adjustment which is output data of the efficient in-constraint adjustment selection device.

(17) Further, it is preferable that the undertaken in-constraint adjustment determination device includes means for selecting at least one adjustment method to be formulated among at least one or more adjustment methods which are in a plurality of adjustment methods each provided with a predetermined priority and which exist in the range of constraint conditions.

Operations in the embodiments of the present invention are as follows:

1. The person in charge of production planning inputs a product specification and a requested delivery data by use of the data input/output device to instruct to check the product specification. A specification check device is inputted with necessary data from the data retention device in accordance with the specification check instruction and checks the presence/absence of omission, oversight and contradiction in the product specification to output the result of check to the data retention device. Also, the data input/output device is inputted with the specification check result from the data retention device to display it in accordance with a predetermined format.

2. The person in charge of production planning instructs the judgement of the necessity of a new design by use of the data input/output device. A design passage judgement device is inputted with necessary data from the data retention device in accordance with the instruction of judgement of the necessity of the new design and confirms whether or not the product specification exists in the previous design information, so that the result is outputted to the data retention device. Also, the data input/output device is inputted with the specification check result from the data retention device to display it in accordance with a predetermined format. In the case where the new design is required, the result of a provisional parts explosion is inputted to the design passage judgement device by use of the data input/output device to instruct to output it to the data retention device.

3. The person in charge of production planning makes an MRP calculation perform instruction by use of the data input/output device. The MRP calculation control device controls the operations of the leadtime forecasting device, the MRP explosion calculation device and the work load calculation device in accordance with the MRP calculation perform instruction, calculates a leadtime with a work load and a production capacity taken into consideration, formulates a production plan and outputs the result to the data retention device. At this time, the MRP explosion calculation device is inputted with necessary data from the data retention device to make an explosion of a required quantity so that the result is written into the data retention device while it is outputted to the work load calculation device. The work load calculation device calculates a work load from the received MRP calculation result and outputs the calculated work load to the leadtime forecasting device. The leadtime forecasting device forecasts a leadtime from the received work load and outputs the forecast leadtime to the MRP explosion calculation device. The MRP explosion calculation device utilizes the received leadtime at a step next to the explosion of the required quantity.

4. The person in charge of production planning makes an instruction of the adjustment of a production capacity to the production capacity adjustment device by use of the data input/output device. The production capacity adjustment device adjusts the production capacity in accordance with the production capacity adjust instruction and outputs the result of adjustment and an MRP calculation perform instruction to the MRP calculation control device. The MRP calculation control device controls the operations of the leadtime forecasting device, the MRP explosion calculation device and the work load calculation device so that a group of data required for MRP calculation is inputted from the data retention device to perform an MRP calculation and the result of MRP calculation is thereafter outputted to the data retention device. Also, the data retention device is inputted with the result of MRP calculation from the data retention device and displays it in accordance with a predetermined format.

5. The person in charge of production planning makes an instruction of the adjustment of a completion date to the completion date adjustment device by use of the data input/output device. The completion date adjustment device adjusts the completion date and outputs the result of adjustment and an MRP calculation perform instruction to the MRP calculation control device. The MRP calculation control device controls the operations of the leadtime forecasting device, the MRP explosion calculation device and the work load calculation device so that a group of data required for MRP calculation is inputted from the data retention device to perform an MRP calculation and the result of MRP calculation is thereafter outputted to the data retention device. Also, the data retention device is inputted with the result of MRP calculation from the data retention device and displays it in accordance with a predetermined format.

6. The person in charge of production planning makes an instruction of the adjustment of an alternative shop to the alternative shop adjustment device by use of the data input/output device. The alternative shop adjustment device makes the alternative shop adjustment and outputs the result of adjustment and an MRP calculation perform instruction to the MRP calculation control device. The MRP calculation control device controls the operations of the leadtime forecasting device, the MRP explosion calculation device and the work load calculation device so that a group of data required for MRP calculation is inputted from the data retention device to perform an MRP calculation and the result of MRP calculation is thereafter outputted to the data retention device. Also, the data retention device is inputted with the result of MRP calculation from the data retention device and displays it in accordance with a predetermined format.

7. The person in charge of production planning makes an instruction of the analysis of a problematical area to the problem area analysis device by use of the data input/output device. The problem area analysis device is inputted with the result of MRP calculation from the data retention device to analyze a problematical area and thereafter displays the result of analysis on the data input/output device in accordance with a predetermined format.

8. The person in charge of production planning makes instructs of "problem area analysis" or "automatic adjustment formulation" of a production plan by use of the data input/output device. The adjustment formulation control device controls the problem area analysis device and the constraint relaxation judgement device to find out shop groups and shops which become problematical in advancing the adjustment of a production plan under formulation into an executable production plan, and judges whether or not the relaxation of constraint conditions is necessary in advancing the adjustment of a production plan into an executable one.

At this time, the problem area analysis device fetches production plan data and constraint condition data from the data retention device to analyze shop groups and shops which become problematical in advancing the adjustment of a production plan under formulation into an executable one, and outputs analysis data produced at the time of analysis to the data retention device.

Fetching the production plan data, the constraint condition data (for example, by-day upper and lower limit production loads, a total production load in a period, and so on) and the analysis data from the data retention device, the constraint relaxation judgement device judges whether or not the relaxation of constraint conditions is necessary in advancing the adjustment into an executable production plan, and outputs constraint relaxation judgement data produced at the time of judgement to the data retention device. (The above processing will be referred to "processing 1".)

Next, in the case where "the relaxation of constraint conditions is necessary" is determined from the result of judgement based on the constraint relaxation judgement data stored in the data retention device after the processing 1 has been completed, the adjustment formulation control device controls the efficient constraint relaxation selection device to select constraint condition relaxing methods which are efficient in advancing the adjustment of a plan under formulation into an executable one. At this time, the data input/output device displays the result of selection.

In the case where the person in charge of production planning further instructs "automatic adjustment formulation continuation" after having instructed "automatic adjustment formulation" or "problem area analysis", the person in charge of production planning or the undertaken constraint relaxation determination device determines that one of the selected efficient constraint condition relaxing methods which is to be undertaken. The constraint relaxation adjustment formulation device determines the specific contents of adjustment based on the constraint condition relaxation determined as being to be undertaken, and the data input/output device displays the result of determination. At this time, the efficient constraint relaxation selection device fetches the production plan data, the constraint condition data and the analysis data from the data retention device to select constraint condition relaxing methods which are efficient in advancing the adjustment of a plan under formulation into an executable one, and outputs all of the efficient constraint condition relaxing methods to the data retention device.

The data input/output device displays all the efficient constraint condition relaxing methods on a CRT or the like in accordance with a predetermined format.

The person in charge of production planning selects one of the constraint condition relaxing methods to be undertaken by use of the data input/output device.

The data input/output device outputs the selected constraint condition relaxation to the constraint relaxation adjustment formulation device. In the case where there is employed a construction additionally provided with the undertaken constraint relaxation determination device, all of the constraint condition relaxing methods efficient in advancing the adjustment of a plan under formulation into an executable one are outputted from the efficient constraint relaxation selection device to the undertaken constraint relaxation determination device.

The undertaken constraint relaxation determination device determines that one of the constraint condition relaxing methods which is to be undertaken, and outputs the result of determination to the constraint relaxation adjustment formulation device. Receiving information of the constraint condition relaxation to be undertaken from the data input/output device or the undertaken constraint relaxation determination device and fetching the production plan data, the constraint condition data and the analysis data from the data retention device, the constraint relaxation adjustment formulation device formulates the specific contents of adjustment based on the constraint condition relaxation and outputs the result of formulation to the data input/output device. At this time, the data input/output device displays the result of formulation in accordance with a predetermined format. (The above processing will be referred to as "processing 2".)

Next, in the case where "the relaxation of constraint conditions is unnecessary" is determined from the result of judgement based on the constraint relaxation judgement data existing in the data retention device after the processing 1 has been completed, the adjustment formulation control device controls the efficient in-constraint adjustment selection device to select adjustment methods which are within the range of constraint conditions and are efficient in advancing the adjustment of a plan under formulation into an executable one. At this time, the data input/output device displays the result of selection.

In the case where the person in charge of production planning further instructs "automatic adjustment formulation continuation" after having instructed "automatic adjustment formulation" or "problem area analysis", the person in charge of production planning or the undertaken in-constraint adjustment determination device determines that one of the selected efficient adjustment methods in the range of constraint conditions which is to be undertaken.

The in-constraint adjustment formulation device determines the specific contents of adjustment based on the adjustment in the constraint conditions determined as being to be undertaken, and the data input/output device displays the result of determination.

At this time, the efficient in-constraint adjustment selection device fetches the production plan data, the constraint condition data, the analysis data and the constraint relaxation judgement data from the data retention device to select adjustments in the constraint conditions which are efficient in advancing the adjustment of a plan under formulation into an executable one, and outputs all of the adjustments in the constraint conditions to the data retention device.

The data input/output device displays all the efficient adjustments in the constraint conditions on a CRT or the like in accordance with a predetermined format.

The person in charge of production planning selects one of the adjustments in the constraint conditions to be undertaken without using the data input/output device.

The data input/output device outputs the selected adjustment in the constraint conditions to the in-constraint adjustment formulation device. In the case where there is employed a construction provided with the undertaken in-constraint adjustment determination device, all of the adjustments in the constraint conditions efficient in advancing the adjustment of a plan under formulation into an executable one are outputted from the efficient in-constraint adjustment selection device to the undertaken in-constraint adjustment determination device.

The undertaken in-constraint adjustment determination device determines the contents of those one of the adjustments in the constraint conditions which is to be undertaken, and outputs the result of determination to the in-constraint adjustment formulation device.

Receiving information of the adjustment in the constraint conditions to be undertaken from the data input/output device or the undertaken in-constraint adjustment determination device and fetching the production plan data, the constraint condition data, the analysis data and the constraint relaxation judgement data from the data retention device, the in-constraint adjustment formulation device formulates the specific contents of adjustment based on the adjustment in the constraint conditions and outputs the result of formulation to the data input/output device. At this time, the data input/output device displays the result of formulation on a CRT or the like in accordance with a predetermined format.

In the case where the in-constraint adjustment formulation device fails to formulate the adjustment, the in-constraint adjustment formulation device outputs additional analysis data to the data retention device. At this time, the adjustment formulation control device controls the constraint relaxation judgement device to output constraint relaxation judgement data on the basis of the additional analysis data. (The above processing will be referred to as "processing 3".)

Subsequently, the flow proceeds to the processing 2 or the processing 3 to perform a series of processings, thereby carrying out a proper adjustment of a production plan.

9. The possibility of execution of a production load adjusted by the macro production load adjustment device can be examined by the macro production capacity adjustment device from the point of view of the production capacity of each process to display a production load for the equipment type of products passed through a problematical process, 10. The daily scheduler device can explode a macro production plan into a detailed production plan by an explosion method which is optimum for each assembling process.

BRIEF DESCRIPTION OF THE DRAWINGS

FIG. 22 is a diagram for explaining an example of a production process;

FIG. 23 is a diagram for explaining a list of alternative shops by items;

FIG. 24 is a diagram for explaining a heaped state and an accumulated state (or an accumulation graph);

FIG. 37 is a diagram for explaining production plan data and constraint condition data;

FIG. 38 is a diagram for explaining a method for forming a reverse explosion earliest capacity accumulation graph;

FIG. 44 is a diagram for explaining analysis data;

FIG. 45 is a diagram for explaining constraint relaxation judgement data;

FIG. 46 is a diagram for explaining a list of overload amounts on starting date;

FIG. 49 is a diagram for explaining adjustment formulation data;

FIG. 52 shows a display screen for production plan instruction;

FIG. 53 shows an input/output display screen of a production load adjustment device;

FIG. 54 shows the input/output display screen (1) of the production load adjustment device;

FIG. 55 shows the input/output display screen (2) of the production load adjustment device;

FIG. 57 shows a display screen (1) for production load adjustment;

FIG. 58 shows the display screen (2) for production load adjustment; and

FIG. 59 shows the display screen (3) for production load adjustment.

DESCRIPTION OF THE PREFERRED EMBODIMENTS

An embodiment of the present invention will now be explained by use of FIGS. 1 to 17.

Figure 1:
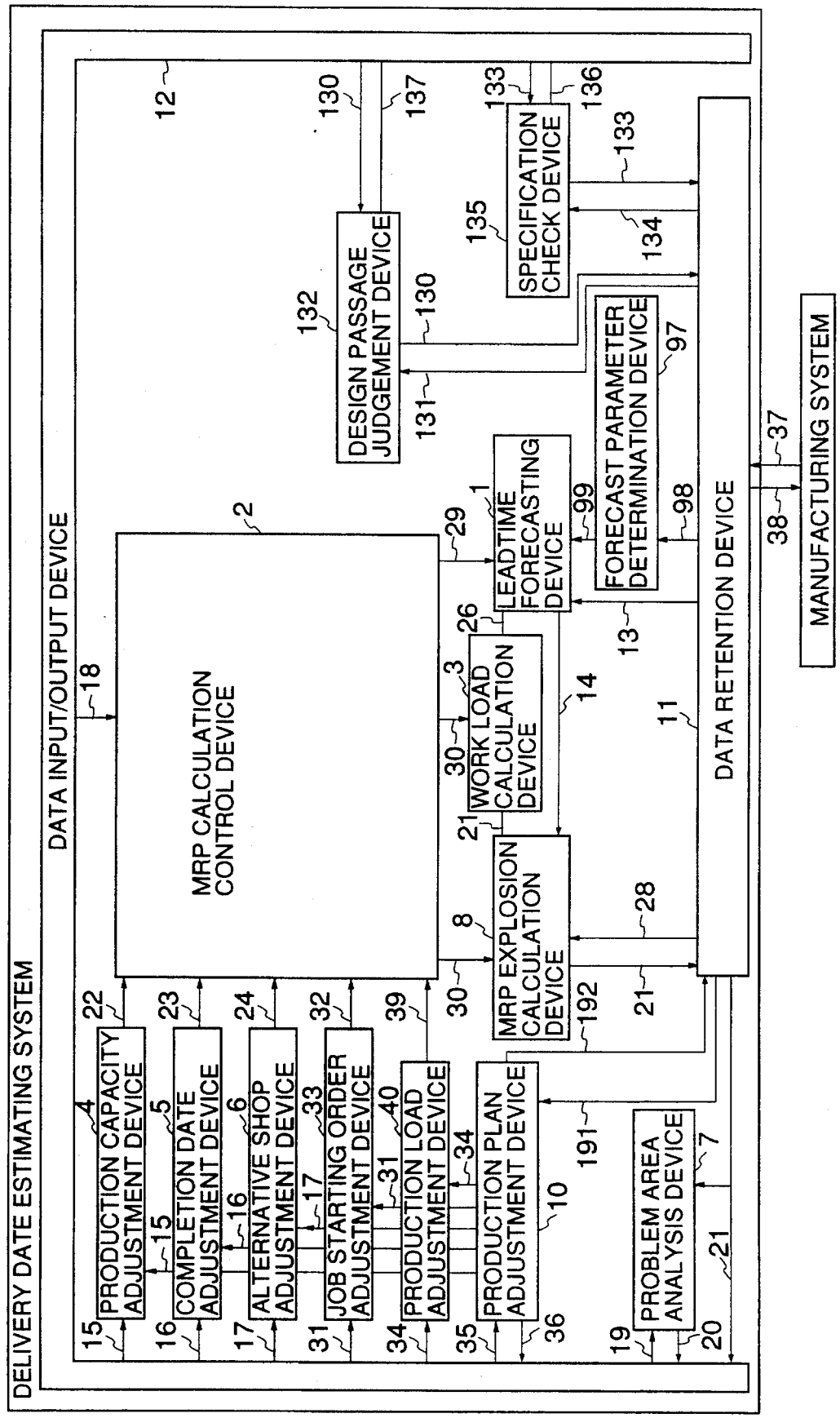
FIG. 1 is a block diagram showing the construction of an embodiment of a production planning system according to the present invention.

FIG. 1 is a block diagram showing an embodiment of a production planning system according to the present invention.

The production planning system is constructed to include a leadtime forecasting device 1 for forecasting a leadtime 14 from a production capacity 13 and a work load 26, an MRP explosion calculation device 8 for performing an MRP explosion calculation on the basis of data 28 for MRP calculation and the leadtime 14 in accordance with an MRP explosion perform instruction 30 to output the result 21 of MRP calculation, a work load calculation device 3 for calculating the work load 26 on the basis of the result 21 of MRP calculation, an MRP calculation control device 2 for controlling the operation of each of the leadtime forecasting device 1, the MRP explosion calculation device 8 and the work load calculation device 3, a production capacity adjustment device 4 for making a production capacity adjustment in accordance with a production capacity adjust instruction 15 to output the production capacity adjustment result and MRP calculation perform instruction 22, a completion date adjustment device 5 for adjusting a completion date in accordance with a completion date adjust instruction 16 to output the completion date adjustment result and MRP calculation perform instruction 23, an alternative shop adjustment device 6 for making an alternative shop adjustment or the re-allocation of work to alternative shop in accordance with an alternative shop adjust instruction 17 to output the alternative shop adjustment result and MRP calculation perform instruction 24, a job starting order adjustment device 33 for adjusting the order of job starting in accordance with an job starting order adjust instruction 31 to output the job starting order adjustment result and MRP calculation perform instruction 32, a production load adjustment device 40 for making the adjustment of production load in accordance with a production load adjust instruction 34 to output the production load adjustment result and MRP calculation perform instruction 39, a problem area analysis device 7 for making the analysis of an problematical area in accordance with a problem area analyze instruction 19 and to output the problem area analysis result 20, a production plan adjustment device 10 for automatically performing various countermeasures by determining a countermeasure from data 19 for adjustment upon reception of an adjustment device input 35 to output the determined countermeasure as an adjustment device output 36 or to output a production capacity adjust instruction 15, a completion date adjust instruction 16 and/or an alternative shop adjust instruction 17, a specification check device 135 for receiving a product specification check perform instruction, delivery date and product specification 133 to send delivery date and product specification 130 to a data retention device 11 and for receiving relevant product specification date 134 from the data retention device 11 to check whether or not the product specification is problematical, a design passage judgement device 132 for receiving relevant actual production design data 131 from the data retention device 11 to judge the necessity of a new design and for receiving the result of parts explosion in the case where the new design is necessary to send the result 130 of design passage judgement to the data retention device 11 for output instruction, a forecast parameter determination device 97 for determining forecast parameters 99 for the leadtime forecasting device 1 from the actual results 98 of production, the data retention device 11 for storing various data as mentioned above, and a data input/output device 12.

Figure 2:
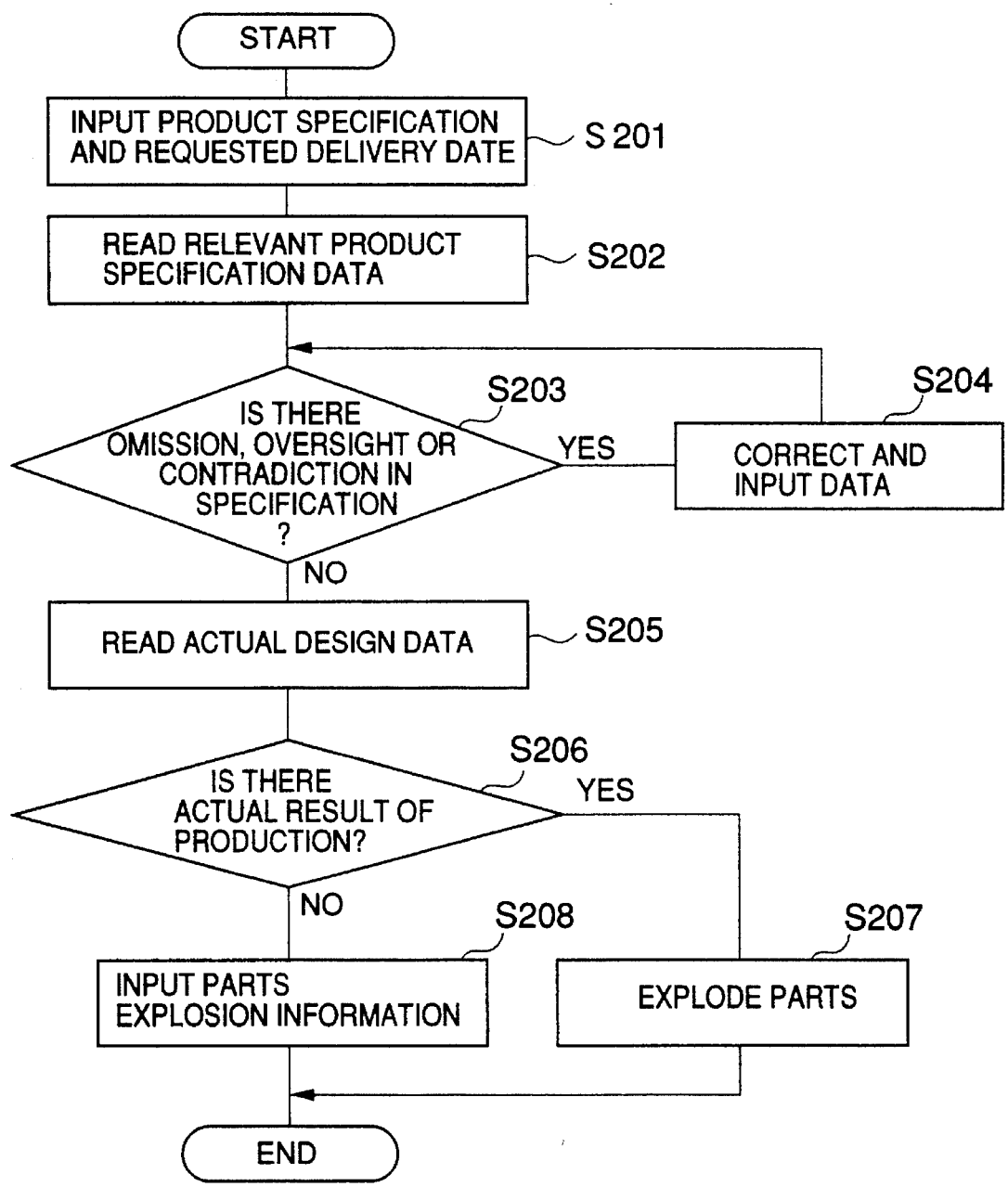
FIG. 2 is a flow chart of a parts explosion operation.

First, an embodiment of a parts explosion processing for setting a product production process and a work load in the production process by use of the specification check device 135 and the design passage judgement device 132 in the production planning system of the present invention will be explained with reference to FIGS. 1 and 2.

In the production planning system of the present embodiment,

S201: the person in charge of production planning inputs a product specification and requested delivery date 133 to the specification check device 135 by use of the data input/output device 12 and S202: the specification check device 135 receives product specification data 134 from the data retention device 11

S203: to check the presence/absence of omission, oversight and/or contradiction in the product specification.

S204: In the case where there are the omission, oversight and/or contradiction, the data input/output device 12 receives the specification check result 136 from the specification check device 135 to display it in accordance with a predetermined format. On the basis of the displayed specification check result, the person in charge of production planning inputs a specification to the specification check device 135 by use of the data input/output device 12 so that the same check processing is performed again.

S205: In the case where the product specification is not problematical, the product specification and requested delivery date 133 are outputted to the data retention device 12.

S206: Next, the design passage judgement device 132 receives the product specification and actual production design data 131 from the data retention device 11 and judges the necessity of a new design to confirm whether or not the product specification coincides with one of the actual results of a previous design.

S207: In the case where there is the coincident actual design result, the design passage judgement device 132 sets a production process for each product and a work load of the production process to output them to the data retention device 11.

S208: In the case where there is no coincident actual design result, the data input/output device 12 receives the result 137 of design passage judgement from the design passage judgement device 132 to display it in accordance with a predetermined format.

The person in charge of production planning inputs the result 130 of provisional parts explosion to the design passage judgement device 132 by use of the data input/output device 12 to instruct the design passage judgement device 132 to output the result 130 to the data retention device 11.

Next, the function of the MRP calculation control device 2 in the production planning system will be explained.

In the production planning system of the present embodiment, an accurate production plan is automatically formulated with a proper leadtime being dynamically set taking not only an MRP calculation but also a shop load and a shop capacity setting into consideration and the system operates under control by the MRP calculation control device 2 so that the MRP calculation control device 2 controls the operation of each of the leadtime forecasting device 1, the MRP explosion calculation device 8 and the work load calculation device 3, thereby performing a production plan formulation.

Figure 3:
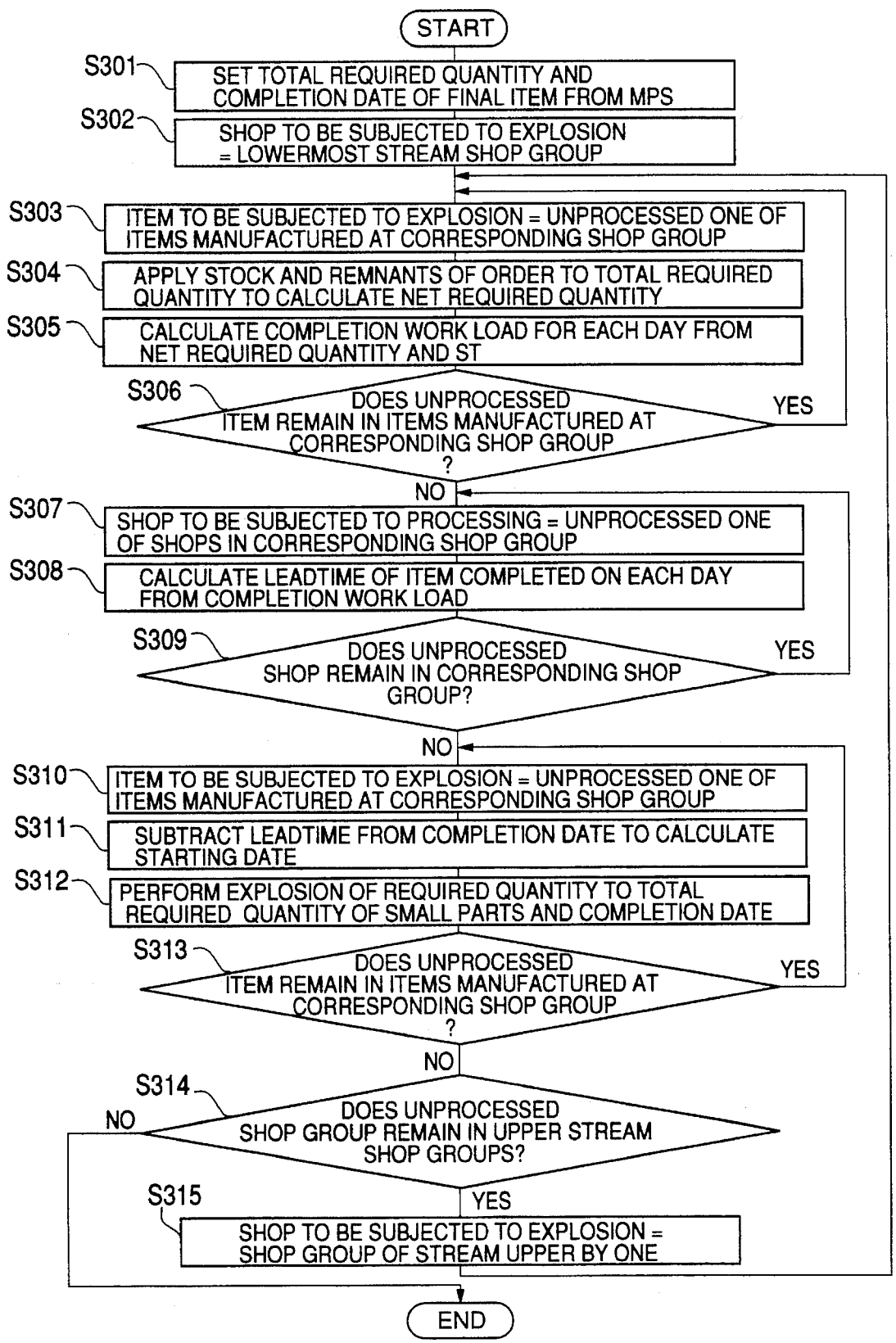
FIG. 3 is a flow chart (1) of the operation of an MRP calculation control device.
Figure 4:
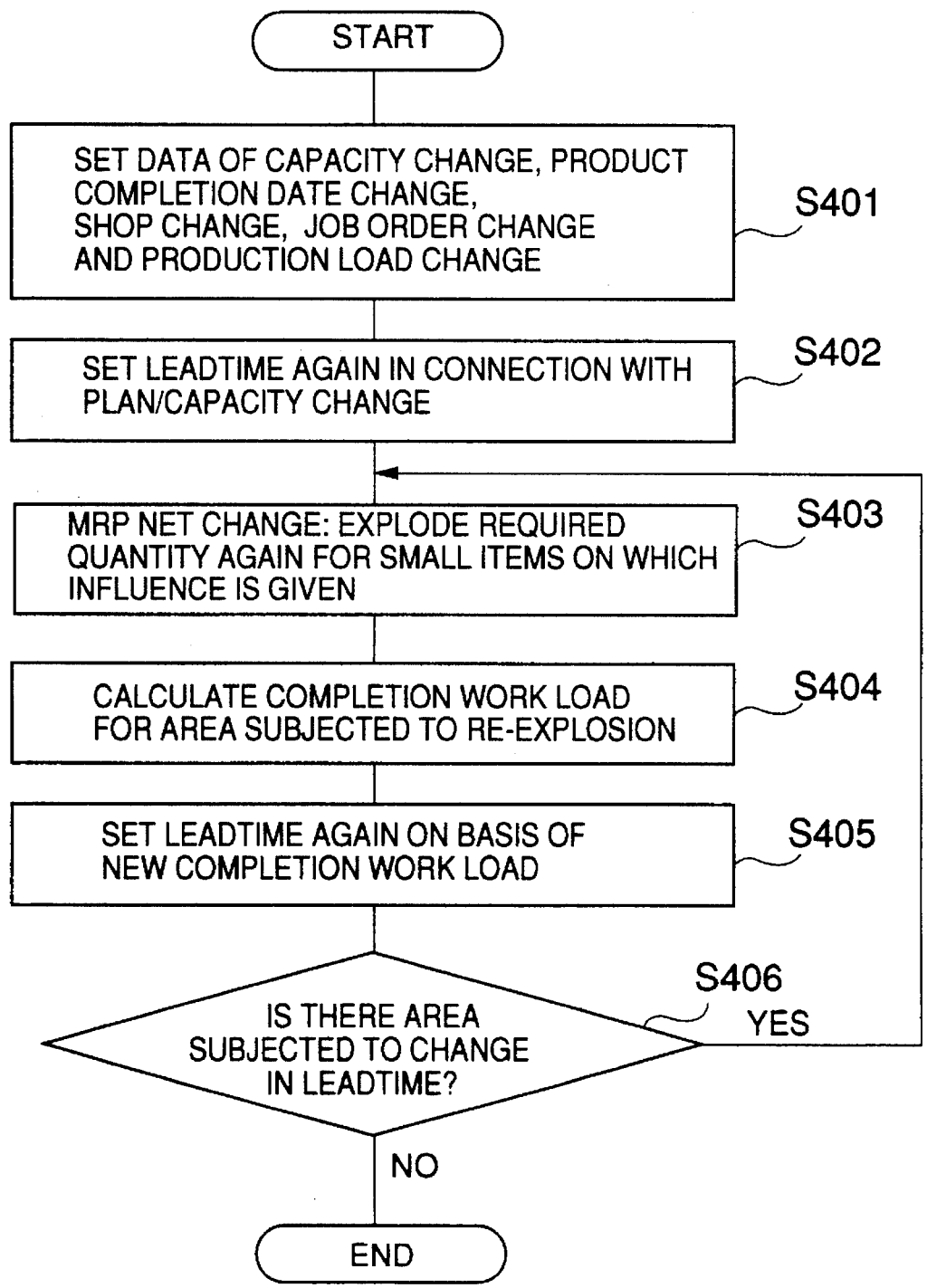
FIG. 4 is a flow chart (2) of the operation of the MRP calculation control device.

In the following, a production plan regeneration processing of the system of the present embodiment will be explained in detail by use of FIGS. 1 and 3.

The MRP calculation control device 2 controls the operation of the MRP explosion calculation device 8 to perform a level-by-level explosion of a required quantity for each shop group from lower stream shop groups (S302) not only to determine a required net quantity and a completion date for an item manufactured by the corresponding shop (S303 and S304) and but also to deliver data for calculation, as a work load calculate instruction 25, to the work load calculation device 3. The work load calculation device 3 calculates a completion work load 26 (S305) and delivers it to the leadtime forecasting device 1.

The completion work load means data obtained by calculating the sum of ST's (or standard work times) for items manufactured by the corresponding shops on each completion date. On the basis of the completion work load 26 and a production capacity 13, the leadtime forecasting device 1 sets a leadtime 14 for an item completed on the completion date of each corresponding shop (S307, S308 and S309). (The method of setting will be mentioned later on.)

Upon receiving the set leadtime 14, the MRP explosion calculation device 8 determines a starting date for an item having the determined completion date and writes the determined starting date into the data retention device 11 (S310 to S313). Thereby, the explosion of one shop level is completed. Then, the MRP calculation control device 2 controls the operation of each of the leadtime forecasting device 1, the MRP explosion calculation device 8 and the work load calculation device 3 so as to repeat the above operation with the explosion of required quantity being performed for shop levels further upstream (S314 and S315). Thus, a production plan regeneration (or MRP regeneration) is performed.

Other functions of the MRP calculation control device 2 will be explained.

In the production planning system of the present embodiment, though various countermeasures such as production capacity adjustment, completion date adjustment, alternative shop adjustment, job starting order adjustment and production load adjustment are performed for a production plan, these countermeasures are accompanied by a change in shop load and it is therefore necessary to dynamically change a leadtime. Here also, the MRP calculation control device 2 controls the operation of each of the leadtime forecasting device 1, the MRP explosion calculation device 8 and the work load calculation device 3 in a manner similar to that at the time of production plan regeneration, thereby changing the production plan. Next, a production plan change processing of the system of the present embodiment will be explained in detail with reference to FIGS. 1 and 4.

S401: The MRP calculation control device 2 controls the operation of the MRP explosion calculation device 8 to write capacity change, product completion date change, shop change data, job starting order change and production load change into the data retention device 11.

S402: In the case where the capacity change is made, a leadtime of an area subjected to the change is forecast over again by the leadtime forecasting device 1.

S403: Thereafter, the MRP explosion calculation device 8 operates to perform the re-explosion of required quantity (or net change) for items produced at the area subjected to the change and small items thereof to output the result 3.

S404: Then, the work load calculation device 3 calculates the completion work load 26 over again.

S405: On the basis of a new completion work load, the leadtime forecasting device 1 forecasts the leadtime 14 over again.

S406: In the case where there is an area subjected to a change in leadtime, the MRP calculation control device 2 makes a control to repeat the re-explosion of required quantity by the MRP explosion calculation device 8, the re-calculation of completion work load 26 and the re-forecast of leadtime by the leadtime forecasting device 1 until an area subjected to a change in leadtime is out.

Thus, a change in leadtime production plan (or MRP net change) is made while keeping a proper leadtime in which a shop load and a shop capacity setting are taken into consideration.

In the following, the operation of the production planning system of the present embodiment will be explained with the display/operation of the data input/output device 12 taken as a focus of the explanation. The data input/output device 12 is a hitherto known data input/output device in a computer, for example, a data input/output device provided with a Brawn tube display device, a keyboard and a mouse.

Figure 5:
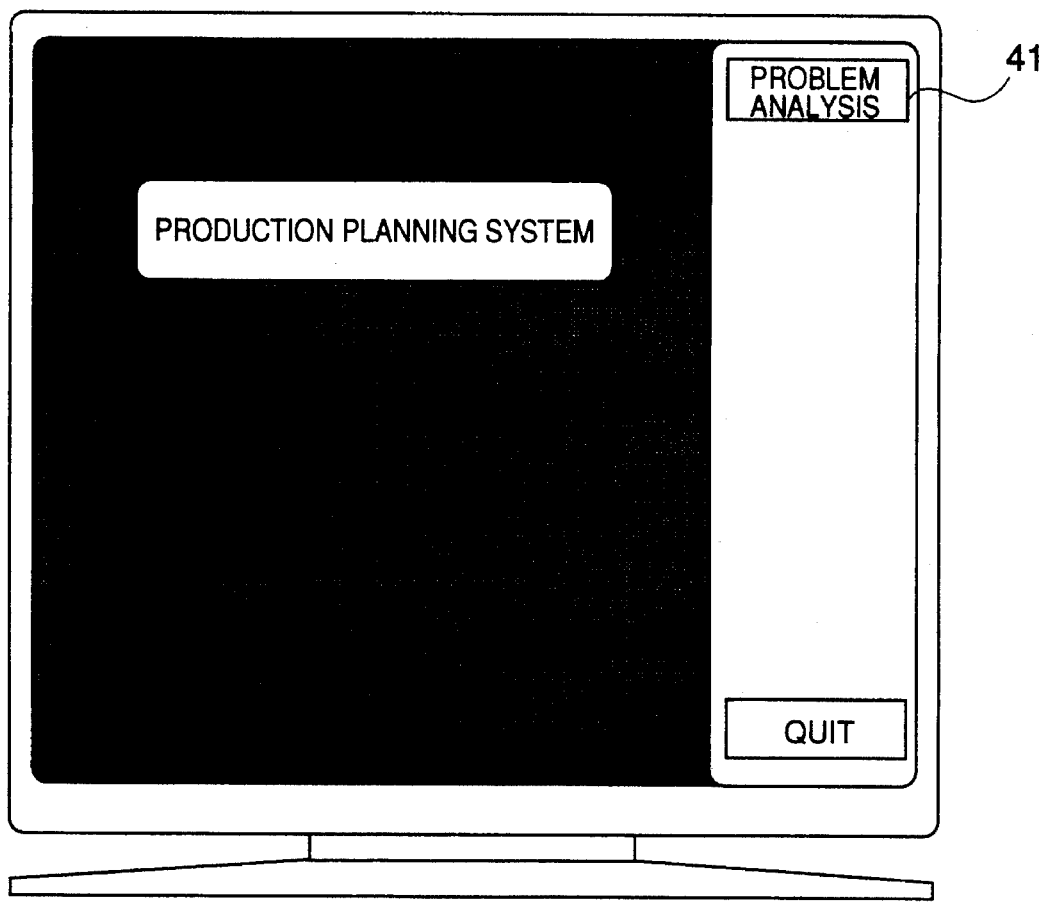
FIG. 5 is a view of an embodiment of a display screen for problem area analyze instruction.

First, explanation will be made of the function of the problem area analysis device 7. FIG. 5 shows an initial display screen of the production planning system. In FIG. 5, a "Problem Analysis" command menu 41 among command menus is selected by a mouse to issue a problem area analyze instruction 19 (see FIG. 1).

When receiving the problem area analyze instruction 19, the problem area analysis device 7 is inputted with the result 21 of MRP calculation from the data retention device 11.

The result of MRP calculation includes a purchasing schedule (parts, quantity, delivery date, etc.) and a manufacturing schedule (parts, quantity, delivery date, etc.) of each order-accepted product.

The problem area analysis device 7 searches the purchasing schedule or the manufacturing schedule to produce the contents of parts for which the starting date is earlier than the present point of time, that is, the number of items, the quantity, a delivery date and a difference between the scheduled date of completion and the delivery date and outputs the result 20 to the data input/output device 12. This is because the scheduled date of product completion cannot be satisfied if a purchasing instruction or a manufacturing start instruction has not been issued earlier than the present point of time.

Figure 6:
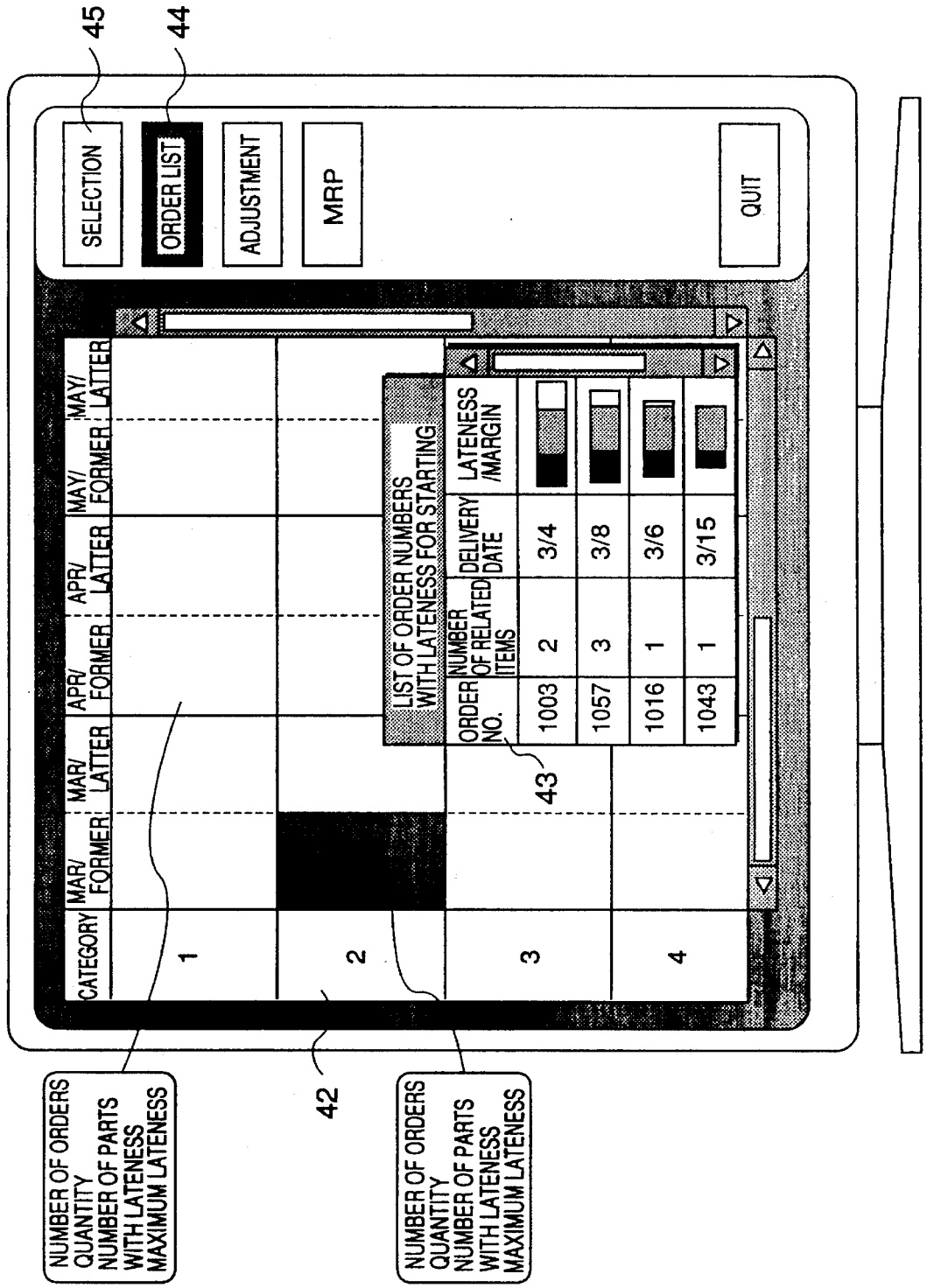
FIG. 6 is a view of an embodiment of a display screen 1 showing the result of problem area analysis.

FIG. 6 shows the display screen for output of the result of problem area analysis. A problem area display table 42 in FIG. 6 has the period in units of a half month along the abscissa and the category of products along the ordinate.

In the case where orders having the scheduled dates of completion in a region represented by each matrix partitioned by the ordinate and the abscissa include one for which the date of delivery cannot be satisfied, the matrix portion is displayed with a dark color. In FIG. 6, "number of orders, quantity, number of parts with lateness, maximum lateness" included in the matrix is displayed as information indicating the status of generation of problem.

Reference to detailed information of such a matrix having a problem generated can be made in accordance with the following procedure.

① Determination of Matrix to be Subjected to Reference to Detailed Information

A matrix to be subjected to reference to detailed information is picked by the mouse. FIG. 6 shows that a matrix portion corresponding to the period of March/former and the category of 2 is picked.

② Display of Table of Order Numbers with Lateness for Starting

An "Orders List" menu 44 among the command menus is picked. By picking the "Orders List" menu 44, a table 43 of order numbers with lateness for starting is displayed. On the table 43 of order numbers with lateness for starting are displayed the order numbers of orders for which the lateness for starting is generated. There are also displayed the number of parts with the lateness for starting (or the number of related items), a delivery date and lateness/margin are displayed for each of products having those order numbers. (The details of lateness/margin will be shown later on.)

Figure 7:
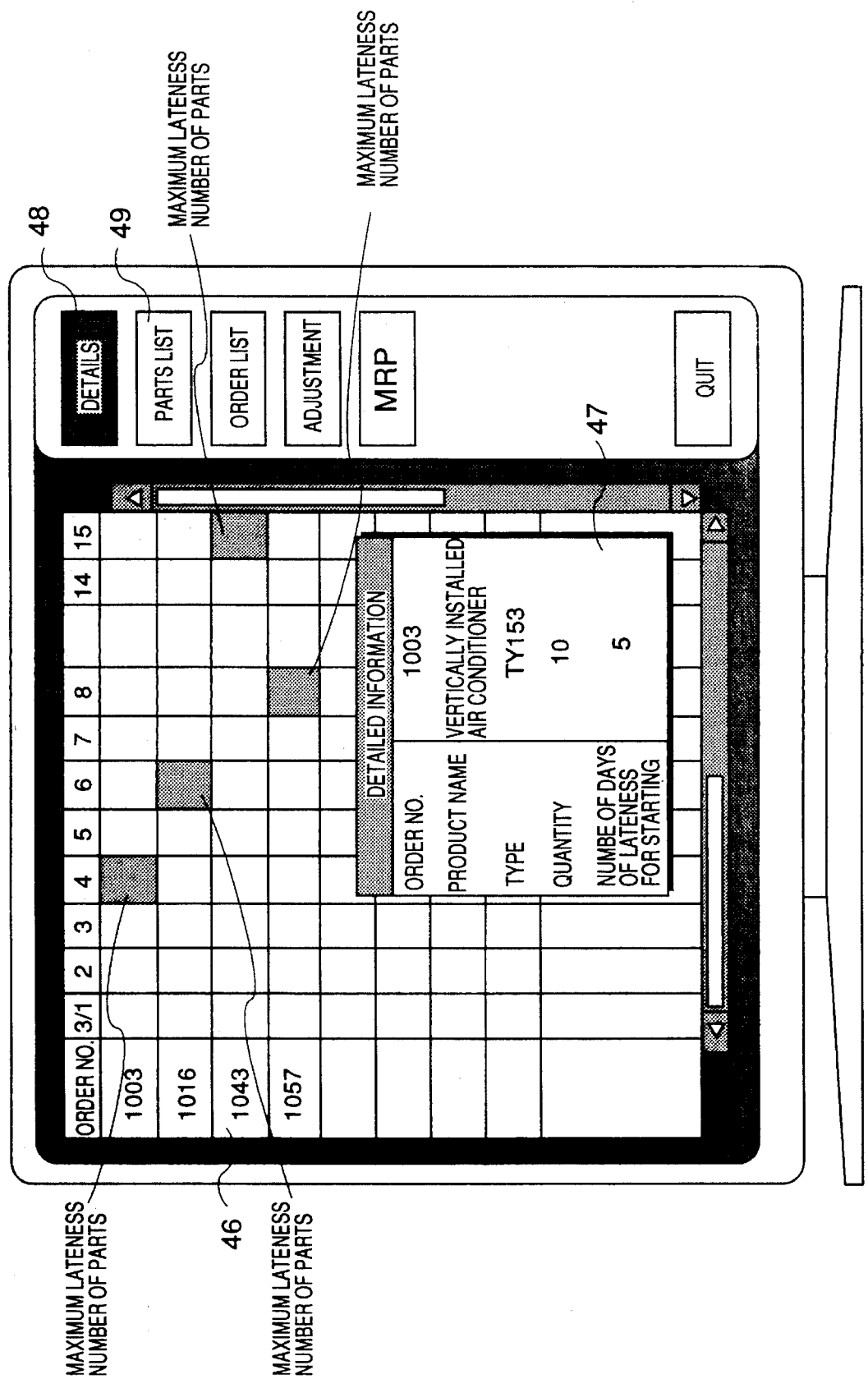
FIG. 7 is a view of an embodiment of a display screen 2 showing the result of problem area analysis.
Figure 8:
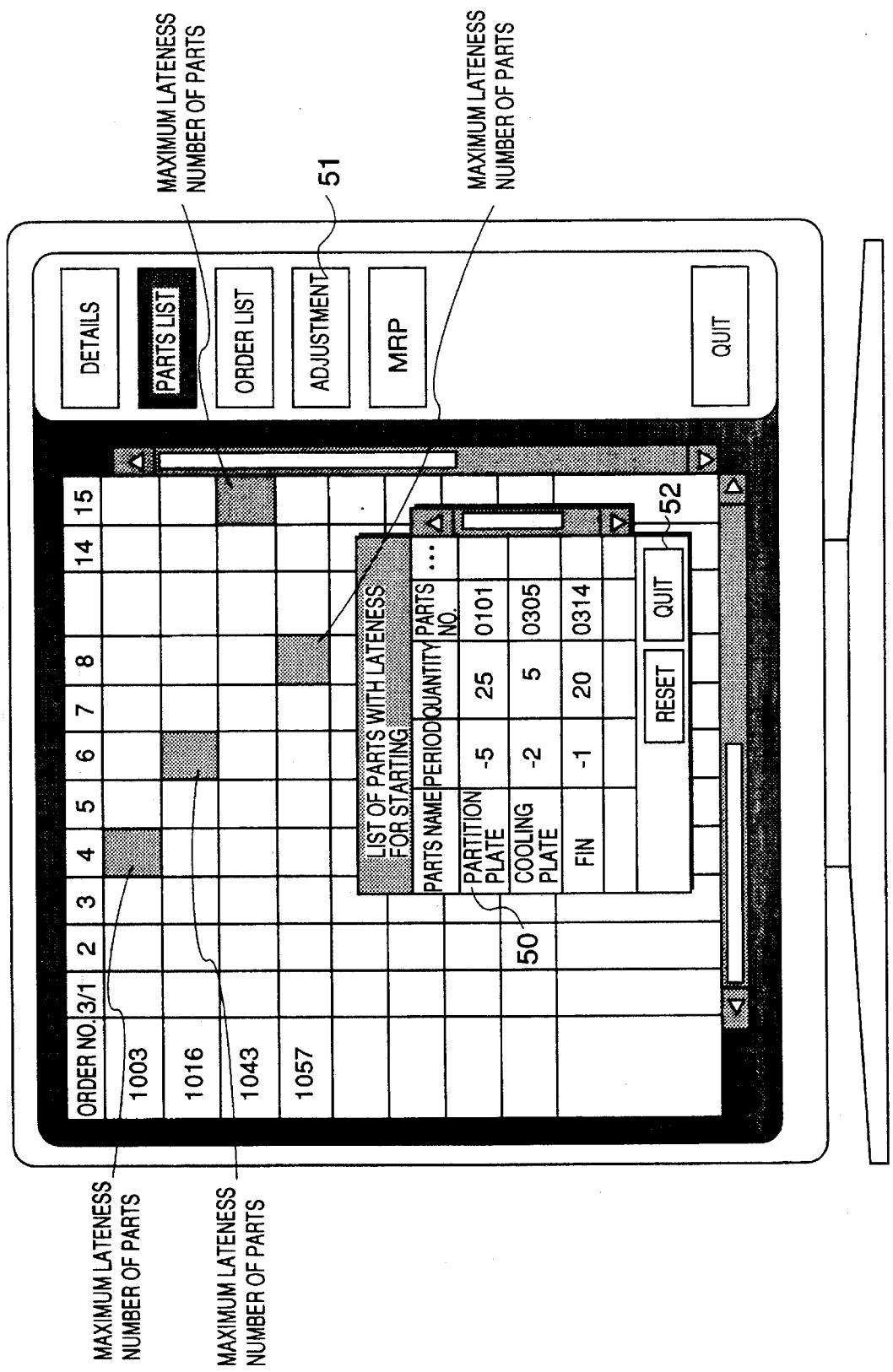
FIG. 8 is a view of an embodiment of a display screen 3 showing the result of problem area analysis.

FIG. 7 shows another example of the display screen for output of the result of problem area analysis. In FIG. 7, a by-order #/by-date problem generation area display table 46 is displayed with the date and the order number being taken along the abscissa and the ordinate, respectively. A displayed period is in a region of the period of March/former and the category of 2 shown in FIG. 6.

A dark colored matrix portion in the by-order #/by-date problem generation area display table 46 shows an area in which a problem is generated. As information for indicating the status of problem generation, there are displayed the maximum lateness and the number of parts for which the lateness for starting is generated for a product having the corresponding order number.

An instruction to display the table 46 of problem generation areas for each order number and each date is given by picking a "Selection" menu 45 among the command menus after a matrix to be subjected to reference to detailed information has been determined.

Also, reference to detailed information of a problematical matrix in the by-order #/by-date problem generation area display table 46 can be made in accordance with the following procedure.

① Determination of Matrix to be Subjected to Reference to Detailed Information

A matrix to be subjected to reference to detailed information is picked by the mouse. In FIG. 7, a matrix corresponding to the delivery date of 3/4 and the order number of 1003 is picked.

② Indication of Detailed Information

A "Details" menu 48 among the command menus is picked. Thereby, a table 47 of detailed information is displayed. The table of detailed information includes product name, type and quantity for a designated order number.

③ Display of List of Parts with Lateness for Starting

By picking an "Items List" menu 49 in lieu of the "Details" menu 48 in ②, the number of days (or period) of lateness for starting, quantity, parts number, etc. for each of all parts with the lateness for starting concerning a product having a designated order number are displayed, as a list of parts with lateness for starting, on the display screen portion 43 shown in FIG. 6.

Figure 9:
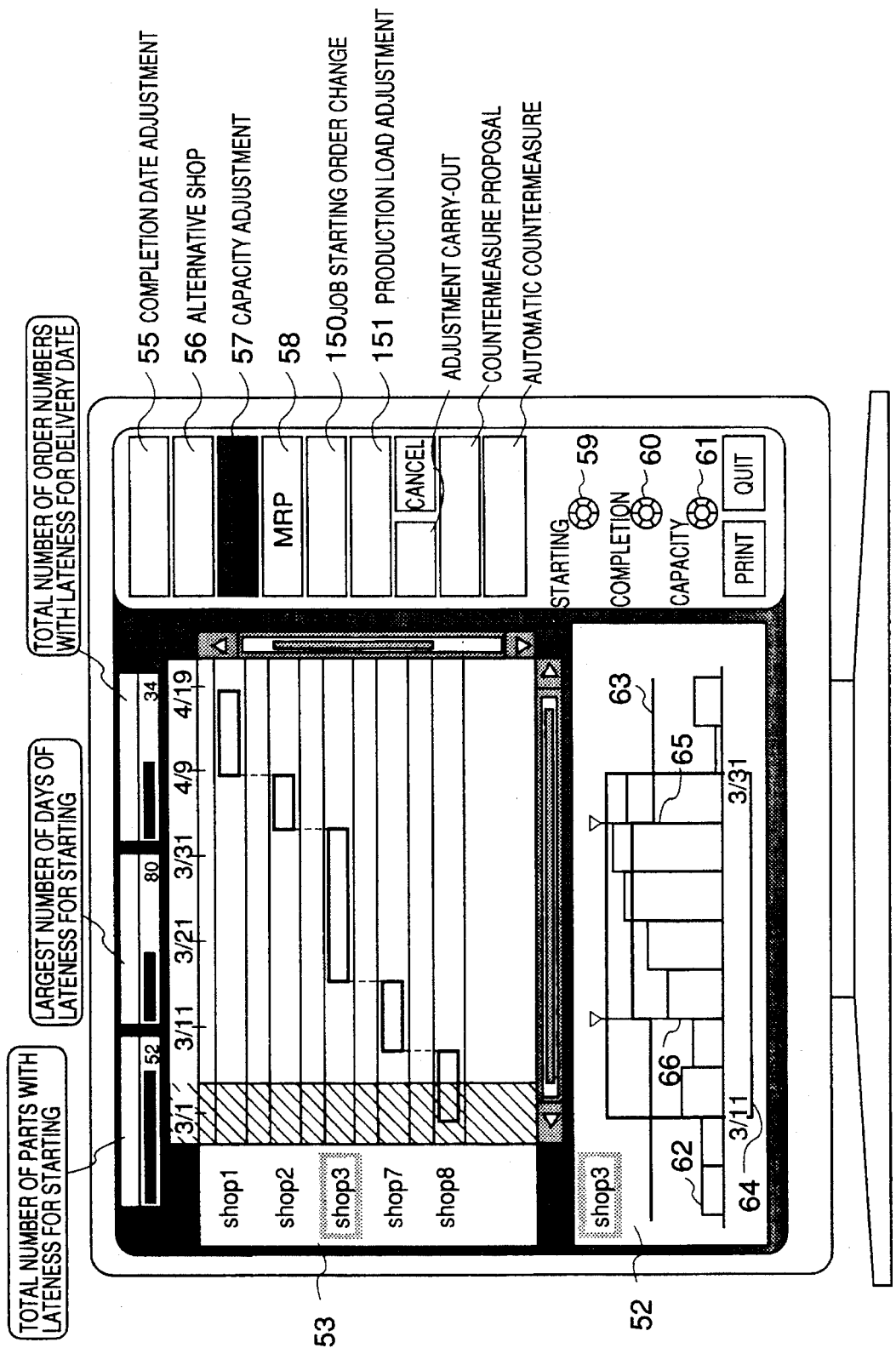
FIG. 9 is a view of an embodiment of a display screen for change in production capacity.

Next, explanation will be made of a method of adjusting a production plan while changing a production capacity. FIG. 9 shows the display screen for change in production capacity. The screen includes a problem production chain display part 53, a production capacity display part 54, a Completion Date Adjustment Mode Change menu 55, an Alternative Shop Mode Change menu 56, a Capacity Adjustment Mode Change menu 57, a Job Starting Order Change Mode Change menu 150, a Production Load Adjustment Mode Change menu 151, an MAP Calculation Perform Instruction Mode Change menu 58, a production capacity change starting time setting dial 59, a production capacity change completion time setting dial 60, a production capacity setting dial 61, and so on.

The problem production chain display part 53 shown in FIG. 9 can be displayed in accordance with the following procedure.

① Selection of Item to be Made Object

There is selected an item which is made an object in adjusting the production plan (or an item having the lateness for starting). For example, "PARTITION PLATE" is selected as parts made an object by picking a "QUIT" button 52 by the mouse after "PARTITION PLATE" in a list 50 of parts with lateness for starting shown in FIG. 8 has been picked by the mouse.

② Production Plan Adjust Instruction

An "Adjustment" menu 51 among the command menus shown in FIG. 6 is picked.

③ Problem Area Analysis

A problem area analyze instruction 19 is issued from the data input/output device 12 shown in FIG. 1. When receiving the problem area analyze instruction 19 from the data input/output device 12, the problem area analysis device 7 is inputted with the result 21 of MRP calculation from the data retention device 11.

Also, the problem area analysis device 7 determines a production chain or shops related to the parts as the object selected in ① and their load statuses to output the result 20 to the data input/output device 12.

④ Problem Production Chain Display

The data input/output device 12 displays the result 20 of problem area analysis in a predetermined format.

Also, the problem production chain display part 53 has the following features:

① displaying only shops related to a production chain related to parts to be made the object of countermeasure;

② displaying the load status of each shop and in each period in a manner color-coded in accordance with the magnitude of degree of crowd (work load/production capacity); and ③ displaying, a diagram showing a shop passage order and a leadtime in the production chain of the parts to be made the object of countermeasure, in a form superimposed on the display in the above feature ②.

By constructing the problem production chain display part 53 with the above features ① to ③, it becomes easy for the person in charge of production planning not only to understand the problematical production chain but also to have a decision making such as taking a countermeasure with an area having a larger degree of crowd.

The adjustment of a production plan with the change of a production capacity is performed in accordance with the following procedure.

① Selection of Process to be Subjected to Change in Production Capacity

A process in the problem production chain display part 53 to be subjected to a change in production capacity is picked by the mouse. For example, a portion of shop 3 enclosed by solid line in FIG. 9 is picked by the mouse.

② Display of Production Capacity Display Part 54

The load status and production capacity of the process selected in the above ① are displayed in a format shown in the production capacity display part 54. The production capacity display part 54 includes a load status 62, a production capacity line 63, a production capacity change starting point 64, a production capacity change finishing point 65 and a frame 66 of an area to be subjected to a change in production capacity.

③ Setting of Production Capacity Change Starting/Finishing Points

The production capacity change starting point 64 or the production capacity change finishing point 65 is moved rightward/leftward by picking the production capacity change starting time setting dial 59 or the production capacity change completion time setting dial 60 by the mouse. The picking by the mouse is such that for example, in the case of a two-button mouse, the production capacity change starting/finishing point is moved leftward when a left button of the mouse is picked and rightward when a right button of the mouse is picked.

④ Change of Production Capacity

The production capacity of an area between the production capacity change starting point 64 and the production capacity change finishing point 65 is changed by picking the production capacity setting dial 61 by the mouse. The picking by the mouse is such that for example, in the case of a two-button mouse, the production capacity line 63 is moved downward (or to a decrease in production capacity) when a left button of the mouse is picked and upward (or to an increase in production capacity) when a right button of the mouse is picked.

⑤ Change of Leadtime/Perform MRP Calculation

The data input/output device 12 shown in FIG. 1 outputs a production capacity adjust instruction 15 to the production capacity adjustment device 4 on the basis of the result of production capacity change in ④. The production capacity adjustment device 4 sends the result of production capacity adjustment and an MRP calculation perform instruction 22 to the MRP calculation control device 2. When the MRP calculation control device 2 sends a leadtime forecast instruction 29 inclusive of production capacity adjustment data to the leadtime forecasting device 1, the leadtime forecasting device 1 estimates a new leadtime with a work load 26 and a new production capacity being taken into consideration. Subsequently, the MRP calculation control device 2 controls the MRP calculation device 8, the work load calculation device 3 and the leadtime forecasting device 1 to perform a net change calculation and outputs the result 21 of calculation to the data retention device 11, as has already been explained in conjunction with FIG. 4.

⑥ Change of Problem Production Chain Display Part

The data input/output device 12 is inputted with the result 21 of MRP calculation from the data retention device 11 to display a corrected production period related to parts made the object of countermeasure.

By realizing such functions as shown by ① to ⑥, it becomes possible for the person in charge of production planning not only to change a production capacity by a simple operation but also to on-line confirm which influence the change in production capacity gives on a production plan.

Figure 10:
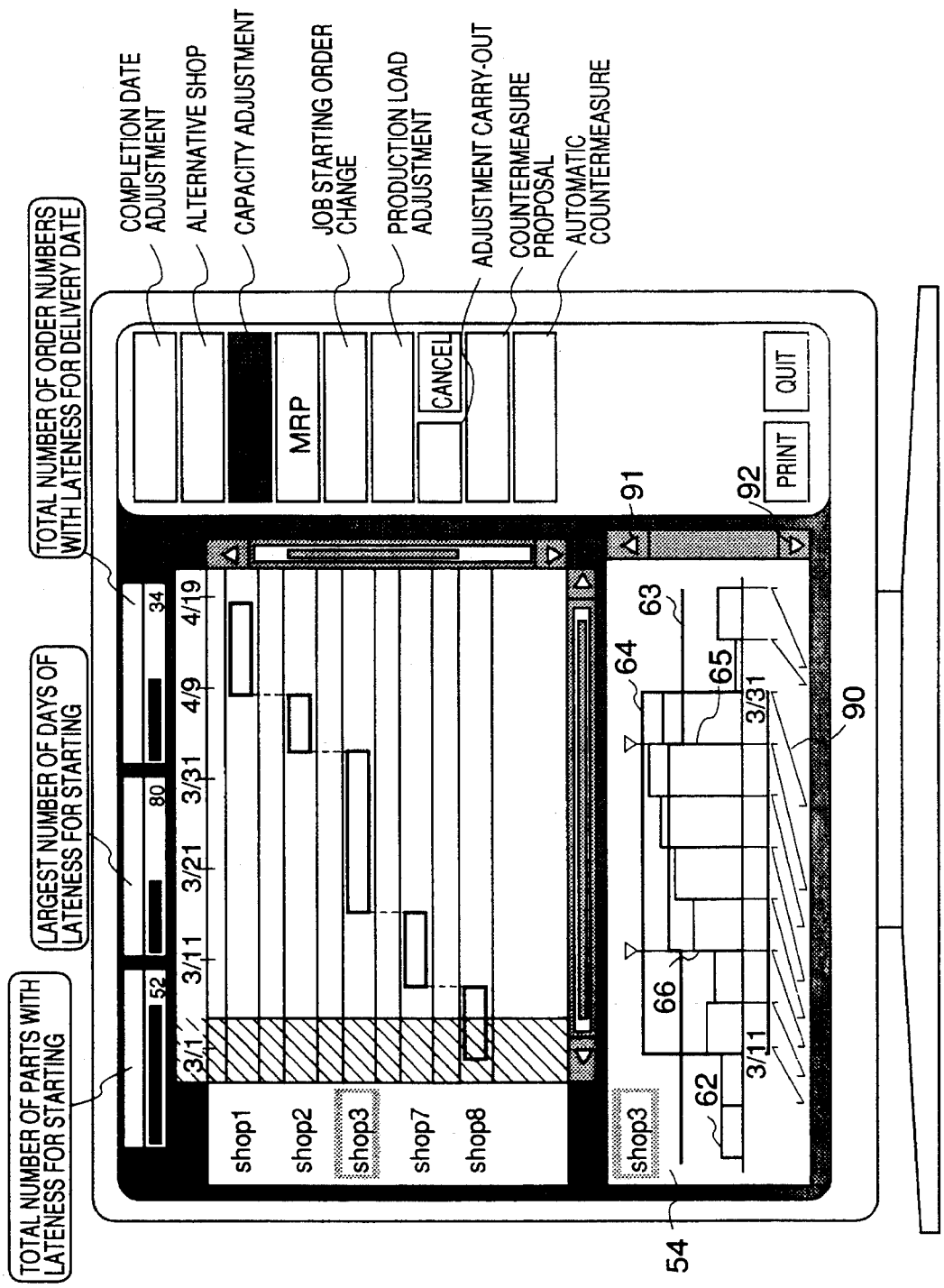
FIG. 10 is a view of another embodiment of a display screen for change in production capacity.

FIG. 10 shows another embodiment of the production capacity display part 54. A feature of this embodiment lies in that a leadtime display part 90, a capacity increase button 91 and a capacity decrease button 92 are provided. In this case, each of the operations ③ and ④ is different from the above. This will be explained.

③' Setting of Production Capacity Change Starting/Finishing Points

A bar graph of the load status 62 is picked by a left button of the mouse to set a production capacity change starting point 64 to the corresponding date, and the bar graph is picked by a right button of the mouse to set a production capacity change finishing point 65 to the corresponding date.

④' Change of Production Capacity

The production capacity of an area between the production capacity change starting point 64 and the production capacity change finishing point 65 is changed by picking the capacity increase button 91 and the capacity decrease button 92 by the mouse.

Figure 11:
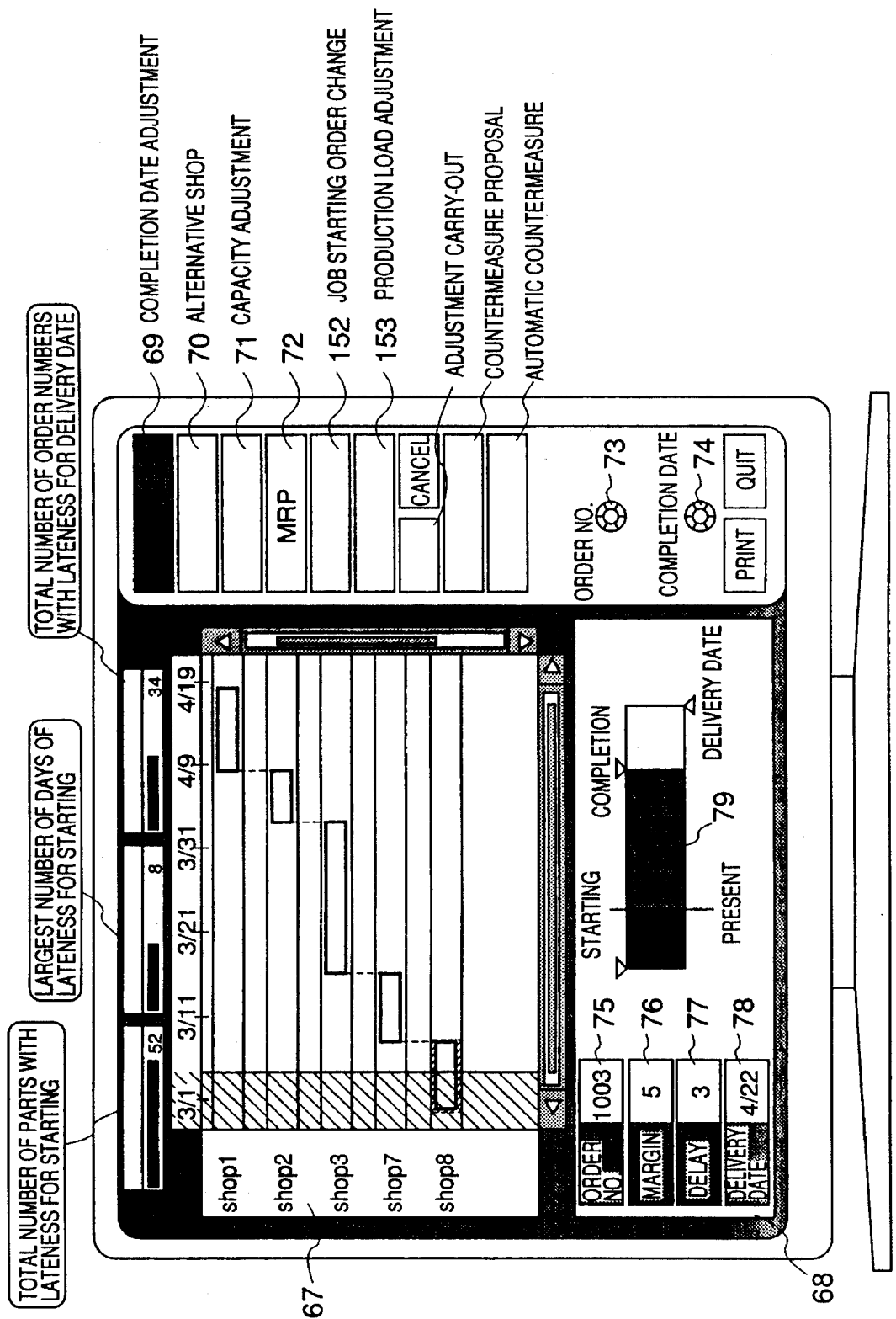
FIG. 11 is a view of an embodiment of a display screen for change in product completion date.

Next, explanation will be made of a method of adjusting a production plan while changing a product completion date. FIG. 11 shows the display screen for change in product completion date.

FIG. 11 includes a problem production chain display part 67, a lateness/margin display part 68, a Completion Date Adjustment Mode Change menu 69, an Alternative Shop Mode Change menu 70, a Capacity Adjustment Mode Change menu 71, a Job Starting Order Adjustment Mode Change menu 152, a Production Load Adjustment Mode Change menu 153, an MRP Calculation Perform Instruction Mode Change menu 72, an order number change dial 73, a completion date change dial 74, and so on. Also, FIG. 10 is activated, for example, in such a manner that the Completion Date Adjustment Mode Change menu 55 shown in FIG. 9 is picked by the mouse.

The problem production chain display part 67 shown in FIG. 11 is equivalent to the problem production chain display part 53 shown in FIG. 9. The lateness/margin display part 68 includes order number display 75, margin display 76, lateness display 78 and lateness/margin bar graph 79.

In the lateness/margin bar graph 79, a black portion between "PRESENT" and "STARTING" represents the number of days by which the starting is late and a white portion between "COMPLETION" and "DELIVERY DATE" represents the number of days by which a margin is afforded.

"DELIVERY DATE" is a delivery date given as an answer to a client and "COMPLETION" is the scheduled date of completion. In the case where a production plan is to be prepared, the scheduled date of product completion is usually or generally set with the delivery date being provided with a certain degree of margin.

Accordingly, for a product which is late for starting, there is a possibility that the lateness for starting can be canceled by allowing the scheduled date of completion to come near the delivery date.

The adjustment of a production plan with the change of the scheduled date of product completion is performed in accordance with the following procedure.

① Selection of Order Number to be Subjected to Change in Completion Date

In the case where a plurality of problematical production chains are displayed, the order number of a product to be subjected to a change in completion date is selected. The order number change dial 73 is picked by the mouse in order to select the order number. The picking by the mouse is such that for example, in the case of a two-button mouse, the order number is increased when a left button of the mouse is picked and increased when a right button of the mouse is picked. In FIG. 11, since only one problematical production chain is displayed, the order number of 1003 becomes the object of change in completion date.

② Change of Completion Date

The completion date is changed by picking the completion date change dial 74. For example, in the case of a two-button mouse, the completion date is advanced (or the display of "COMPLETION" is moved leftward) when a left button of the mouse is picked and the completion date is put back increased (or the display of "COMPLETION" is moved rightward) when a right button of the mouse is picked.

In another embodiment of the completion date changing operation, it is possible to change the completion date by moving (or dragging) the lateness/margin bar graph 79 rightward or leftward in a state in which the bar graph 79 is picked by the mouse.

③ Perform MRP Calculation

The data input/output device 12 outputs a completion date adjust instruction 16 to the completion date adjustment device 5 on the basis of the result of completion date change in ②. The completion date adjustment device 5 outputs the result of completion date adjustment and an MRP calculation perform instruction 23 to the MRP calculation control device 2. The MRP calculation device 2 is inputted with data 28 for MRP calculation from the data retention device 11 and thereafter performs an MRP calculation with the result of completion date adjustment being taken into consideration. The MRP calculation device 2 outputs the result 27 of MRP calculation to the data retention device 11. Also, the MRP calculation control device 2 outputs a work load calculate instruction 25 to the work load calculation device 3 which in turn calculates a work load and outputs the result 26 of calculation to the data retention device 11.

④ Change of Problem Production Chain and Lateness/Margin Display Parts

The date input/output device 12 is inputted the result 21 of MRP calculation from the data retention device 11 to display corrected problem production chain and lateness/margin display parts.

By performing such a procedure as shown by ① to ④, it becomes possible for the person in charge of production planning not only to change a completion date by a simple operation but also to on-line confirm which influence the change in product completion date gives on a production plan.

Figure 12:
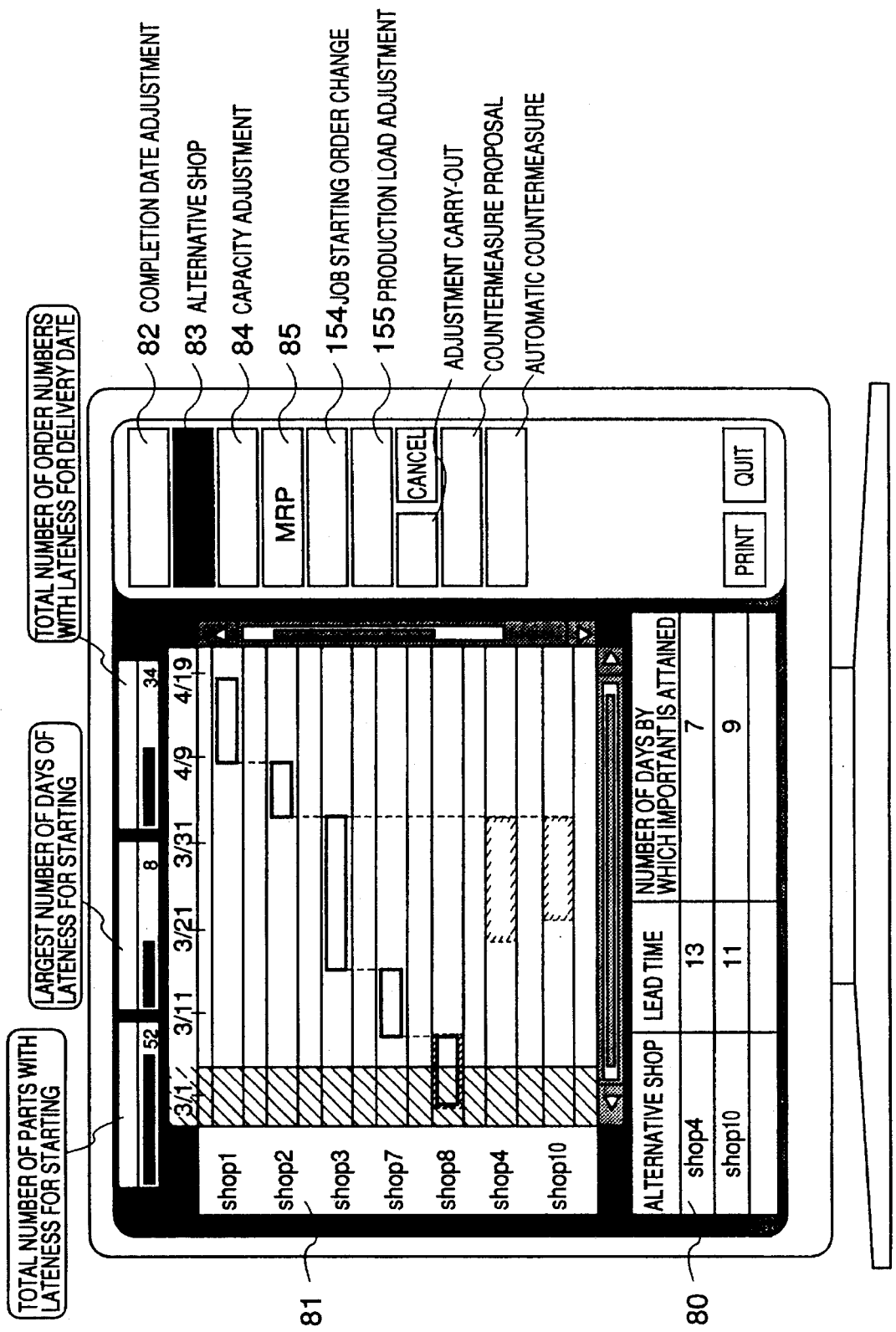
FIG. 12 is a view of an embodiment of a display screen for change in production shop.

Next, explanation will be made of a method of adjusting a production plan while changing a production shop. FIG. 12 shows the display screen for change in production shop.

FIG. 12 includes a problem production chain display part 81, an alternative shop display part 80, a Completion Date Adjustment Mode Change menu 82, an Alternative Shop Mode Change menu 83, a Capacity Adjustment Mode Change menu 84, an MRP Calculation Perform Instruction Mode Change menu 85, and so on. Also, FIG. 12 is activated, for example, in such a manner that the Alternative Shop Mode Change menu 56 (or 70) shown in FIG. 9 (or 11) is picked by the mouse. The problem production chain display part 81 is equivalent to the problem production chain display part 53 shown in FIG. 9. On the alternative shop display part 81 are displayed a group of alternative shops capable of performing a work equivalent to any process in the problematical production chain when that process is selected, a leadtime in each alternative shop and the number of days by which the improvement is attained, that is, the number of days by which the leadtime is shortened, when each alternative shop is employed.

Accordingly, in the case where an alternative shop exists for any process in a problematical production chain, there is a possibility that the lateness for starting can be canceled by employing the alternative shop.

The adjustment of a production plan with the change of a production shop is performed in accordance with the following procedure.

① Selection of Process to be Subjected to Change in Production Shop

A process in the problem production chain display part 81 to be subjected to a change in production shop is picked by the mouse. For example, a portion of shop 3 enclosed by solid line in FIG. 12 is picked by the mouse. In the case where an alternative shop exists, the alternative shop display part 80 is displayed.

The alternative shop is displayed on the problem production chain display part 81 too, in accordance with such a format as shown in FIG. 12.

② Selection of Alternative Shop

An alternative shop is selected by picking each shop name on the alternative shop display part 80.

③ Perform MRP Calculation

The data input/output device 12 outputs an alternative shop adjust instruction 17 to the alternative shop adjustment device 6 on the basis of the result of alternative shop selection in ②. The alternative shop adjustment device 6 outputs the result of alternative shop adjustment and an MRP calculation perform instruction 24 to the MRP calculation control device 2. After inputted with data 28 for MRP calculation from the data retention device 11, the MRP calculation device 2 performs an MRP calculation with the result of alternative shop adjustment being taken into consideration and outputs the result 27 of calculation to the data retention device 11. Also, the MRP calculation control device 2 outputs a work load calculate instruction 25 to the work load calculation device 3 which in turn calculates a work load and outputs the result 26 of calculation to the data retention device 11.

④ Change of Problem Production Chain Display Part

The data input/output device 12 is inputted with the result 21 of MRP calculation from the data retention device 11 to display a corrected problematical production chain after employment of the alternative shop.

By realizing such functions as shown by ① to ④, it becomes possible the person in charge of production planning not only to change a production shop by a simple operation but also to on-line confirm which influence the change in production shop gives on a production plan.

Figure 13:
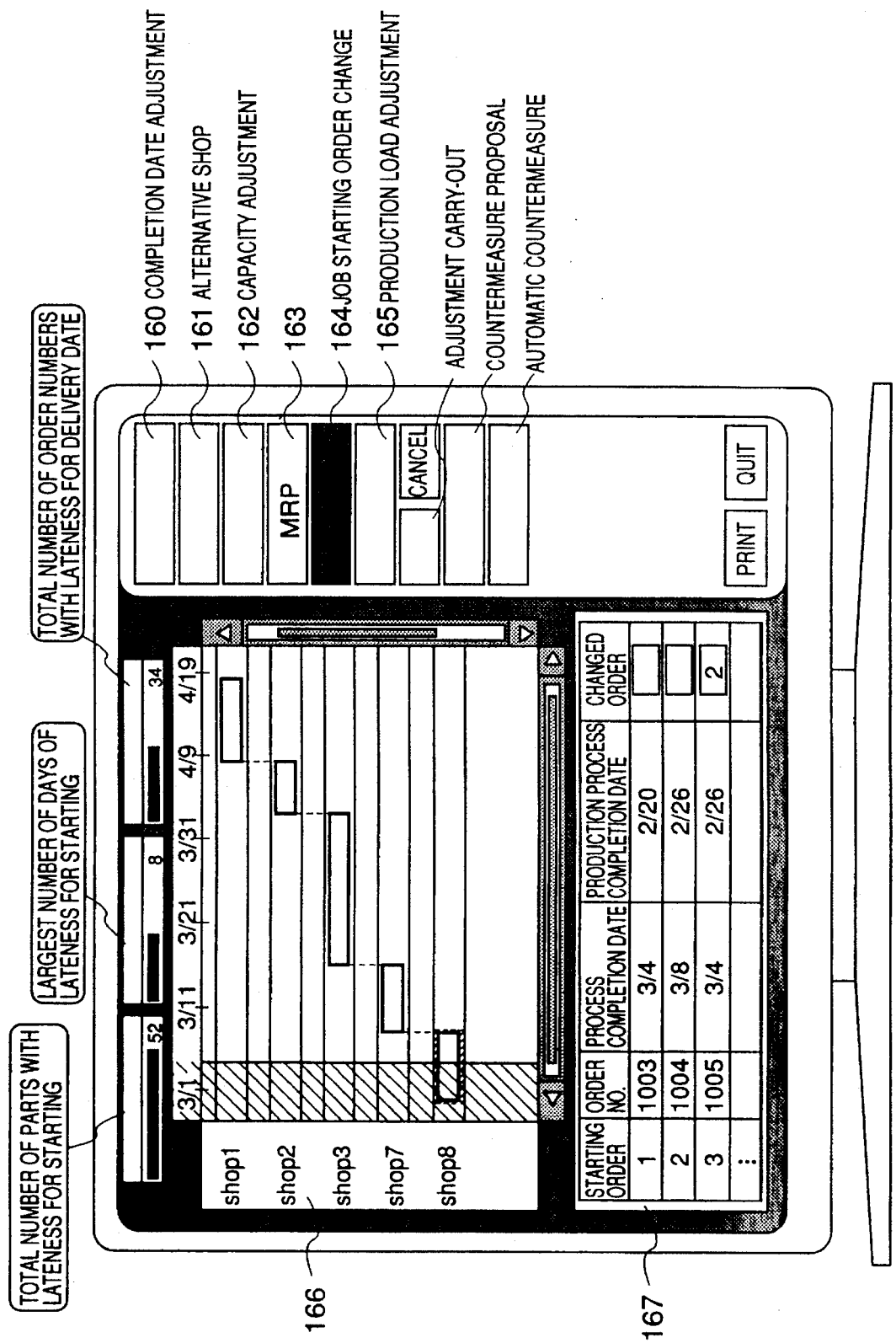
FIG. 13 is a view of an embodiment of a display screen for change in job starting order.

Next, explanation will be made of a method of adjusting a production plan while changing a job starting order. FIG. 13 shows the display screen for change in job starting order.

FIG. 13 includes a problem production chain display part 166, a starting order change display part 167, a Completion Date Adjustment Mode Change menu 160, an Alternative Shop Mode Change menu 161, a Capacity Adjustment Mode Change menu 162, a Job Starting Order Adjustment Mode Change menu 163, a Production Load Adjustment Mode Change menu 164, an MRP Calculation Perform Instruction Mode Change menu 165, and so on. Also, FIG. 13 is activated, for example, in such a manner that the Job Starting Order Adjustment Mode Change menu 150, 152 or 154 shown in FIG. 9, 11 or 12 is picked by the mouse.

The problem production chain display part 166 shown in FIG. 13 is equivalent to the problem production chain display part 53 shown in FIG. 9. On the starting order change display part 167 are displayed any process in the problematical production chain when that process is selected, a job starting order for order numbers for which a work is to be done in a period, a process completion date for each order number, and an item for inputting a change in starting order.

Accordingly, for a product for which the lateness for starting is generated, there is a possibility that the lateness for starting can be canceled by raising the priority of starting of that product.

The adjustment of a production plan with the change of a job starting order is performed in accordance with the following procedure.

① Selection of Order Number to be Subjected to Change in Job Starting Order

A process in the problem production chain display part 166 to be subjected to a change in job starting order is picked by the mouse. For example, a portion of shop 3 enclosed by solid line in FIG. 13 is picked by the mouse. As a result, such a starting order change display part 167 as shown in FIG. 13 is displayed on the screen.

② Change of Job Starting Order

For that order number in a group of product order numbers displayed in the starting order change display part 167 which is subjected to a change in starting order, a changed starting order is inputted into the changed order input item. For example, in FIG. 13, a starting order 2 is inputted into the changed order input item of the order number 1005 of the starting order 3 in order to turn the starting order of that order number into the starting order 2.

③ Perform MRP Calculation

The data input/output device 12 outputs a job starting order adjust instruction 31 to the job starting order adjustment device 33 on the basis of the result of job starting order change in ②. The job starting order adjustment device 33 outputs the result of job starting order adjustment and an MRP calculation perform instruction 23 to the MRP calculation control device 2. After inputted with data 28 for MRP calculation from the data retention device 11, the MRP calculation device 2 performs an MRP calculation with the result of job starting order adjustment being taken into consideration and outputs the result 27 of calculation to the data retention device 11. Also, the MRP calculation control device 2 outputs a work load calculate instruction 25 to the work load calculation device 3 which in turn calculates a work load and outputs the result 26 of calculation to the data retention device 11.

④ Change of Problem Production Chain Display Part

The data input/output device 12 is inputted with the result 21 of MRP calculation from the data retention device 11 to display a corrected problem production chain display part 166.

By performing such a procedure as shown by ① to ④, it becomes possible for the person in charge of delivery date estimation not only to change a job starting order by a simple operation but also to on-line confirm which influence the change in job starting order gives on a production plan.

Figure 14:
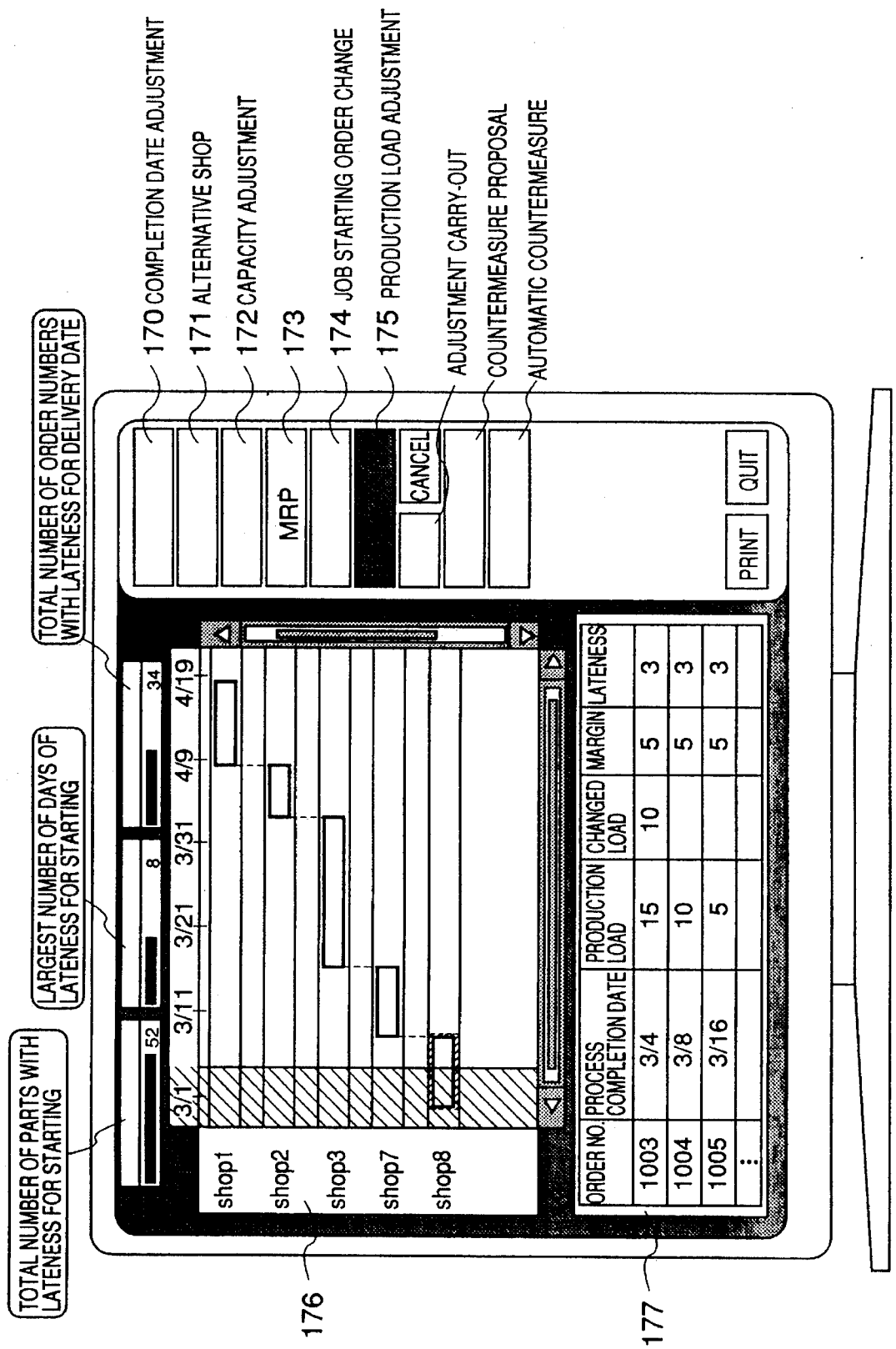
FIG. 14 is a view of an embodiment of a display screen for change production load.

Next, explanation will be made of a method of adjusting a production plan while changing a production load. FIG. 14 shows the display screen for change in production load.

FIG. 14 includes a problem production chain display part 176, a production load change display part 177, a Completion Date Adjustment Mode Change menu 170, an Alternative Shop Mode Change menu 171, a Capacity Adjustment Mode Change menu 172, a Job Starting Order Adjustment Mode Change menu 173, a Production Load Adjustment Mode Change menu 175, an MRP Calculation Perform Instruction Mode Change menu 174, and so on. FIG. 14 is activated, for example, in such a manner that the Production Load Adjustment Mode Change menu 150, 152, 154 or 164 shown in FIGS. 9, 11, 12 or 13 is picked by the mouse.

The problem production chain display part 176 shown in FIG. 14 is equivalent to the problem production chain display part 53 shown in FIG. 9. On the production load change display part 177 are displayed order numbers for which a work is to be done in any process in the problematical production chain when that process is selected. Further, a process completion date, a production load, a margin and the lateness are displayed for each order number.

The adjustment of a production plan with the change of a production load is performed in accordance with the following procedure.

① Selection of Process to be Subjected to Production Load Adjustment

A process in the problem production chain display part 176 to be subjected to a change in production load is picked by the mouse. For example, if a portion of shop 3 enclosed by solid line in FIG. 13 is picked by the mouse, a format shown by the production load change display part 177 is displayed and an alternative shop is displayed on the problem production chain display part 176 in accordance with such a format as shown in FIG. 14.

② Change of Production Load

For that order number in a group of product order numbers displayed in the production load change display part 177 which is subjected to a change in production load, a changed load is inputted into an item for changed order of production load. For example, in FIG. 14, the changed load of 10 is inputted into the changed load item of the order number 1003 in order to change the production load of that order number from 15 to 10.

③ Perform MRP Calculation

The data input/output device 12 outputs a production load adjust instruction 34 to the production load adjustment device 40 on the basis of the result of production load change in ②. The production load adjustment device 40 outputs the result of production load adjustment and an MRP calculation perform instruction 39 to the MRP calculation control device 2. After inputted with data 28 for MRP calculation from the data retention device 11, the MRP calculation device 2 performs an MRP calculation with the result of production load adjustment being taken into consideration and outputs the result 27 of calculation to the data retention device 11. Also, the MRP calculation control device 2 outputs a work load calculate instruction 25 to the work load calculation device 3 which in turn calculates a work load and outputs the result 26 of calculation to the data retention device 11.

④ Change of Problem Production Chain Display Part

The data input/output device 12 is inputted with the result 21 of MRP calculation from the data retention device 11 to display a corrected problem production chain display part 176.

By realizing such functions as shown by ① to ④, it becomes possible for the person in charge of delivery date estimation not only to change a production load by a simple operation but also to on-line confirm which influence the change in production load gives on a production plan.

Figure 15:
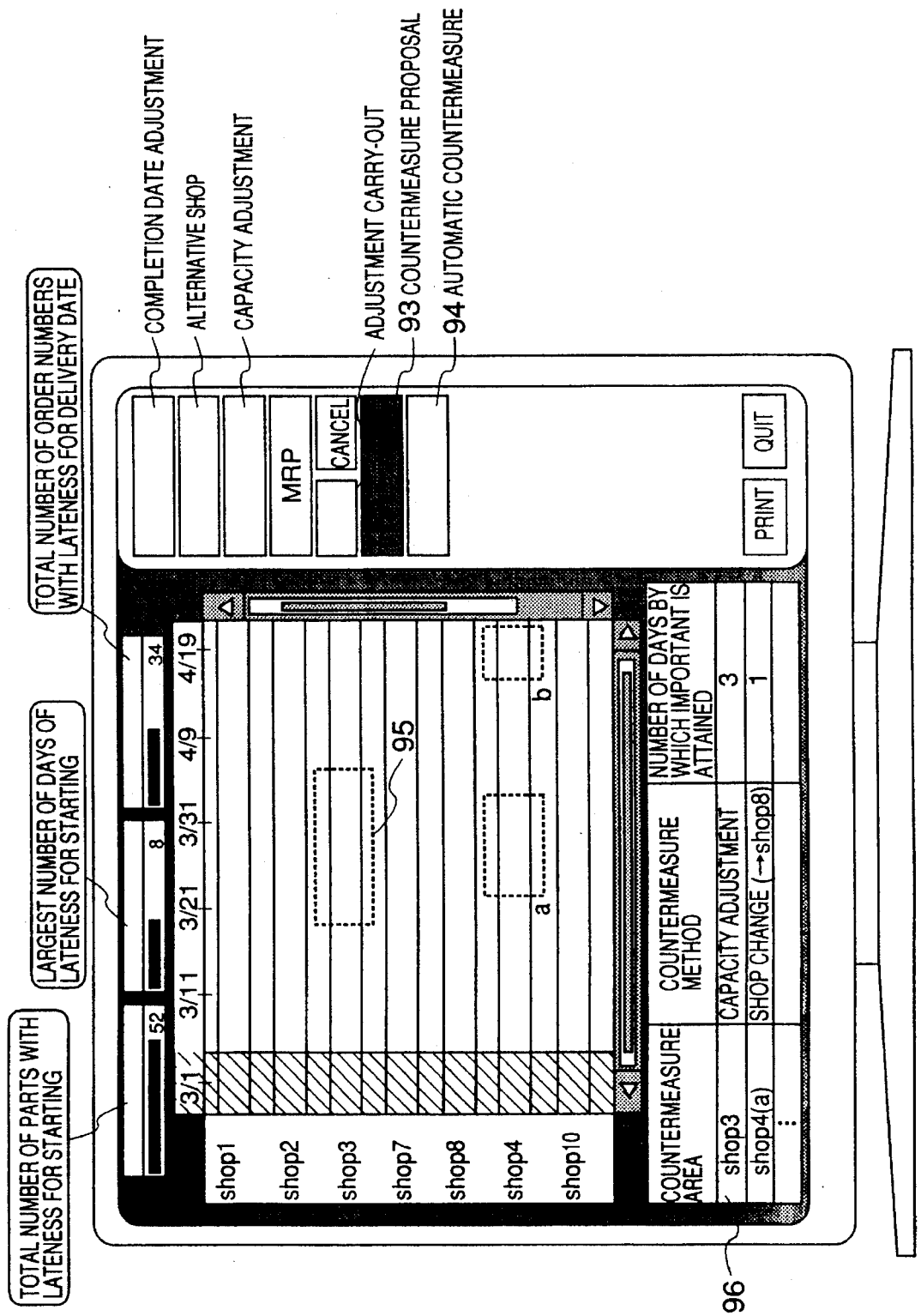
FIG. 15 is a view of an embodiment of a display screen for aid in countermeasure.

Next, a plan adjusting function will be explained by use of FIG. 15. When a countermeasure proposal button 93 is picked, the data input/output device 12 sends an adjustment device input 35 to the production plan adjustment device 10. The production plan adjustment device 10 is inputted with data for adjustment to search for an effective countermeasure area/countermeasure method and sends an adjustment device output 36 to the data input/output device 12. The data input/output device 12 displays a countermeasure proposal area 95 and a list 96 of countermeasure methods, as shown in FIG. 15. When the countermeasure proposal area 95 or the countermeasure method list 96 is picked, a corresponding countermeasure mode is activated. Also, it is possible to have the production plan adjustment device 10 possess a function of checking whether or not a countermeasure unacceptable due to the physical restriction of a factory and so on is taken.

Next, an automatic countermeasure function will be explained. An automatic countermeasure button 94 shown in FIG. 15 is picked, the data input/output device 12 sends an adjustment device input 35 to the production plan adjustment device 10. The production plan adjustment device 10 searches for an effective countermeasure area/countermeasure method, controls the production capacity adjustment device 4, the completion date adjustment device 5 and the alternative shop adjustment device 6 to take a countermeasure and sends an adjustment device output 36 to the data input/output device 12 for updating of display.

Finally, the principle of the leadtime forecasting device 1 will be explained. An object of the leadtime forecasting device 1 is to determine a shop leadtime from daily completion work load data of each shop with the set capacity of the shop taken into consideration so that a reasonable manufacturing process control can be made.

One example of the principle of the leadtime forecasting device used in the system of the present embodiment will be shown in the following.

In a flow shop, a tact time peculiar to a line exists, and there are the optimum production rate and the optimum leadtime per one item. In a job shop, it is well known from the previous studies with a queuing theory or the like that an average leadtime per one job increases in substantial proportion to the number of commencements in a shop whereas a production rate (or a cycle time) is saturated at a certain level or does not increase even with an increase in number of commencements. This fact shows that the optimum commencement level and hence the optimum production rate exist or even if a job is inputted beyond the optimum production rate, a leadtime per one item is merely increased but an increase in production rate is little.

The above-mentioned object is achieved by setting a leadtime for MRP calculation with which the maintenance of the optimum production rate is possible. The procedure of calculation in a leadtime setting method proposed by the delivery date estimating system of the present embodiment will be explained on the basis of FIGS. 16 to 20.

Figure 16:
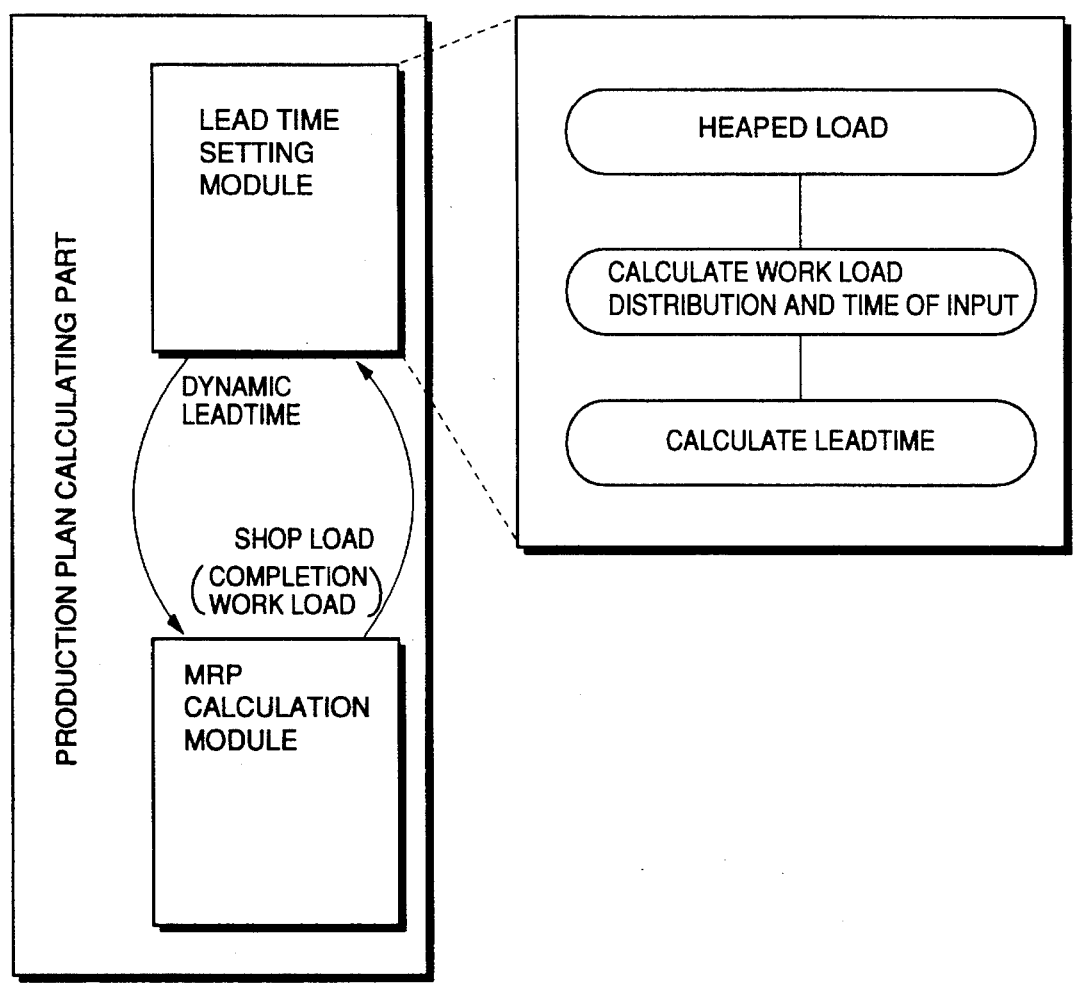
FIG. 16 is a diagram showing the basic concept of a leadtime forecasting method.
Figure 17:
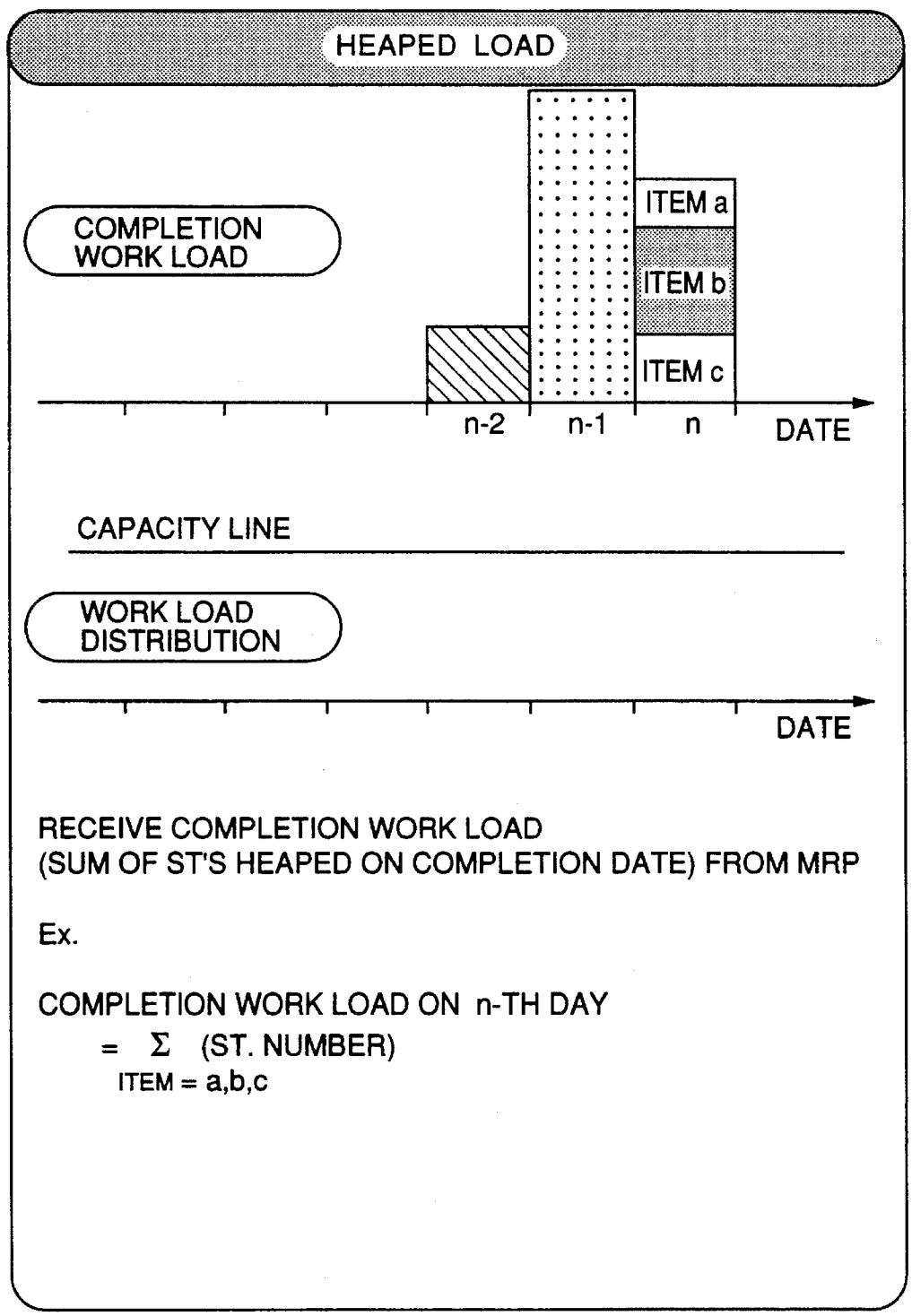
FIG. 17 is a diagram showing the procedure (a) of an embodiment of a leadtime forecasting method.
Figure 18:
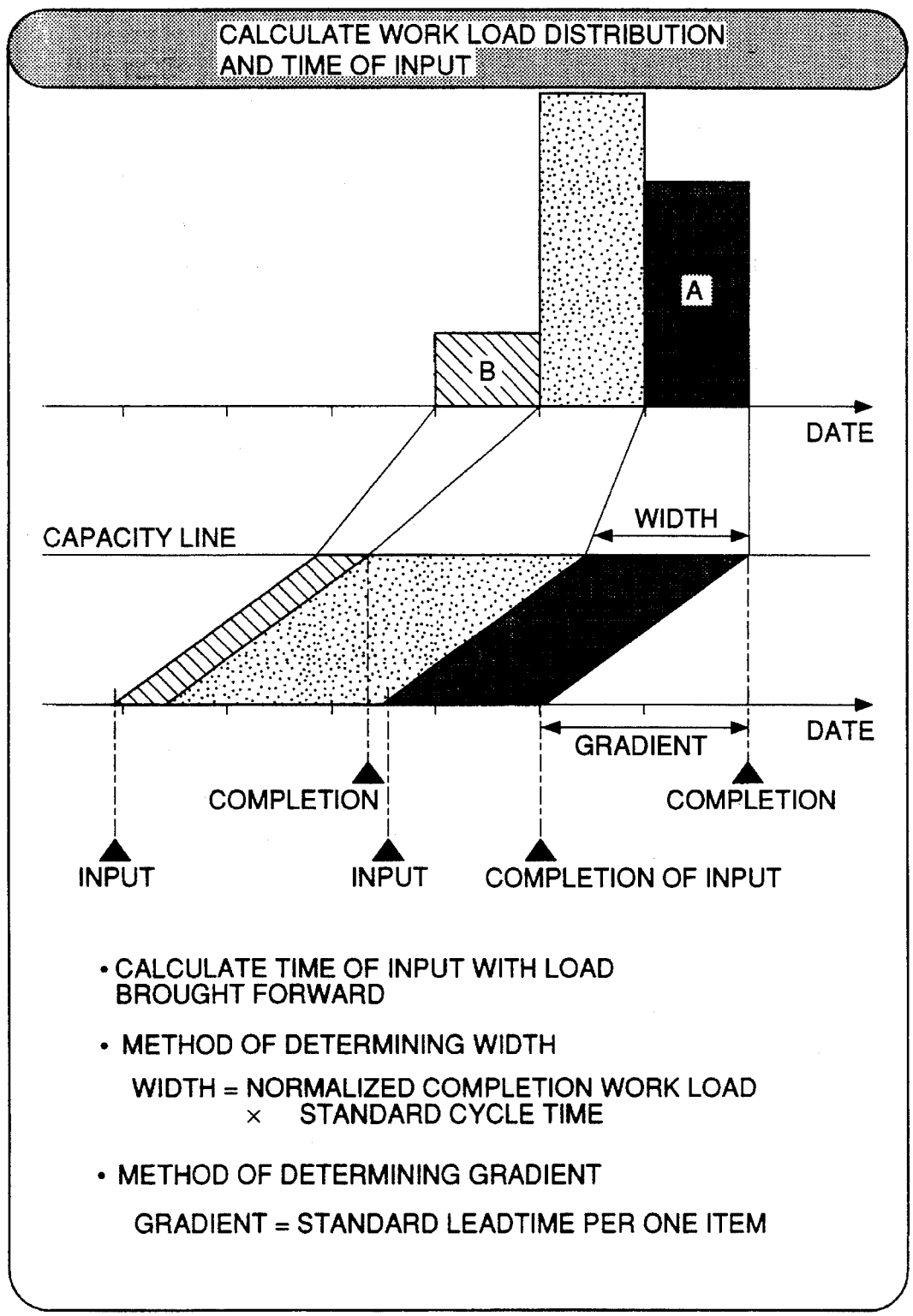
FIG. 18 is a diagram showing the procedure (b) of the embodiment of a the leadtime forecasting method.
Figure 19:
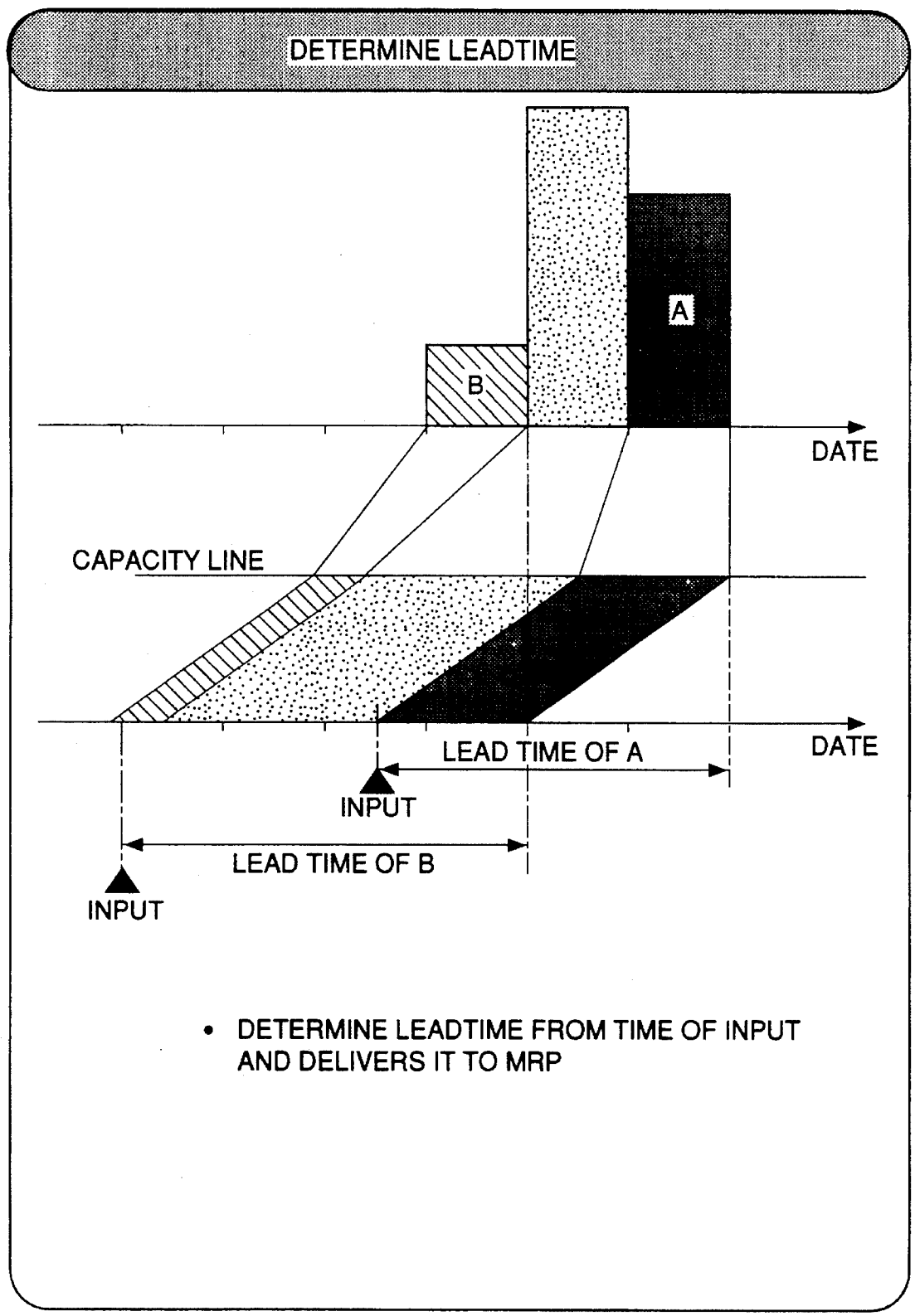
FIG. 19 is a diagram showing the procedure (c) of the embodiment of the leadtime forecasting method.

FIG. 16 is a diagram showing the basic concept of one embodiment, and FIGS. 17 to 19 are diagrams for respective procedures.

Now, a cycle time (input interval=output interval) and a leadtime per one item at the optimum production rate is already known as important parameters for each shop. As shown in FIG. 17, data first given to a leadtime setting module is a daily completion work load and a daily set capacity of a shop made an object. Here, it should be noted that the completion work load is not a work load (such as a load heap generally used in CRP) averaged over a manufacturing period but the sum of ST's heaped on a completion date.

A process of calculating a work load distribution and the time of input from the above data is shown in FIG. 18. This calculation process is a process in which the work load distribution is determined while bringing a load forward in a direction from the future to the past in order to keep a matching with MRP. For example, the work load distribution of a group A of items to be completed on the n-th day is determined as follows. First, a completion time instant, that is, the time instant of output of the last work is set such that it coincides with the end of a completion date. Next, a width between the time instant of output of the first work and the time instant of output of the last work is determined as a normalized completion work load multiplied by a standard cycle time to determine the time instant of output of the first work. The subtraction of a leadtime per one item from the determined time instant of output of the first work gives the time instant of input of the first work, that is, the time instant of starting of A. However, in a case such as B or in the case where there is a shifted intrusion of the time instant of output of the first work of a group of items to be completed on the next day, the time instant of completion of B is set such that it coincides with this instant of time.

The completion work load used in the above is a normalized value obtained by dividing the sum of ST's by a standard ST (or that average value of ST's of items to be worked at the corresponding shop which is weighted by a standard work/quantity ratio). The cycle time is that average value of cycle times of items to be worked at the corresponding shop which is weighted by the standard work/quantity ratio). The leadtime per one item is that average value of leadtimes per one item for items to be worked at the corresponding shop which is weighted by the standard work/quantity ratio).

Next, as shown in FIG. 19, an interval between the time instant of input of the first work and the time instant of end of the completion date is determined as a leadtime used in MRP. Therefore, in the case where there is a shifted intrusion of a work for items to be completed on and after the next day, the set leadtime is correspondingly increased.

Figure 20:
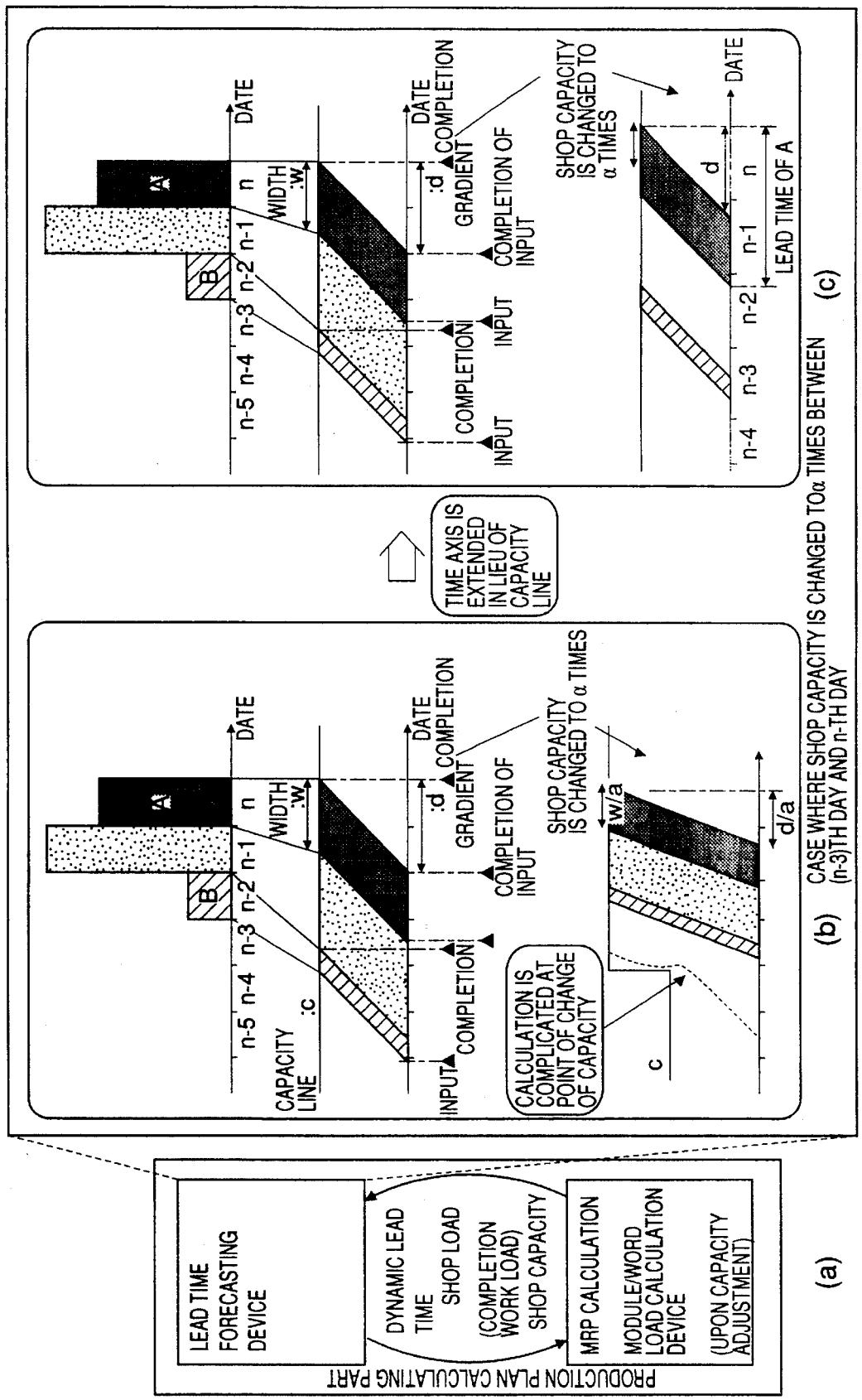
FIG. 20 is a diagram showing the basic concept (a) of the leadtime forecasting method and the procedures (b) and (c) of other embodiments of the leadtime forecasting method.

FIG. 20 is a diagram showing an embodiment of a calculation procedure in a leadtime setting method in the case where the set shop capacity changes every day. When the capacity is changed to $\alpha$ times, the width and the gradient can be changed to $1/\alpha$, as shown in FIG. 20(b). In this case, however, a complicated calculation is involved at the point of change of the capacity. Therefore, a calculation as shown in FIG. 20(c) is employed. Namely, an increase of the capacity to $\alpha$ times can be regarded as the extension of a time axis by $\alpha$ times and hence the determination of a work load distribution and the reading of a leadtime are made on the extended time axis.

In this manner, it becomes possible to determine a shop leadtime from daily completion work load data of each shop with the set capacity of the shop taken into consideration so that a reasonable manufacturing process control can be made.

As apparent from the above, parameters for forecast are required in order to use the leadtime forecasting device 1. The forecast parameters include ST, the cycle time and the leadtime per one item. Predetermined values can be set for those parameters. Alternatively, a forecast parameter determination device 97 may be added to the production planning system of the present embodiment so that accurate forecast parameters 99 are obtained by performing re-calculation always on the basis of actual production data obtained from a manufacturing system and are supplied to the leadtime forecasting device 1.

It is also possible to use a pattern conversion model such as a neutral network as another embodiment of the leadtime forecasting device.

Since the neutral network has the capability of pattern conversion between input data and output data and the capability of pattern learning, it is possible to forecast (or determine through pattern conversion) a leadtime and a work load for a new input by having a leadtime forecasting device or a work load forecasting device learn each neutral network by use of, for example, the following data:

input: production capacity, work load output: leadtime.

The details of a neutral network theory is described by Remelhart D. E., McClelland J. L., and The PDP Research group, 1986, Parallel Distributed Processing: MIT Press.

Also in the case where a neutral network is used as a model of the leadtime forecasting device 97, forecast parameters are required. The forecast parameters are a set of values of strength of coupling between cells of the neutral network. It is necessary to add the forecast parameter determination device 97 to the production planning system of the present embodiment so that a neutral network is learned on the basis of the actual production data 98 obtained from the manufacturing system to forecast parameters 99 which are in turn supplied to the leadtime forecasting device 1.

In the following, a second embodiment of the present invention will be explained referring to FIGS. 21 to 50.

Figure 21:
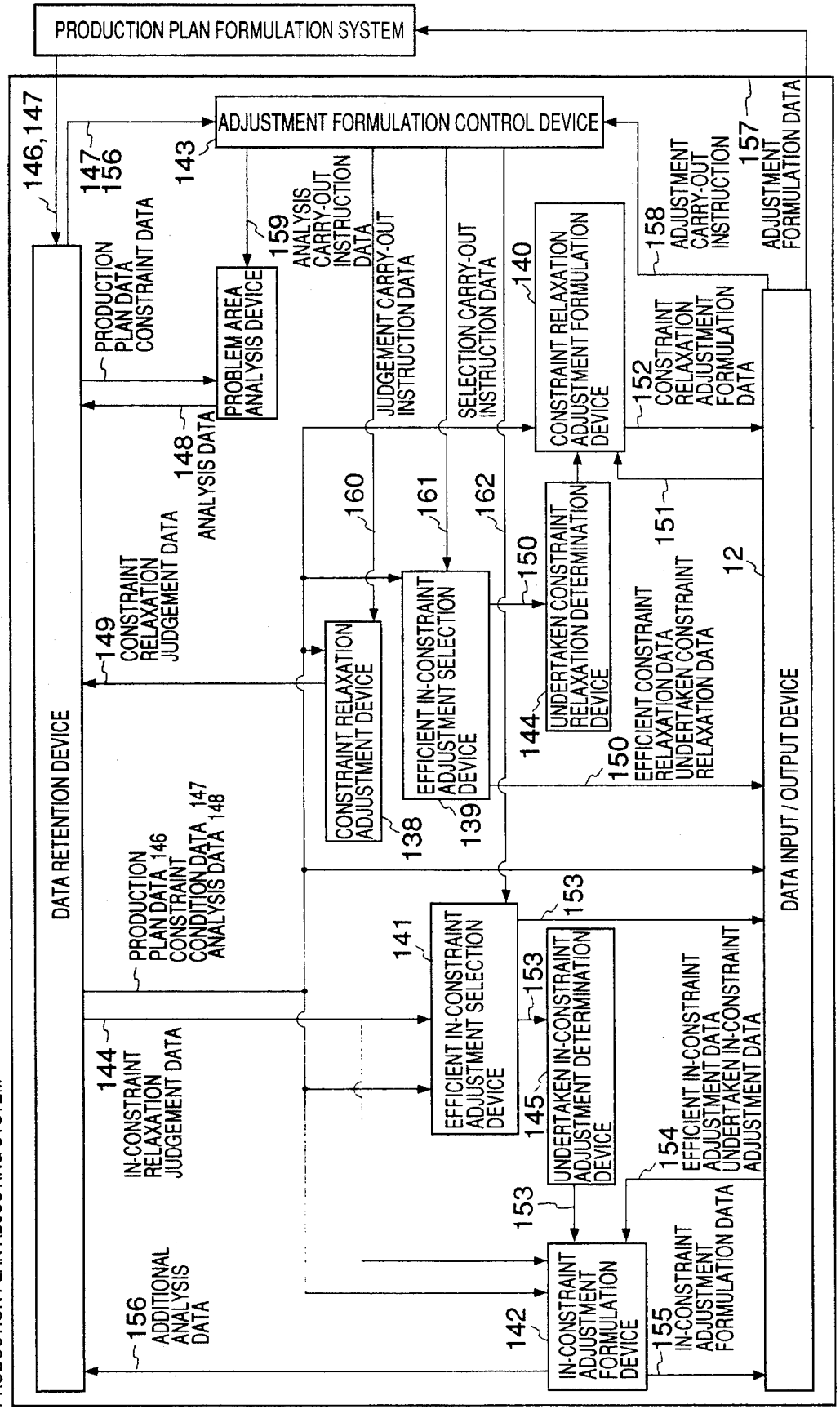
FIG. 21 is a block diagram for explaining an example of the construction of a production plan adjustment device or a production plan adjusting system.
Figure 25:
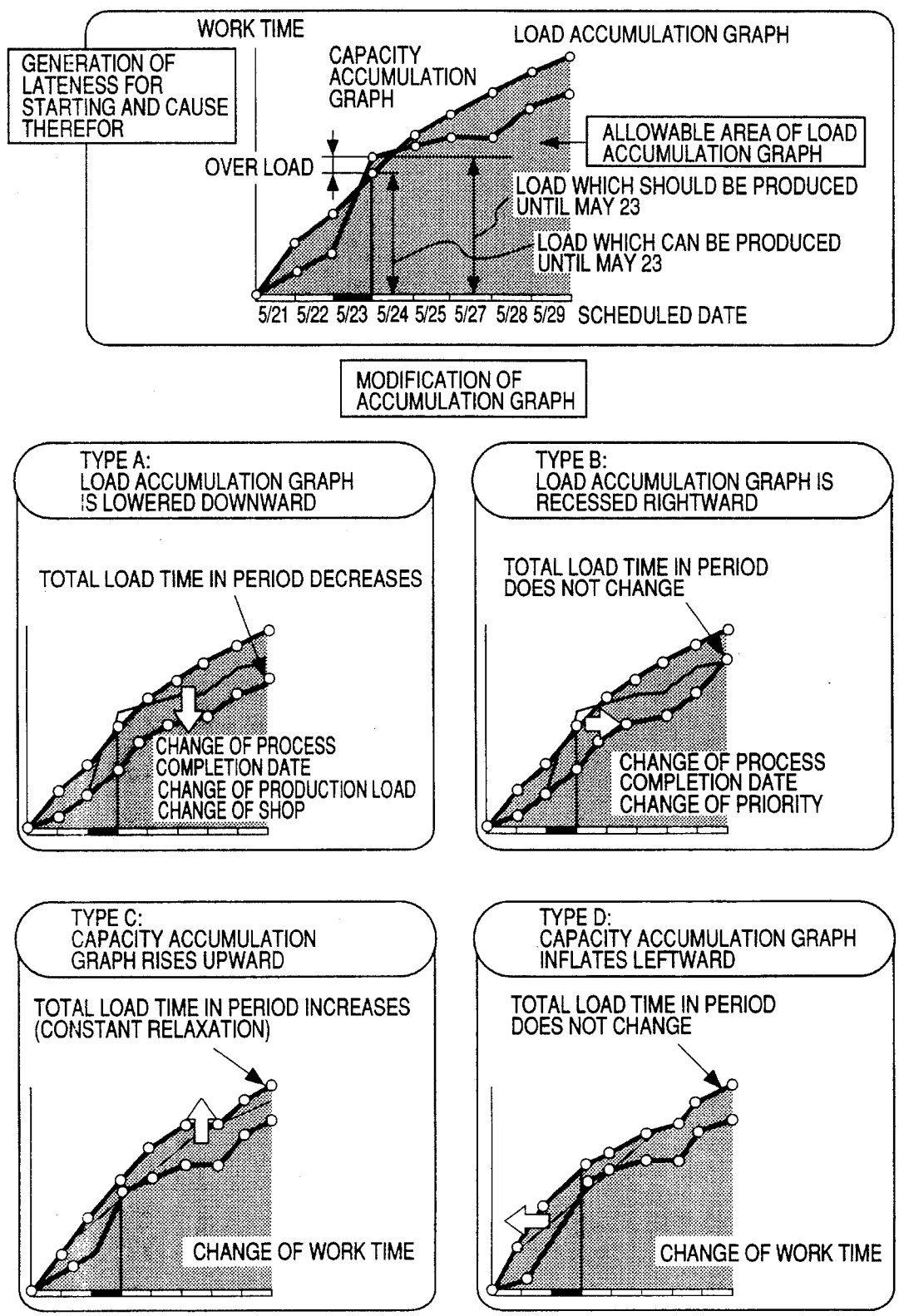
FIG. 25 is a diagram for explaining the generation and cancellation of the lateness for starting.

FIG. 21 is a block diagram showing a second embodiment of a production plan adjusting system according to the present invention.

The present system includes a problem area analysis device 137, a constraint relaxation judgement device 138, an efficient constraint relaxation selection device 139, a constraint condition relaxation adjustment formulation device 140 (or a device for formulating adjustments based on the relaxation of constraint conditions), an efficient in-constraint adjustment selection device 141 (or a device for selecting efficient adjustments within constraints), an in-constraint adjustment formulation device 142 (or a device for formulating adjustments within constraints), a data retention device 11, a data input/output device 12, an adjustment formulation control device 143, an undertaken constraint relaxation determination device 144 (or a device for determining constraint relaxation to be undertaken) and an undertaken in-constraint adjustment determination device 145 (or a device for determining adjustments to be undertaken within constraints).

First, the basic concept of a production plan according to the present embodiment will be explained briefly. In the present embodiment, for example, a production process as shown in FIG. 22 is made an object.

Namely, the production process is composed of many processes each of which has a plurality of production lines, and the production lines include ones which are alternative to each other. In the following, each production line is termed "shop" and a group of shops belonging to one process is termed "shop group".

One shop group corresponds to one process and further corresponds to one part in a parts construction diagram. Corresponding to the completion of a product with a progression from a working process to an assembling process, a shop group of a working process and a shop group of an assembling process are termed "upper stream" shop group and "lower stream" shop group, respectively.

Further, corresponding to the definition of a "parent/child relationship" between parts in the parts construction diagram, a "parent/child relationship" is defined between shop groups.

In this case, the consideration of various matters in a direction from parent to child concerning a production plan is termed "explosion" and that in a reverse direction is termed "reverse explosion".

For example, in FIG. 22, a "parent" shop group for Shop Gr. 5 (or a shop group for an HG assembling process) is Shop Gr. 1 (or a shop group for the final assembling process), and a "child" shop group for Shop Gr. 5 (or the shop group for the HG assembling process) is Shop Gr. 6 (or a shop group for an HC working process) and Shop Gr. 7 (or a shop group for a CS working process).

Generally, since a parts construction diagram is formed by a tree structure, one parent shop group exists always and a plurality of child shop groups may exist.

Whether or not each shop belonging to one shop group is alternative, is different for each part (or item) manufactured by that shop group.

For example, assume that a "by-item alternative shop list" shown in FIG. 23 is provided.

In the list, shop 8 and shop 9 are not alternative to each other in the case where attention is directed to item SHa but are alternative to each other in the case where attention is directed to item SHc.

Next, explanation will be made of a production plan and a constraint condition which are made an object by the system according to the present embodiment.

Figure 36:
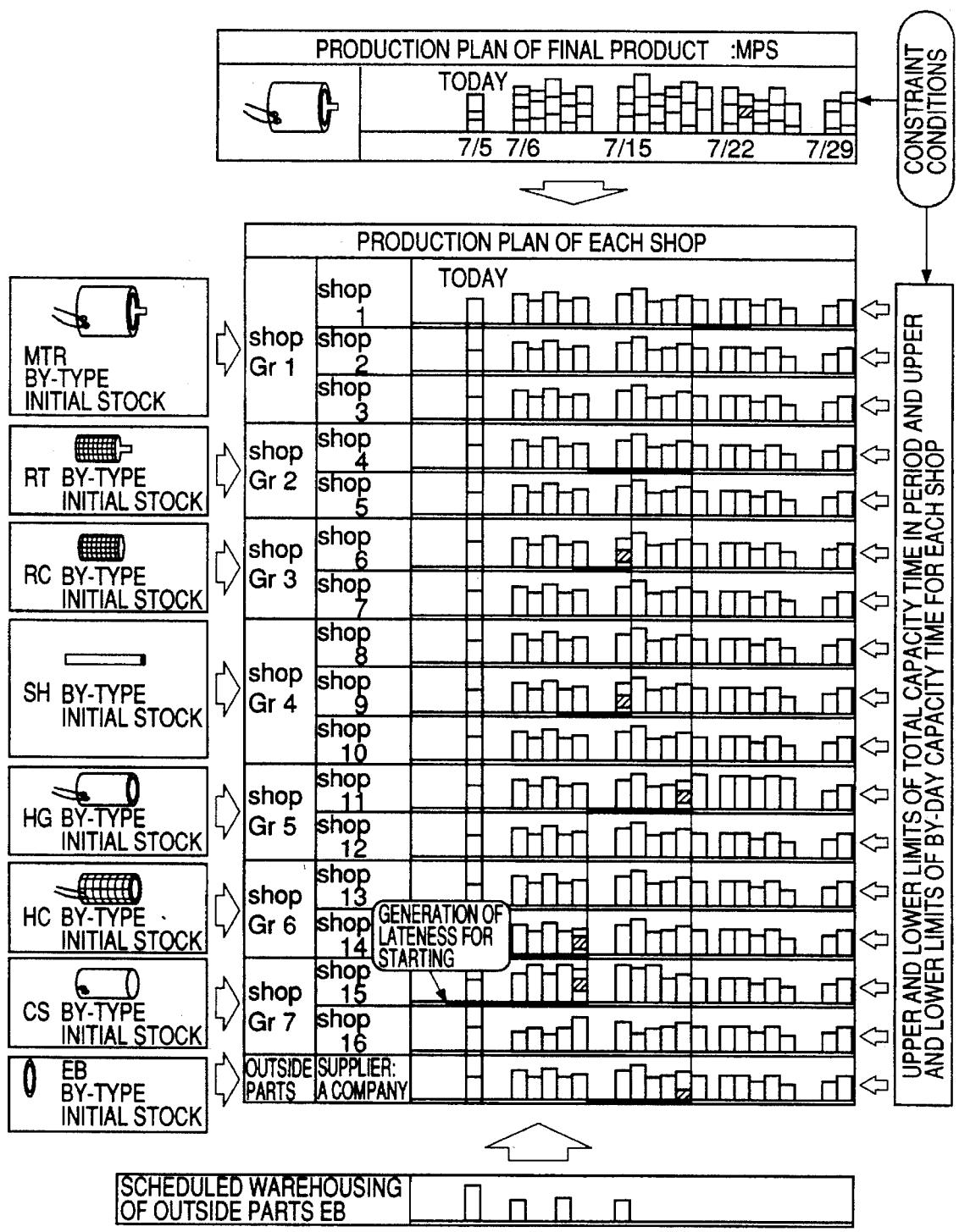
FIG. 36 is a diagram for explaining a production plan made an object.

A general drawing is shown in FIG. 36. The term of a production plan generally used is equivocal since it is used for both a production plan for the final product and a production plan at each shop.

Here, it is assumed that the term of a production plan is used to mean a production plan at each shop and indicates the heaped states of load and capacity of all shops for each production time bucket in a production process.

The "production time bucket" means the minimum time unit taken in formulating a production plan. For example, provided that one production time bucket at a certain shop is three days, a load and a capacity for three days are designated in a production plan of that shop every three days but no designation is made as to when what is manufactured at which order in the time bucket.

In other words, there may be employed a construction in which the present production planning system formulates a plan for each time bucket whereas a sub-daily planning system at a lower level than the production planning system formulates a plan in the time bucket.

For simplification, the following explanation will be advanced on the assumption that one production time bucket is one day. In the following, a "heaped load" means the accumulating total of loads heaped at the unit of time on a so-called "process completion date" when production should be completed or finished.

More particularly, the heaped load is a value obtained by calculating the quantity of multiplication of "ST (standard time: time required for producing a certain item) for each item by "the number of those items" for each job and heaping those quantities on a day when production should be completed (or a process completion date). Also, the priority is provided to each job. In the case where a plurality of jobs are heaped on the same day, it is assumed that the jobs are heaped in accordance with the priority.

On the other hand, the "heaped state of capacity" means the accumulation of work times every day which times are taken on that day.

Here, it should be noted that the "heap of load" is the mere accumulation into a heap on a day when production should be completed (or a process completion date) and hence a starting date of each job and a production process completion date thereof (or a day when production for that job is completed) cannot be known at all from only information of the heap of load.

The starting date and the production process completion date for each job are first ascertained by taking both the heap of capacity and the heap of load into consideration. In other words, the preparation of the heap of load means to merely "heap loads" whereas the preparation of capacity and the determination of a starting date and a production process completion date for each job correspond to the "demolishment of a heaped load".

More particularly, a production plan formulated in accordance with an MRP (Material Requirement Planning or Material Resource Planning) system is supposed in the present embodiment.

One example of a data table of production plan data 146 is shown by the right portion of FIG. 37.

The production plan data includes two data tables. One of the two data tables is a table lined with records termed "MRP records" each of which is provided with a consecutive number called "MRP record number (MRP No.)". When explosion is made from parent parts to child parts, an MRP record is made up for each part. On the MRP record are described an item code, the name of a shop subjected to the accumulation into a heap, a completion date, a starting date, a production load, the MRP No. of parent parts of the corresponding parts, the MRP No. of child parts of the corresponding parts, and so on. In other words, the MRP record is a work instruction in manufacturing the corresponding parts.

The other table is a table of production plans of respective shops and is termed "shop production plan record". Dates in a period, a capacity (or work time) of each date and the heap of load when each date is taken as a process completion date, are described on the shop production record for each shop.

In the case of outside products or parts, dates in a period, the scheduled number of parts to be warehoused on each date and the heap in number of parts required on each date are described with a connection or supplier being regarded as one shop. The heap of load or the heap in number of required parts in the case of outside parts is represented as a list of MRP No's of MRP records having the corresponding date as a process completion date. It is assumed that the MRP records are arranged in order of priority from a higher one to a lower one.

As constraint conditions in formulating a production plan are generally considered a by-type/by-date production load plan for the final assembly product, the heaped state of capacity for each shop in the final assembling shop group, the upper and lower limits of a total production capacity time of each shop in a plan period, the upper and lower limits of a by-day production capacity of each shop in the plan period, a total production load time of each shop in the plan period, a list of alternative shops by items, the parent/child relationship of production parts between shop groups, and so on.

The constraint conditions include a "strong constraint condition" such as the list of alternative shops by items which cannot be relaxed or changed and a "weak constraint condition" such as the upper and lower limits of the total capacity time which can be changed.

In the present embodiment, the "weak constraint condition" is considered as constraint condition data 147. More particularly, the data 147 includes a production plan of the final product, the upper and lower limits of a total capacity time of each shop in a plan period, and the upper and lower limits of a by-day capacity time of each shop in the plan period.

A table date of constraint condition data 147 is shown at the left portion of FIG. 37. The constraint condition data is generally composed of two data tables. One of the two tables is a data table of a production plan of the final product. This table is lined with records termed records MPS (Master Product Schedule) records.

On one MPS record are described a type code of the type of an equipment to be produced, a completion date, a production load, a priority at the time of production, and an order number. Each MPS record is provided with a consecutive number called "MPS number (MPS No.)". The other data table is a data table of the constraint conditions of capacity. On this data table are described dates in a period, the upper and lower limit capacity of each date, and the upper and lower limits of a total capacity of the corresponding period for each shop.

In the case of outside products, the number of parts to be warehoused is used in lieu of the capacity, that is, the upper and lower limits of the scheduled number of parts to be warehoused for each date and the upper and lower limits of the total number of parts to be warehoused in a period are described.

In the present embodiment, not only the table shown at the right portion of FIG. 37 but also the capacity of a shop belonging to the final assembling process shop group for each day in a plan period are handled as the constraint condition data.

The capacity of a shop belonging to the final assembling process shop group for each day in a plan period is described in the shop production plan record shown at the right and lower portion of FIG. 37.

Next, "heap" and "accumulation" will be explained referring to FIG. 24.

"Heap amount" represents a load time heaped up on each day (that is, a time concerning a load to be completed on each day) or a capacity time heaped up on each day (that is, a time for a work made on each day).

On the other hand, "accumulation" represents a total time obtained by adding daily heap amounts from the first day of a certain plan period to a day of interest successively every day. More particularly, the load accumulation is the total time of heap amounts of loads to be completed until a certain day of interest and the capacity accumulation is the total of work times taken until a certain day of interest.

The present embodiment is characterized in that data concerning a production plan is handled directing attention to the above-mentioned accumulation. In the following, a broken-line graph representation of the heaped state is termed "accumulation graph". Here, it is to be noted that it is impossible to know a starting date and a production process completion date of each job from only a load accumulation graph, though reference to this has been made in the explanation of production plan data.

The load accumulation graph is a graph formed by merely accumulating loads until a day when each job should be completed. Therefore, the graph shows a schedular limitation concerning the completion of each job but has no information as to when production is to be made (or when production is to be started).

On the other hand, a capacity accumulation graph is a graph formed by merely accumulating daily work times. However, if the capacity accumulation graph is used together with the load accumulation graph, it becomes possible to determine a starting date and a production process completion date of each job.

In other words, the capacity accumulation graph can also be called an "accumulation graph for load after the demolishment of a heap" in the sense of the term. From the capacity accumulation graph can be read when actual production for each job is started from and when it is completed.

In the case of outside parts, a connection or supplier is handled as one shop and an accumulation graph for the number of parts to be warehoused and an accumulation graph for the number of required parts as shown at the right portion of FIG. 37 can be formed corresponding to the capacity accumulation graph and the load accumulation graph. In this case, the number of parts is taken for the ordinate. However, in the sense, the accumulation graph for the number of parts to be warehoused and the accumulation graph for the number of required parts can be regarded in the same manner as the capacity accumulation graph and the load accumulation graph. Therefore, the following explanation will be made on the basis of the capacity/load accumulation graph. In this connection, each of the load accumulation graph and the capacity accumulation graph is a function showing a monotonous increase.

In the present embodiment, the expression of "a problem is present in a production plan" or "a production plan is in a non-executable state" means that "the production for a certain item is late for the process completion date of that item", or in other words, "the starting of production had to be made earlier in order to product a certain item until the process completion date of that item".

Generally, this is also called the "lateness for starting" and the item is also called "item with lateness for starting". From FIG. 36 showing by way of example the result of formulation of a production plan through explosion of each part for a product of July 23, it is seen that the lateness for starting is generated at shop 15.

Therefore, the part CS is an item with lateness for starting.

The greatest merit of use of the accumulation graph lies in that the generation and cause of this "lateness for starting" can be known very easily. This will be explained referring FIG. 25.

Each break point of the broken line of each of the load accumulation graph and the capacity accumulation graph represents the total of heap amounts until the corresponding date.

Especially, the load accumulation graph is the total of heap amounts of respective loads on a process completion date.

Accordingly, in the case where a break point of the load accumulation graph on a certain scheduled date exists above that of the capacity accumulation graph on the same date, it is meant that a work load to be completed until that date exceeds a work load which can be finished until that date or the "lateness for starting" is generated.

Namely, if there is a location where the comparison of a load accumulation graph and a capacity accumulation graph of a certain shop shows that there is a location where the load accumulation graph exceeds the capacity accumulation graph, the "lateness for starting" is generated at that shop and the cause for generation of the lateness lies in that a work load corresponding to the excess of the load accumulation graph over the capacity accumulation graph is an "overload" for a production capacity.

Accordingly, the formulated plan can be turned into an executable plan by canceling the overload state. The present invention has an important significance in that attention is directed to this point of view.

Also, this means that an overload state can be canceled by having a load accumulation graph exist below a capacity accumulation graph always.

In other words, it can be said that a capacity accumulation graph defines an allowable region which the value of a load accumulation graph can take.

So long as a load accumulation graph exists within the allowable region, the corresponding production plan is executable.

In the present embodiment, a production plan adjustment method is formulated so as to have a load accumulation graph exist below a capacity accumulation graph for all shops.

A policy for having the load accumulation graph exist below the capacity accumulation graph can generally be classified into, for example, four policies as mentioned in the following. This will be explained referring to FIG. 25.

A first policy is to lower the load accumulation graph below the overload (type A). Namely, the whole of the load accumulation graph is caused to exist below the capacity accumulation graph by lowering the load accumulation graph below the overload.

A second policy is to shrink the load accumulation graph to the right side (type B), a third policy is to raise the capacity accumulation graph above the load accumulation graph (type C) and a fourth policy is to swell the load accumulation graph to the left side (type D).

The respective rightmost points of the load accumulation graph and the capacity accumulation point represent a total load accumulation time and a total capacity accumulation time in a certain period of interest. Since the total load accumulation time becomes a constraint condition by a production plan of the final product and the total capacity accumulation time too is one constraint condition, the types A and C correspond to adjustment methods based on constraint relaxation and the policies of types B and D correspond to adjustment methods within the range of constraint conditions.

An adjustment based on the change of a shop belongs to the type A as the modification of an accumulation graph. In the present embodiment, however, this adjustment is handled as an adjustment within the range of constraint conditions.

Generally, in the constraint conditions, the "lateness for starting" is hard to generate when a capacity accumulation graph is rather sided to the left a load accumulation graph is rather sided to the right, as is seen from the types B and D.

In another mode of expression, a capacity accumulation graph swollen to the leftmost side represents the widest permitted for a load accumulation graph at the corresponding shop.

On the other hand, a load accumulation graph shrinked to the rightmost side represents a load accumulation graph with which the "lateness for starting" is very hard to generate within the range of constraint conditions of the corresponding production plan. Such a graph can be said to be a so-called "gentle" graph with which the graph is most liable to fall within an allowable region given by a capacity accumulation graph.

To examine whether or not a load accumulation graph entirely falls within the widest allowable region permitted by the "gentle" graph is very important in judging whether or not the corresponding production plan is adjustable within the range of constraint conditions.

Thus, in the present embodiment, a capacity accumulation graph swollen to the leftmost in constraint conditions and a load accumulation graph shrinked to the rightmost in the constraint conditions are compared in order to judge whether or not a problem included in a production plan can be canceled.

Namely, the following processing steps are used as basic processing steps.

First, a capacity accumulation graph is considered which is swollen to the leftmost side in constraint conditions at each shop.

Since the left side is the earliest processing when considered on the time axis, such a graph is termed the "earliest capacity accumulation graph". In another aspect, the earliest capacity accumulation graph means that when a daily capacity is set to a heaped state shown by this accumulation graph, the starting date of each load becomes earliest.

Second, a load accumulation graph is considered which is shrinked to the rightmost side in constraint conditions at each shop.

Since the right side is the latest processing when considered on the time axis, such a graph is termed the "latest load accumulation graph".

Next or third, the earliest capacity accumulation graph and the latest load accumulation graph are compared to examine whether or not an overload is generated.

Finally or fourth, if an overload is generated, the examination is made as to whether or not the generation of the overload can be canceled by a shop change processing.

If it is determined that the generation of the overload can be canceled, it is determined that the relaxation of the constraint conditions is not necessary. If it is determined that the generation of the overload cannot be canceled, it is determined that the relaxation of the constraint conditions is necessary.

The above method is limited to each shop. An influence between processes (or shop groups) is not taken into consideration.

Namely, for example, there may be the case where even if a plan capable of being executed by a certain shop with no problem in that shop itself becomes an inexecutable plan because the allotment of load in that shop causes the generation of an overload in a shop which manufactures child parts.

To put in another way, if a load accumulation graph of a certain shop can be adjusted so that it falls in a region where no problem is generated at all shops which manufacture child parts, there results in that it is possible to make at all shops in a stream upper than the certain shop free of the generation of an overload.

An object of the production plan adjusting system in the present embodiment is to formulate a plan which makes all shops free of the generation of an overload, as has already been mentioned.

Accordingly, if when attention is directed to a certain shop, it is possible to designate an allowable region of a load accumulation graph where no overload is generated in a stream upper than that shop, all shops can be made free of the generation of an overload by adjusting a load accumulation graph at each shop successively from a lower stream shop so that it falls within an allowable region of that graph.

Accordingly, the next great problem is as to how to define at a parent shop an allowable region where a load accumulation graph with no problem generated at a child shop exists.

Generally, from a parent part to a child part is termed "explode" and from a child part to a parent part is termed "reversely explode". According to this terminology, the above problem is to form an accumulation graph of a shop of a parent part through "reverse explosion" on the basis of an accumulation graph of a shop of a child part.

However, if the formation of an accumulation graph through "reverse explosion" between a parent and a child is considered in units of one shop, the problem becomes complicated since the flow of parts is complicated because of the existence of alternative shops either on the parent part side or on the child part side.

Further, in the case where a standard time (ST) for the same item greatly differs between alternative shops, the problem becomes further hard.

Hence, in order to avoid those problems, the problem of influence between processes is considered in units of one shop group with attention being directed to as to whether or not alternative shops belong to the same shop group.

Namely, the earliest capacity accumulation graph and the latest load accumulation graph are formed in units of one shop group and the judgement is made for the thus formed graphs.

With the consideration in units of one shop group, an influence between a parent part and a child part can be replaced by an influence between a parent shop group and a child shop group. Namely, if the consideration is taken every shop group, the flow of products becomes very simple since a child part is only moved from a child shop group to a parent shop group.

The next problem concerns the case where ST for the same item is different for each shop. This problem is hard for the following reason.

In a multi-process and plural-line production process made an object, a plurality of items are produced, alternative shops are designated for each item, and ST for the same item is different for each alternative shop.

Therefore, the following problem arises in formulating a production plan. Namely, depending on when what item is manufactured at which shop in a certain shop group, a daily allowed production load of a parent item greatly differs in a production plan for a parent shop group. As a result, it becomes very hard to determine an allowable region of a load accumulation graph.

Hence, "reverse explosion" is performed on the two following assumptions with attention directed to the fact that a production plan has already been obtained. Namely, it is assumed that no change is made of the order for production and it is also assumed that in calculating an allowed amount for a parent item, the rate of production of a child part between alternative shops is used as it is.

First, a method of reverse explosion will be explained briefly by use of FIG. 38.

First or in step 1, provided that the earliest capacity accumulation graph ① at a child shop group is already determined, the earliest starting date and the earliest production process completion date for each load are determined using the earliest capacity accumulation graph ①.

Thereby, the earliest load accumulation graph ② based on completion date can be formed by accumulating load on the earliest production process completion date at the child shop group.

Next or in step 2, since the earliest production process completion date of each load at the child shop group is already determined, a possible starting date of each load at a parent shop group is determined at the child group.

Thereby, the earliest load accumulation graph ③ based on starting date can be formed by accumulating load on the earliest production process completion date at the child shop group.

In step 3, since the earliest load accumulation graph ③ based on starting date is already determined at the parent shop group, a capacity accumulation graph ④ existing below the graph ③ and swollen to the uppermost is formed. The formed graph is termed "reverse explosion earliest capacity accumulation graph".

Since the earliest capacity accumulation graph ① gives the maximum allowable region for a load accumulation graph at the corresponding shop group, the reverse explosion earliest capacity accumulation graph ④ at the parent shop group gives to the load at the parent shop group the maximum allowable region where no overload is generated at the child shop group.

Next, each step will be explained in detail. Step 1 will be explained by use of FIG. 39.

Figure 39:
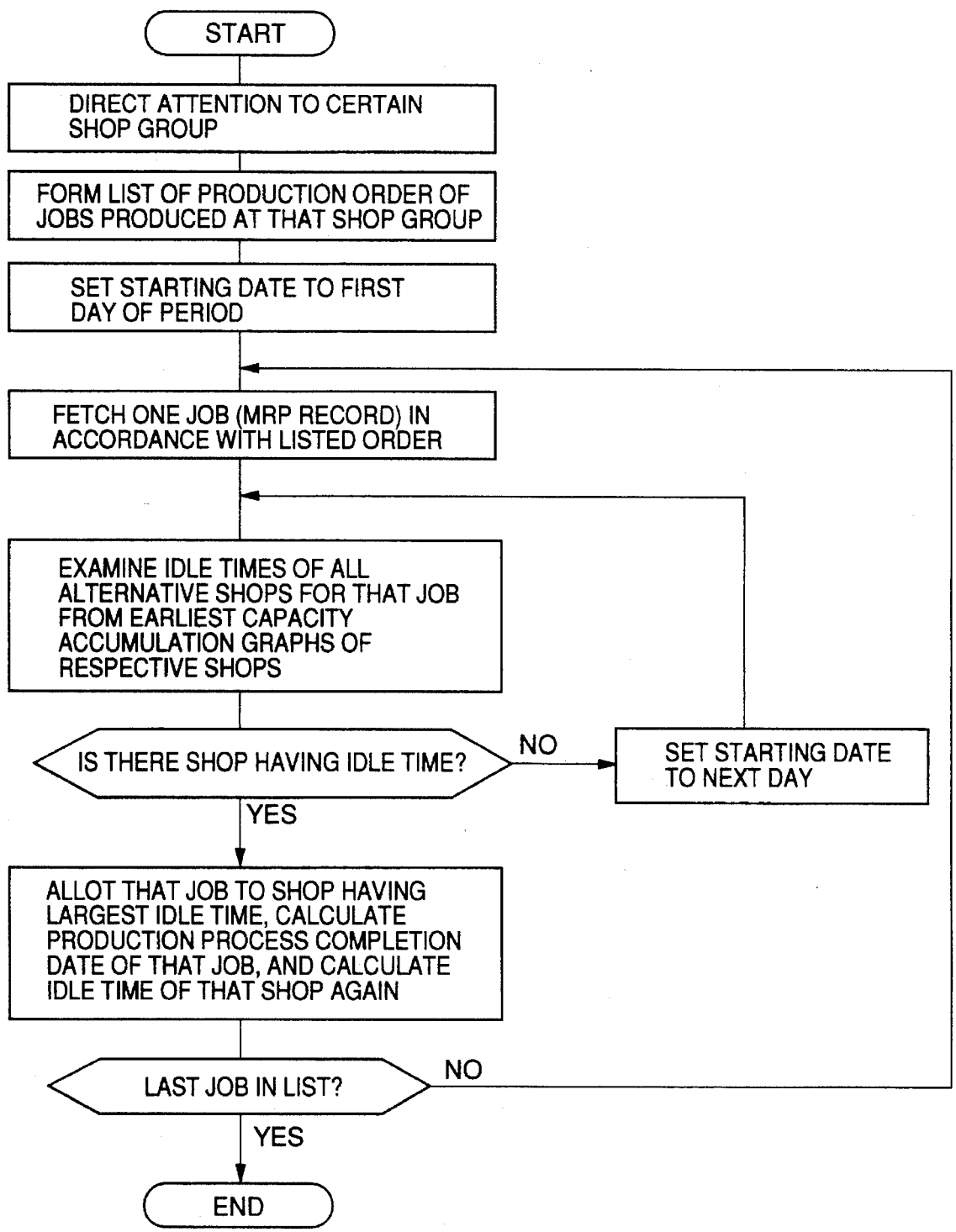
FIG. 39 is a flow chart of an example of a processing for determining the earliest starting date and a production process completion date.

FIG. 39 is a flow chart when the earliest starting date and production process completion date of each load are determined at a shop group of the uppermost stream.

First, attention is directed to a certain shop group of the uppermost stream. It is assumed that the order of items (or jobs) produced at the shop group under consideration is determined in accordance with the priority of each job and no change is made of the order of jobs.

The order of jobs for production is recorded in the form of a list. Also, the first day of a period is set as a starting date.

Next, each job is fetched one by one in accordance with the listed order to examine all idle times of alternative shops of an item of the fetched job. For each shop, a work time of the set day is already determined from the earliest capacity accumulation graph. The idle time of each shop can be calculated by removing the determined work time as well as a time corresponding to jobs which have already entered.

The job under consideration is allotted to an alternative shop having the largest idle time. Thereby, a production process completion date of the corresponding load can be calculated. In the case where any alternative shop for the corresponding job has not an idle time at all, a processing for incrementing the starting date by one day is performed.

Namely, the starting on the set day at the shop group under consideration is limited to a job preceding the corresponding job and the corresponding job is handled as a job to be started from the next day. Subsequently, a shop is similarly determined.

Thereby, the starting date and production process completion date are determined for all jobs of the shop group under consideration.

Next, step 2 will be explained.

First, for each job at a parent shop group of the child shop group in step 1, a day next the production process completion date of a child part at the child shop group in step 1 is set as a possible starting date. At this time, the production process completion dates of the other child parts are not considered.

In this parent shop group, each job is fetched in the order for production and a load time is calculated using a weighted average value of ST's of alternative shops for an item of the fetched or corresponding job and is heaped on the possible starting date. However, in the case where the possible starting date of the corresponding job is earlier than the possible starting date of a job preceding the corresponding job, the heaping is made on the same day as the possible starting date of the job preceding the corresponding job in order to keep the order for production.

In this manner, the earliest load accumulation graph based on starting date in units of one shop group can be formed. This earliest load accumulation graph based on starting date represents most directly an allowable region in a parent shop group.

But, since it is a capacity accumulation graph which designates a load to be started, the earliest load accumulation graph based on starting date is approximated to a capacity accumulation graph.

Namely, in step 3, a capacity accumulation graph is formed which exists below the earliest load accumulation graph based on starting date and is swollen to the uppermost. The formed graph is termed "reverse explosion earliest capacity accumulation graph".

However, since a daily work time at each shop has an upper limit and a lower limit and takes discontinuous values, the gradient of the reverse explosion earliest capacity accumulation graph too has an upper limit and a lower limit and takes discontinuous values. In this manner, one reverse explosion earliest capacity accumulation graph can be formed for one child shop group.

The foregoing explanation concerns a method for forming an allowable region so that an overload is not generated with regard to only one child part. However, in many cases, a plurality of child parts exist for one parent part. Therefore, in a parent shop group too, an allowable region must be formed so that no overload is generated at a plurality of child shop groups.

Also, it is of course that no overload is caused to generate in its own shop group too. This method will be explained using FIG. 40.

Figure 40:
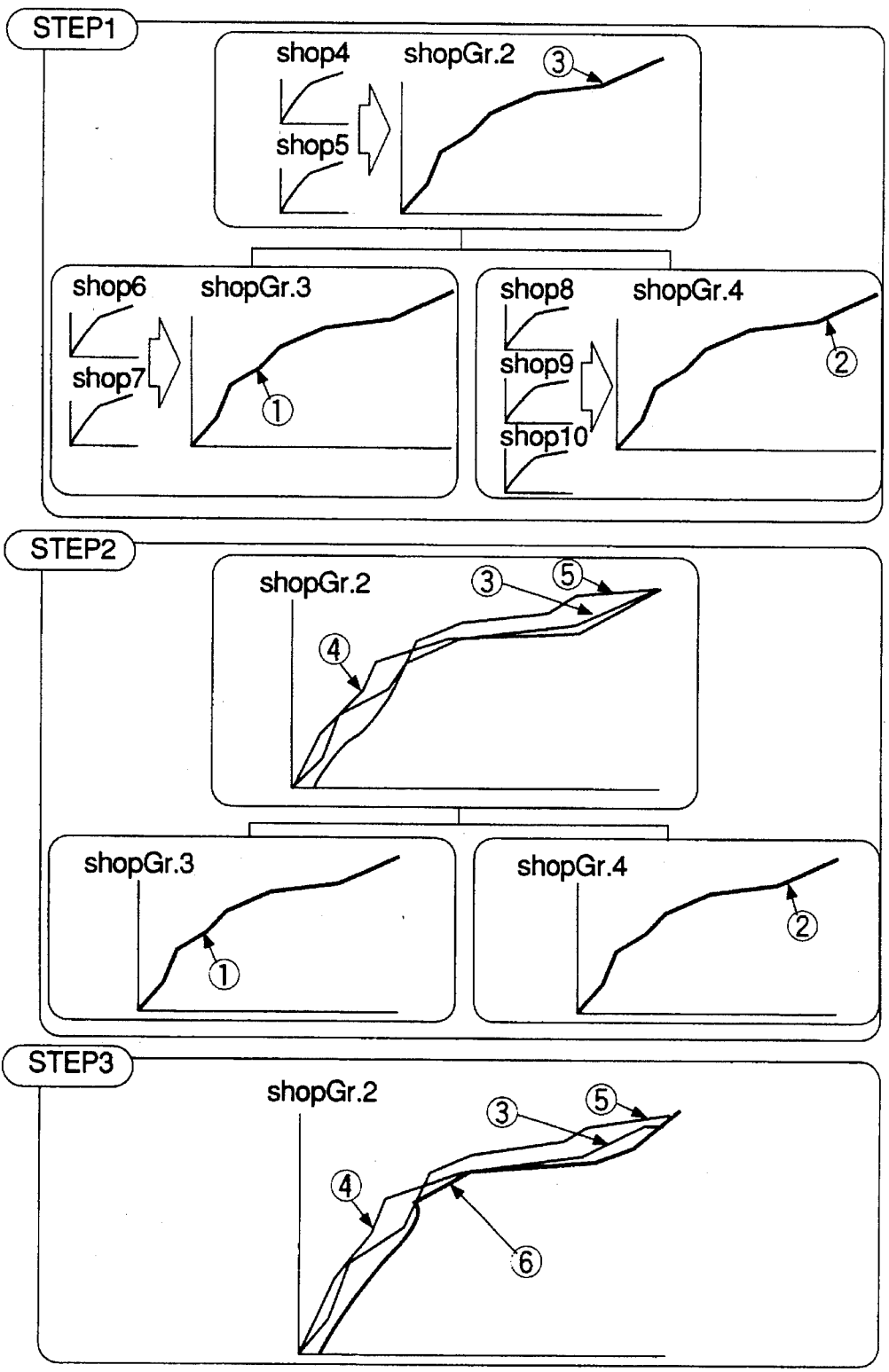
FIG. 40 is a diagram for explaining a method for forming the earliest capacity accumulation graph.
Figure 41:
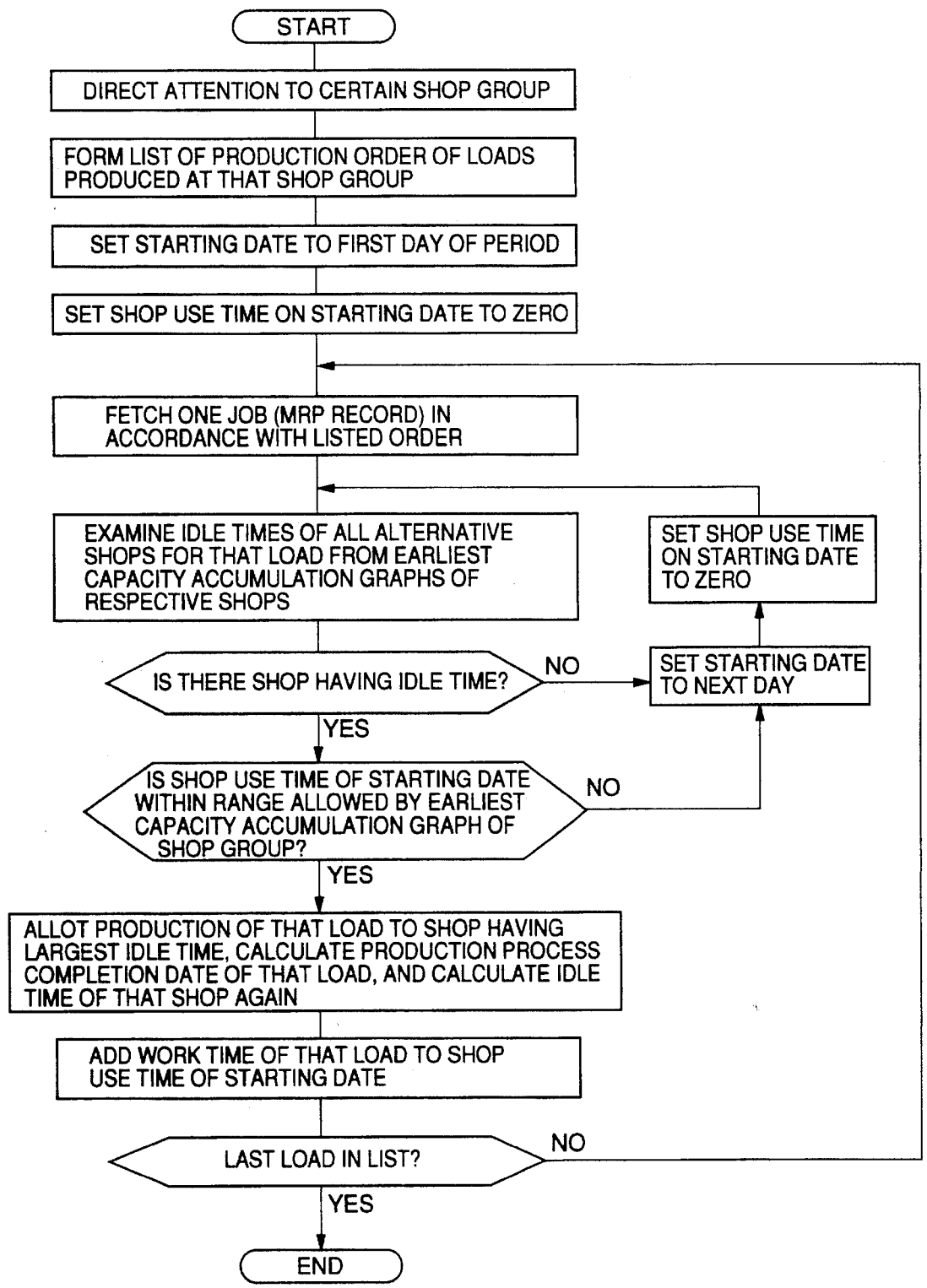
FIG. 41 is a flow chart of an example of a processing for determining the earliest starting date and a production process completion date.
Figure 42:
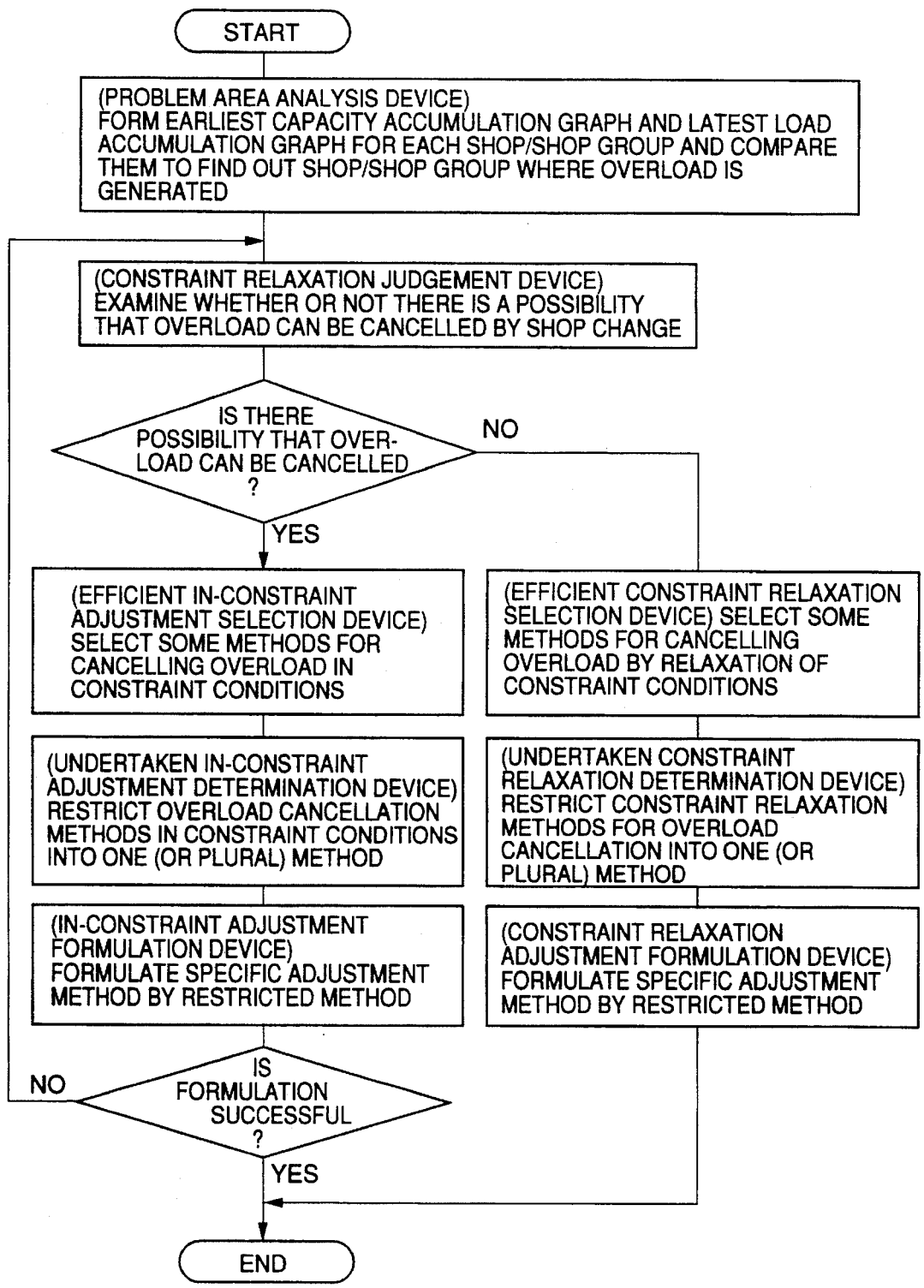
FIG. 42 is a flow chart of a general processing performed by the production plan adjusting system.

FIG. 40 concerns a part of the production process explained in conjunction with FIG. 22 and corresponds to the case where Shop Gr. 3 and Shop Gr. 4 exist as child shop groups of Shop Gr. 2.

In step 1, in each of Shop Gr. 3 and Shop Gr. 4, the earliest capacity accumulation graph in units of one shop group is formed by simply adding the earliest capacity accumulation graphs of shops in that shop group. The formed earliest capacity accumulation graphs are termed self-earliest capacity accumulation graphs (or graphs ① and ② in FIG. 40).

Since Shop Gr. 3 and Shop Gr. 4 are the uppermost stream shop group, they have no child shop group. Therefore, the self-earliest capacity accumulation graph gives the ultimate allowable region for a load accumulation graph as it is. With respect to Shop Gr. 2 too, a self-earliest capacity accumulation graph (or a graph ③) is formed by simply adding earliest capacity accumulation graphs of shops (or shop 4 and shop 5) which belong to Shop Gr. 2.

Next or in step 2, the self-earliest capacity accumulation graphs of Shop Gr. 3 and Shop Gr. 4 are reversely exploded by the method having already been explained, thereby forming respective reverse earliest capacity accumulation graphs (or graphs ④ and ⑤).

Finally or in step 3, a graph is formed by comparing the above capacity accumulation graphs in units of one shop group and joining portions which run the innermost side among those graphs. The formed graph is termed the earliest capacity accumulation graph of the shop group under consideration.

It is assumed that this graph (or a graph ⑥) gives an allowable region for a load accumulation graph of the shop group. If the load accumulation graph falls below the graph ⑥, the same load accumulation graph falls below all the graphs ③ to ⑤. Therefore, an overload is not generated in the shop group under consideration or Shop Gr. 2 as well as Shop Gr. 3 and Shop Gr. 4.

Basically, the reverse explosion of the earliest capacity accumulation graph ⑥ at the shop group under consideration or Shop Gr. 2 to a parent shop group can be performed in a similar manner to that mentioned above. However, the method of step 1 explained in conjunction with FIG. 39 among the three steps upon formation of the earliest capacity accumulation graph explained in conjunction with FIG. 38 is performed in accordance with the following procedure shown in FIG. 41.

Namely, each shop of the shop group under consideration is fetched in the order for production in an initially given production plan to examine all idle times of alternative shops for an item of that job on a possible shop group starting date.

The possible shop group starting date indicates the starting date of a job made at the shop group under consideration. Since it is assumed that the order of jobs for production is not changed from the initially given plan, a possible starting date is designated not individually for each job but in units of one shop group.

The possible shop group starting date initially indicates the first day of the earliest capacity accumulation graph of the shop group under consideration.

The idle time of the shop group starting date of each shop can be calculated by removing a work time of that date already determined from the earliest capacity accumulation graphs well as a time corresponding to jobs which have already been allotted. The job under consideration is allotted to an alternative shop having the largest idle time. Thereby, a production process completion date of the job can be calculated. At this time, times of the shops used by the jobs are added in units of one shop group.

In the case where any alternative shop for the corresponding job has not an idle time at all or in the case where the total of shop use times until a job preceding the corresponding job exceeds a value defined by the earliest capacity accumulation graph of the shop group under consideration, the shop group starting date is shifted to the next day to repeat the similar.

Thereby, the starting date and production process completion date are determined for all jobs of the shop group under consideration. Subsequently, for a parent shop group, a load accumulation graph based on starting date is formed on the basis of those contents and a reverse explosion earliest capacity accumulation graph is formed. These graphs are formed in the same manner as has already been mentioned.

Thus, for each shop group can be considered a capacity accumulation graph swollen to the left side as far as a limit at which an overload is not generated in not only that shop group but also a child shop group. If a load accumulation graph is modified in a parent shop group so that the graph falls inside the earliest capacity accumulation, it is also possible to prevent an overload in the child shop group from being generated. However, as compared with the earliest capacity accumulation graph considered in units of one job, the earliest capacity accumulation graph in units of one shop group is not strict in light of the two following points, as also apparent from the graph forming method.

A first point is that when taking consideration in units of one shop, accumulation graphs of shops belonging to a shop group under consideration are simply added. In the case where shops unalternative to each other for production are gathered as a group, a graph formed by the simple addition is not so available. A second point is that two assumptions are taken in forming a reverse explosion earliest accumulation graph. One assumption is that consideration is taken without making a change of the order for production. The other is that the rates at alternative shops used at the time of production, for example, 20% at shop 1 and 80% at shop 2 are used as they are.

As apparent from the foregoing, an accumulation graph in units of one shop group merely gives one aim when consideration is made in units of one shop group.

Also, if the balance of a production capacity between processes (or shop groups) is accurately considered at the stage of design of production lines, the earliest capacity accumulation graph and the self-earliest capacity accumulation graph (or the mere addition of earliest capacity accumulation graphs of respective shops) thus formed are little different so long as a given production plan is near to a standard one.

However, it is clarified that the generation of an overload can well be checked by taking the capacity of an its own shop group. Thereby, the policy of adjustment can be obtained.

Further, when a given production plan is far away from a standard plan supposed upon design of production lines, the earliest capacity accumulation graph in units of one shop group has a great significance.

Since the earliest capacity accumulation graph of a parent shop group is formed taking the influence of a child shop group into consideration, this earliest capacity accumulation graph is formed through "reverse explosion" from the child shop group to the parent shop group.

Basically, an accumulation graph in units of one shop group is formed as the sum of accumulation graphs of respective shops belonging to that shop group. Accordingly, there may be the case where a problem is not generated when the comparison of the earliest capacity and the latest load is made between shop groups but is generated when it is made between shops.

Accordingly, the comparison of the earliest capacity and the latest load is conducted at two stages, that is, the comparison is made first between shop groups and thereafter between shops.

The general flow will now be explained roughly using FIG. 40 while summarizing the above explanation.

First, the problem area analysis device 137 compares the earliest capacity accumulation graph and the latest load accumulation graph for each shop and each shop group to find out a shop and a shop group where an overload is generated.

Next, the constraint relaxation judgement device 138 judges whether or not the problem can be canceled by a shop change.

In this step, the examination is made as to whether or not when a job corresponding to the excess load is allotted to another shop, an overload is newly generated on the other shop side. When there is no possibility that the overload state can be canceled by the shop change in the shop group under consideration, the examination is made for a shop group of a further lower stream.

If there is as the result of examination a possibility that the overload state can be canceled, an adjustment method of having a load accumulation graph exist below a capacity accumulation graph is formulated within the range of constraint conditions.

If there is no possibility that the overload can be canceled, an adjustment method of having a load accumulation graph exist below a capacity accumulation graph is formulated by a constraint relaxation.

Herein, the problem area analysis device 137 and the constraint relaxation judgement device 138 brings a load into a heaped state at the latest point of time (or the latest heaped state) and thereafter tries a shop change to check whether or not the problem can be canceled. However, a method of canceling the lateness for starting is not limited to such a method.

For example, even if the load is heaped into the latest state again, there may be the case where only the conduction of a shop change in a heaped state at the present point of time suffices.

Therefore, in the formulation by adjustment within constraint conditions, it is enough if the efficient in-constraint adjustment selection device 141 enumerates all adjustment methods which efficiently operate so that a load accumulation graph exists below a capacity accumulation graph.

For example, there are considered various adjustment methods such as "the cancellation of a problem is possible by only a change in production capacity", "the cancellation of a problem is possible by only a change in shop", or "the cancellation of a problem is possible by the combination of a change in production capacity and a change in shop".

The undertaken in-constraint adjustment determination device 145 restricts the enumerated methods into one (which may be plural). The in-constraint adjustment formulation device 142 determines specific contents of adjustment on the basis of the restricted adjustment method and formulates the plan.

Up to now, the judgement as to "whether or not the cancellation of an overload is possible" is primarily based on a load accumulation graph. In actual, however, there may be the case where even if it is determined that the cancellation of an overload is possible, for example, by a change in shop, it is found out that a proper load for making the change in shop does not exist. In this case, a similar processing is repeated by the constraint relaxation judgement device in order to judge whether or not the cancellation of an overload is possible at another area. If the constraint relaxation judgement device determines that the is no possibility that the overload can be canceled, an adjustment method is formulated which causes a load accumulation graph to fall below a capacity accumulation graph by a constraint relaxation.

The adjustment by the relaxation of constraint conditions can be performed in a substantially similar method.

The foregoing is a basic concept of the processing in the present embodiment. In the following, each device will be explained in detail to give further detailed explanation of the embodiment of the present invention.

First, the problem area analysis device 137 as one of the constituent elements of the production plan adjusting system will be explained referring to FIGS. 21, 26, 27, 28, 29, 43 and 44.

First, when the person in charge of planning instructs "problem analysis" or "automatic formulation" by use of the data input/output device 12, the data input/output device 12 sends adjustment carry-out instruction data 158 to the adjustment formulation control device 143.

When receiving the adjustment carry-out instruction data 158, the adjustment formulation control device 143 sends analysis carry-out instruction data 159 to the problem area analysis device 137.

When receiving the analysis carry-out instruction data 159, the problem area analysis device 137 fetches production plan data 146 and constraint condition data 147 from the data retention device 11.

After necessary data has been fetched, the earliest capacity accumulation graph is formed for each shop.

Figure 26:
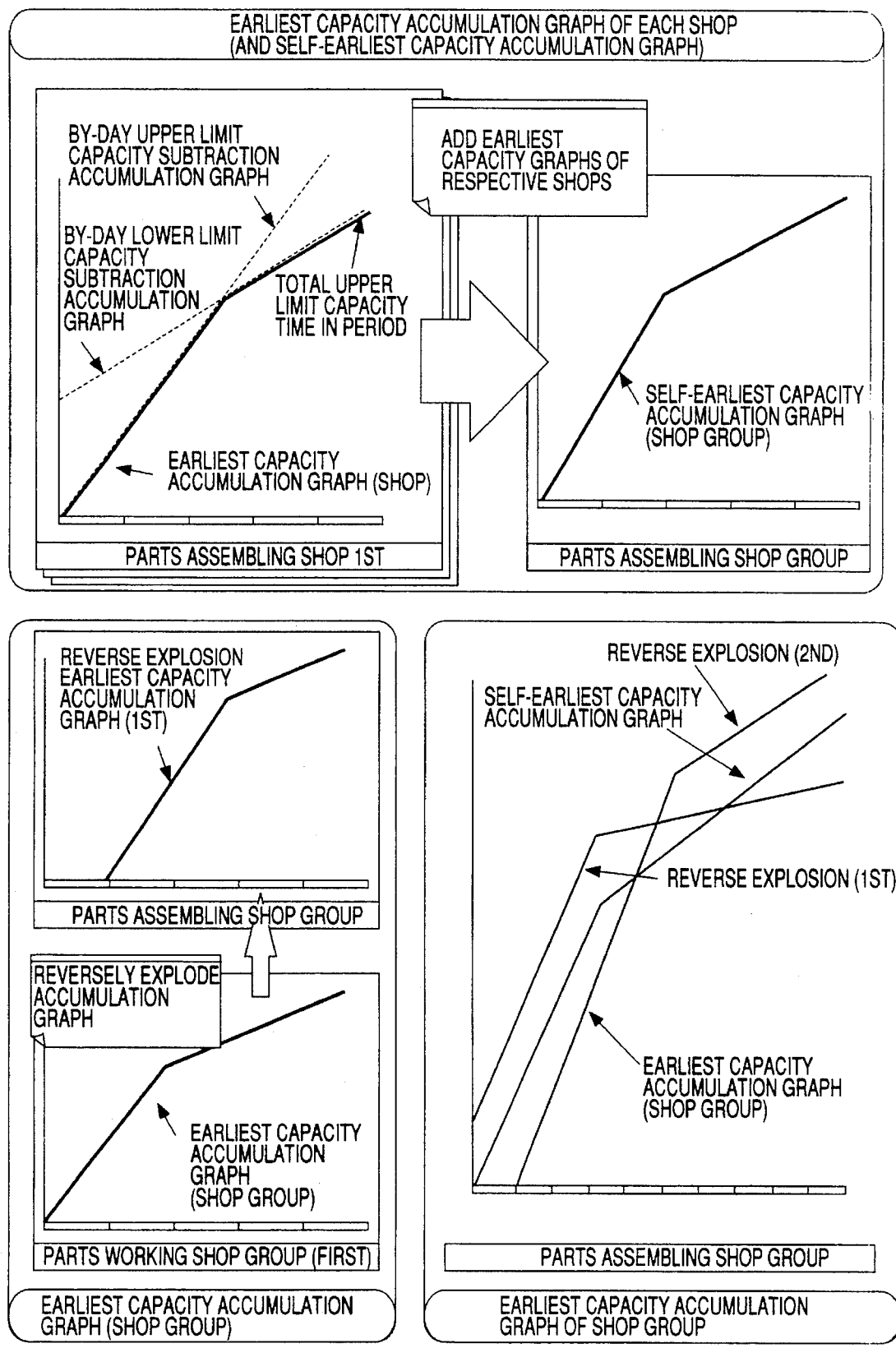
FIG. 26 is a diagram for explaining the earliest capacity accumulation graph.

A method for forming the earliest capacity accumulation graph will be explained referring to FIG. 26. The earliest capacity accumulation graph is formed as follows.

First, a by-day upper limit capacity, which is the upper limit value of a production capacity of one day, is added toward the future from the first date of a plan period of a shop under consideration (or a shop to which attention is directed), thereby forming a "by-day upper limit capacity addition accumulation graph".

Second, a "by-day lower limit capacity subtraction accumulation graph" is formed in such a manner that on the last day of the plan period of the shop under consideration, a total upper limit capacity time as the total of the upper limit capacities in the plan period is heaped and a by-day lower limit capacity as the lower limit value of a production capacity of one day is subtracted from the heaped total upper limit capacity time toward the past from the last day.

Next or third, the "by-day upper limit capacity addition accumulation graph" and the "by-day lower limit capacity subtraction accumulation graph" are compared to join those portions of both the graphs, which exist on the inner side, thereby forming a new accumulation graph.

For a day when the intersection of the "by-day upper limit capacity addition accumulation graph" and the "by-day lower limit capacity subtraction accumulation graph" exist, the new accumulation graph is formed with a new gradient with which the two accumulation graphs are jointed.

The newly formed accumulation graph is the "earliest capacity accumulation graph" of the shop under consideration.

Next, the earliest capacity accumulation graph for each shop group is formed.

Since the method of forming the earliest capacity accumulation graph for each shop group has already been explained in detail by use of FIGS. 38, 39, 40 and 41, brief explanation will be made again herein by use of FIG. 26.

First, for each shop group, respective earliest capacity accumulation graphs of shops belonging to that shop group are all added.

An accumulation graph thus formed for each shop group is termed "self-earliest capacity accumulation graph" of that shop group.

Second, at a shop group at the uppermost stream, the self-earliest capacity accumulation graph is taken as the earliest capacity accumulation graph.

Third, the following processing is performed successively toward a lower stream shop group from an upper stream shop group.

First, for each child shop group, the earliest capacity accumulation graph of that child shop group is reversely exploded to a parent shop group to form a reverse explosion earliest capacity accumulation graph.

Next, in that parent shop group, the self-earliest capacity accumulation graph and the reverse explosion earliest capacity accumulation graph(s) for a child shop group are compared so that those portions of both the graphs which exist at the innermost side are joined with each other to form the earliest capacity accumulation graph for the shop group of interest.

It should be noted that the thus formed earliest capacity accumulation graph for each shop group is a patched-up state of the reverse explosion earliest capacity accumulation graph from a descendant shop group of that shop group and the self-earliest capacity accumulation graph and is formed from only constraint conditions. (This will be explained again later on.)

Further, reference will also be made to the latest load accumulation graph.

For the final assembling process shop group and a shop group of a stream which is immediately upper than the final assembling process shop group, a load accumulation graph is completely defined from constraint conditions. However, with regard to a shop group which exists at an upper stream than the above shop group, the load accumulation graph may take various forms in accordance with a capacity accumulation graph at a parent shop group of that shop group.

Then, when a load accumulation graph is defined in a certain shop, a capacity accumulation state in which the production starting date of a load becomes the latest is termed the "latest capacity accumulation state" and a broken graph in that case is termed the "latest capacity accumulation graph".

A method of forming the latest capacity accumulation graph will now be explained using FIG. 43.

However, in the case where a break point of a load accumulation graph exists above the earliest capacity accumulation graph, the latest capacity accumulation graph is not written.

First, a by-day lower limit capacity, which is the lower limit value of a production capacity of one day, is added toward the future from the first date of a plan period of a shop under consideration (or a shop to which attention is directed), thereby forming a "by-day lower limit capacity addition accumulation graph".

Second, a "by-day upper limit capacity subtraction accumulation graph" is formed in such a manner that on the last day of the plan period of the shop under consideration, a total upper limit capacity time as the total of the upper limit capacities in the plan period is heaped and a by-day lower limit capacity as the upper limit value of a capacity of one day is subtracted from the heaped total upper limit capacity time toward the past from the last day.

Next or third, the "by-day lower limit capacity addition accumulation graph" and the "by-day upper limit capacity subtraction accumulation graph" are compared to join those portions of both the graphs, which exist on the outer side, thereby forming a new accumulation graph. For a day when the intersection of the "by-day lower limit capacity addition accumulation graph" and the "by-day upper limit capacity subtraction accumulation graph" exist, the new accumulation graph is formed with a new gradient with which the two accumulation graphs are jointed. The newly formed accumulation graph is a "critical latest capacity accumulation graph" of the shop under consideration.

Fourth, those ones of points on a load accumulation graph (or points representing daily accumulated load amounts) which exist above the "critical latest capacity accumulation graph" are all enumerated.

At this time, those points including points on opposite ends of the "critical latest capacity accumulation graph" are arranged in a time-serial order. In FIG. 43, these points are represented by circle including vertical lines therein.

Fifth, gradients between the points arranged in the time-serial order are examined in the time-serial order to the latest capacity accumulation graph. Here, when two points are taken in the time-serial order, one of the two points on the past side is called A and the other thereof on the future side is called B.

Assume that the latest capacity accumulation graph has already been drawn up to the point A. In the case where a graph is newly drawn toward the future from the point A, the three following manners of drawing exist depending upon the position of the point B.

First, if the point B exists in an area between a half line from the point A having a gradient of the "by-day upper limit capacity addition accumulation graph" and a half line from the point A having a gradient of the "by-day lower limit capacity addition accumulation graph", a line is drawn between the point A and the point B in a manner employed upon formation of the "critical latest capacity accumulation graph". Thereafter, a graph is newly drawn toward the future from the point B (see 5-1 in FIG. 43).

Also, if the point B exists in an area above the half line from the point A having a gradient of the "by-day upper limit capacity addition accumulation graph", a line is drawn by subtracting upper limit capacities by days toward the past from the point B. If this line intersects the latest capacity accumulation graph having already been formed, a point on the graph existing on the past side thereof in the time series is found out. This point is called a point C.

A line is drawn between the point C and the point B again in a manner employed upon formation of the "critical latest capacity accumulation graph". Thereafter, a graph is newly drawn toward the future from the point B.

Further, if the point B exists in an area below the half line from the point A having a gradient of the "by-day upper limit capacity addition accumulation graph", a line is drawn by adding lower limit capacities by days toward the future from the point A. A point is found out which first appears above this line. This point is called a point C. A line is drawn between the point A and the point C again in a manner employed upon formation of the "critical latest capacity accumulation graph". Thereafter, a graph is newly drawn toward the future from the point C.

The thus formed graph is the latest capacity accumulation graph.

As has already been mentioned, for the final assembling process shop group, a load accumulation graph and a capacity accumulation graph of each shop are necessarily determined from constraint conditions.

As a result, a load accumulation graph of each shop in a shop group of an upper stream than the final assembling process shop group by one shop group unit is also determined necessarily.

By drawing the latest capacity accumulation graph for each shop in the shop group of an upper stream than the final assembling process shop group by one shop group unit and exploding the graph with a starting date being determined, a load is heaped at the latest position of each shop in a child shop group belonging to the upper stream shop group.

This accumulation graph is termed the latest load accumulation graph.

The latest load accumulation graphs for respective shops are added to form the latest load accumulation graph at the corresponding shop group.

By similarly forming the latest capacity accumulation graph for the latest load accumulation graph in each shop, the latest load accumulation graph can be formed for each shop in the next shop group.

Figure 27:
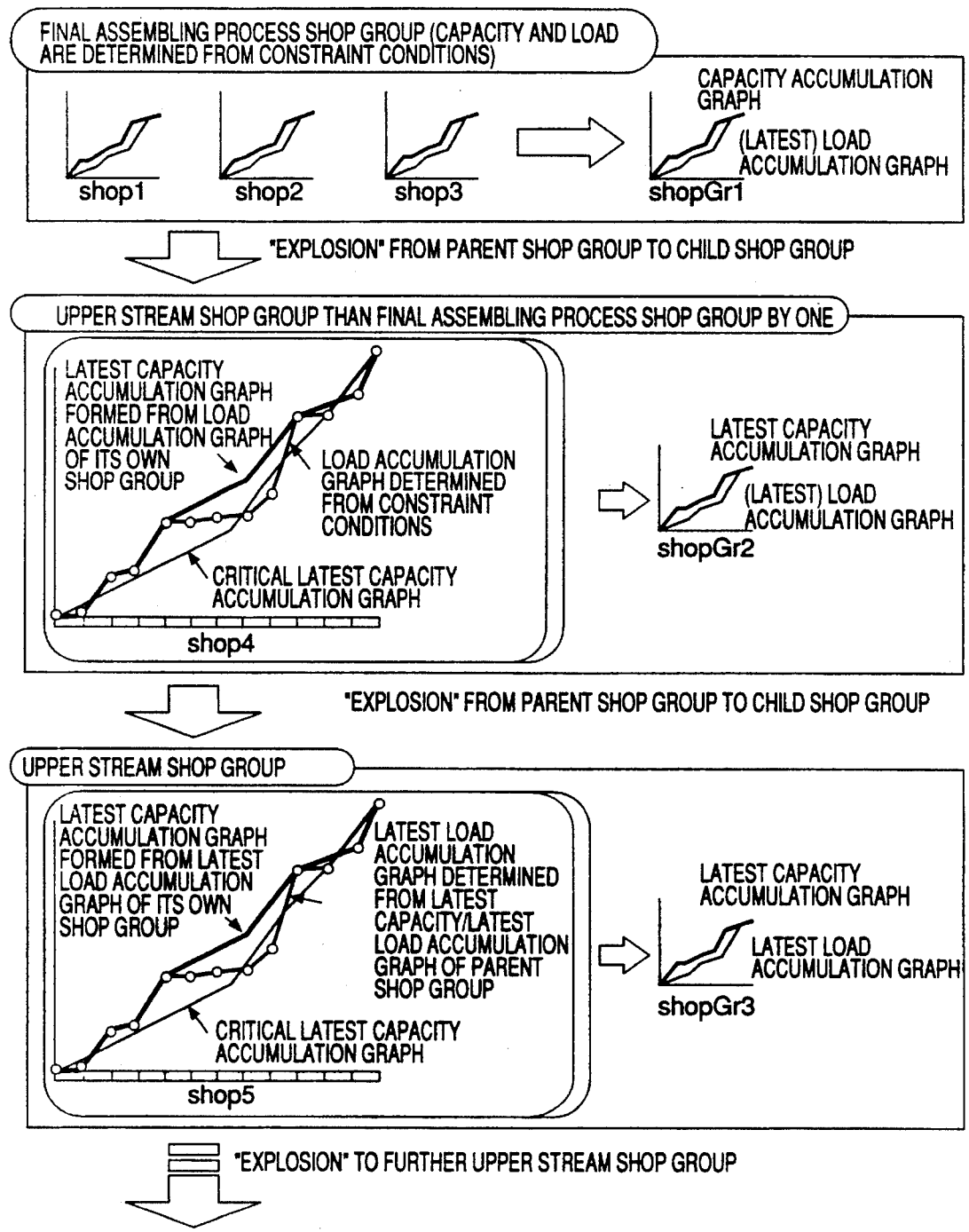
FIG. 27 is a diagram for explaining the latest load accumulation graph.

Subsequently, by similarly making "explosion" from a parent shop group to a child shop group, the latest load accumulation graph can be formed (see FIG. 27).

Load accumulation graphs for shops in the final assembling process shop group and an upper stream shop group than that by one and load accumulation graphs for those shop groups are also determined from the constraint conditions. For convenience sake, these load accumulation graphs are also termed the latest load accumulation graphs.

The flow of a processing performed by the problem area analysis device 137 will be explained on the basis of the above.

As has already been mentioned, the problem area analysis device 137 has a function of fetching production plan data 146 and constraint condition data 147 to produce analysis data 148.

The analysis data 148 is described on a data table as shown in FIG. 44. This data table is generally divided into two data tables.

One of the two data tables includes data concerning overload in the production plan data. The data is termed [overload data] (see the left portion of FIG. 24). The overload data is composed of three items of [generation of overload], [problematical shop group] and [list of overload amounts by problem analysis].

[Generation of overload] represents whether an overload is generated in a shop group or a shop. In the case where no overload is generated, "absence" is described. In the case where an overload is generated in an accumulation graph of a shop group, "shop group" is described. In the case where an overload is generated in an accumulation graph of a shop, "shop" is described.

[Problematical shop group] represents which shop group an overload is generated in. Irrespective of whether the overload is generated in a shop group or a shop, the name of the corresponding shop group is described.

[List of overload amounts by problem analysis] represents specific information of overload. The list includes a list for a plurality of overloads having a set of [shop name], [process completion date] and [overload amount] for one overload.

The other data table forming the analysis data is a data table concerning accumulation graph. This data table is termed [accumulation graph data] (see the right portion of FIG. 44). In general, the accumulation graph data includes two accumulation graphs or one for [shop] and the other for [shop group].

With regard to [shop], data of three graphs or [by-day upper limit capacity addition accumulation], [earliest capacity accumulation] and [latest load accumulation] graphs are described for each shop. With regard to [shop group], data of two graphs or [earliest capacity accumulation] and [latest load accumulation] graphs are described. As has already been mentioned, the earliest capacity accumulation graph is formed by joining reverse explosion earliest capacity accumulation graphs from an upper stream shop group. A shop group giving the basis of the earliest capacity accumulation graph is described by a shop group number for each day.

Figure 28:
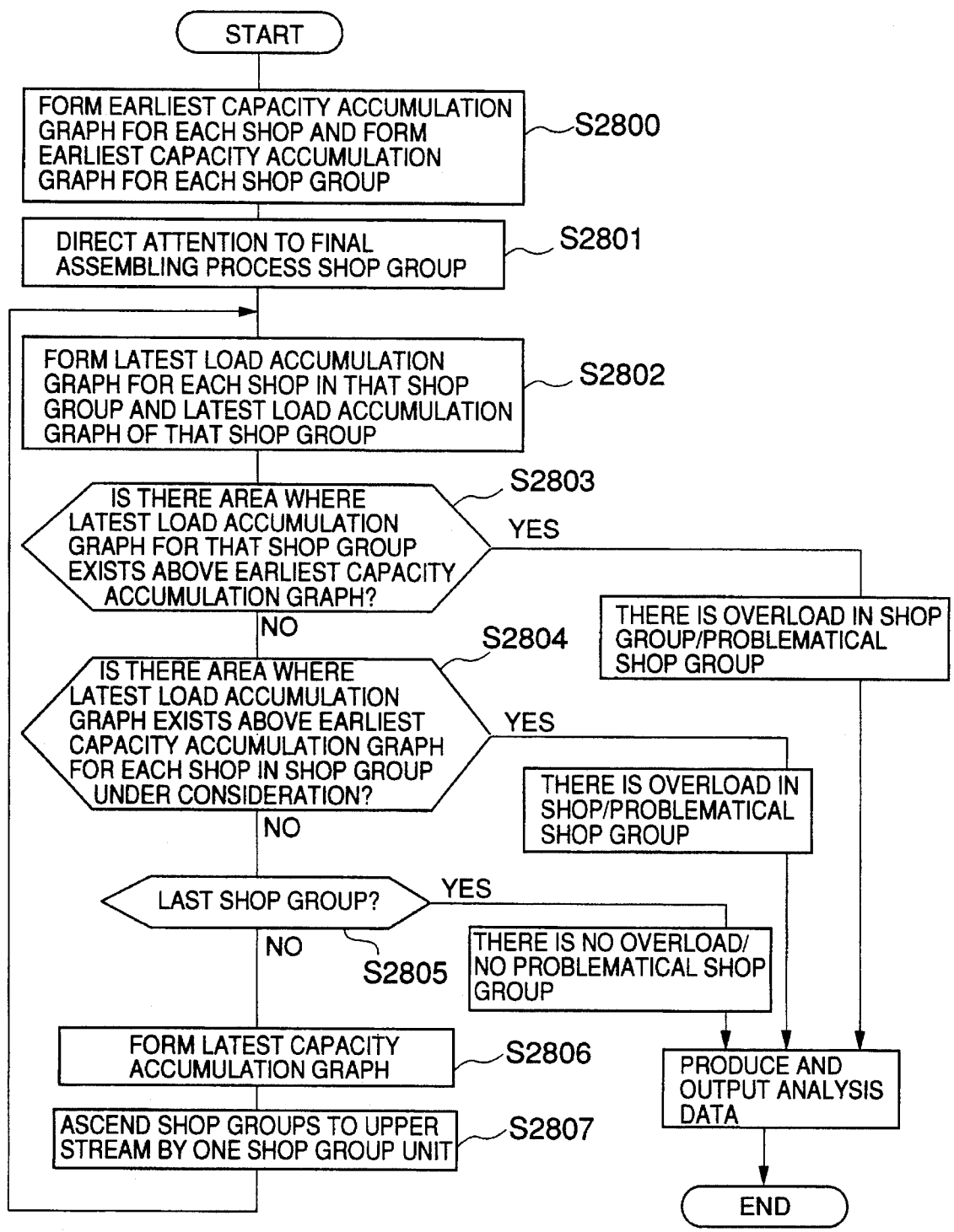
FIG. 28 is a flow chart of an example of a processing for problem area analysis.

Next, how to generate the analysis data 148 will be explained referring to FIG. 28.

The analysis of a problem in a production plan for each shop group is made toward an upper stream shop group from the final assembling process shop group as follows.

Explanation of a problem area analysis processing will now be explained referring to a flow chart shown in FIG. 28. First, the earliest capacity accumulation graph is formed for each shop and at the same time the earliest capacity accumulation graph of each shop group is also formed (step 2800).

Next, the processing is started with attention being directed to the final assembling process shop group (step 2801).

Figure 29:
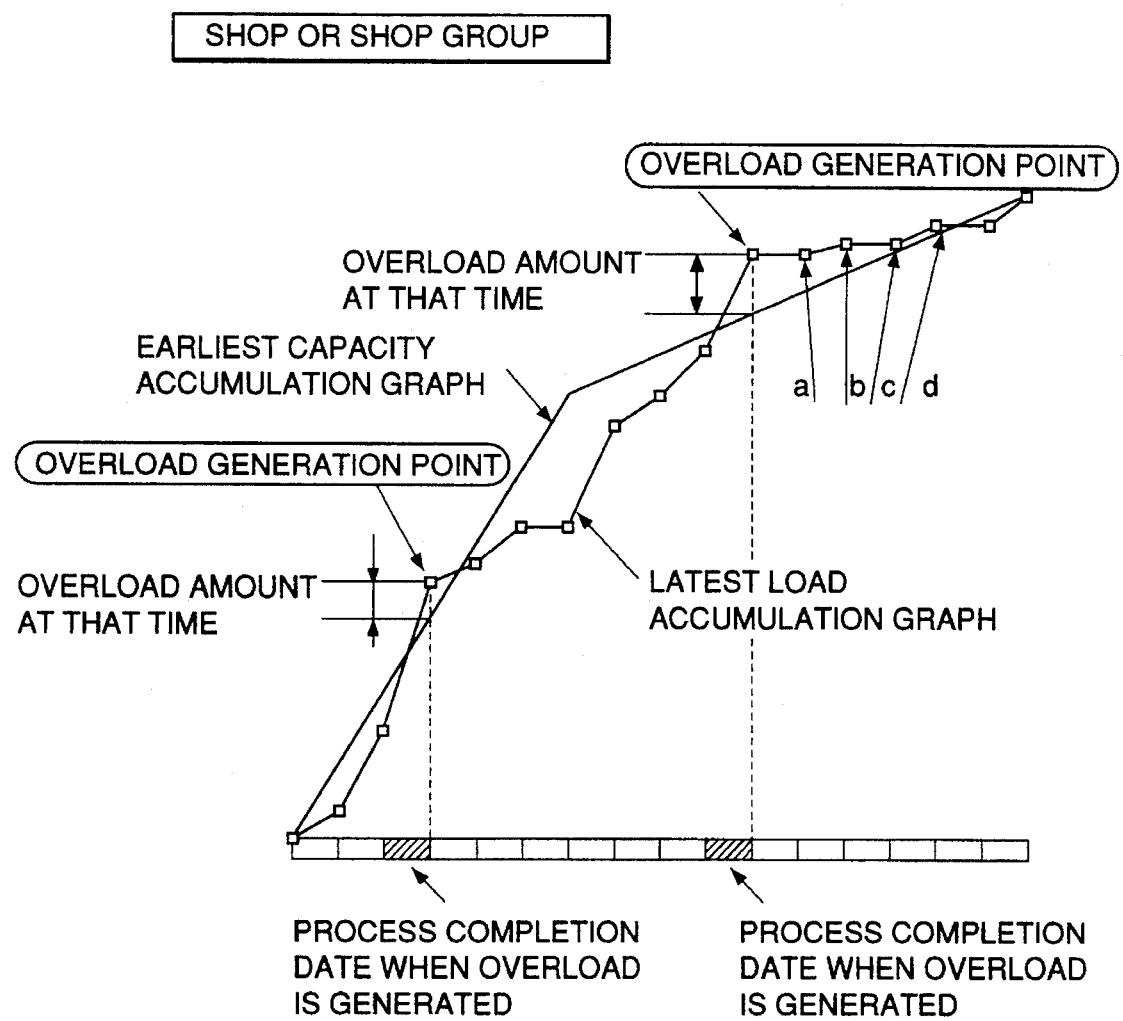
FIG. 29 is a diagram for explaining an example of the comparison of the earliest capacity accumulation graph and the latest load accumulation graph.

In the shop group of interest, the latest load accumulation graph of each shop is formed and the latest load accumulation graph of that shop group is formed (step 2802). Next, the latest load accumulation graph and the earliest capacity accumulation graph for that shop group are compared (step 2803). (One example of comparison is shown in FIG. 29.)

At this time, if there are overload areas where the latest load accumulation graph exists above the earliest capacity accumulation graph, selection is made in regular order from the first day and up to one of those overload areas involving the greatest overload and data including a set of [[(shop name=) unclear], [process completion date] and [overload amount]] for one overload area is described in the "list of overload amounts by problem analysis".

Generally, such a list may be tabulated in a semiconductor RAM.

Data including [[(generation of overload)=shop group], [shop group name] and [list of overload amounts by problem analysis]] as one set is outputted as the analysis data 148.

Also, if the latest load accumulation graph is not above the earliest capacity accumulation graph, the latest load accumulation graph and the earliest capacity accumulation graph for each shop in the shop group of interest are compared (step 2804).

At points a, b, c and d in FIG. 29, the latest load accumulation graph exceeds the earliest capacity accumulation graph. However, these overload states are not described in the overload list since they naturally disappear if an overload state generated at a point preceding the points a, b, c and d is canceled.

If there are overload areas where the latest load accumulation graph is above the earliest capacity accumulation graph, problematical ones of those overload areas are selected to make up a list of sets each of which includes [[shop name], [process completion date] and [overload amount]]. This list is termed "shop overload amount list".

After the shop overload amount lists have been made up for all shops having an area where the latest load accumulation graph is above the earliest capacity accumulation graph, a list is made up in which the shop overload amount lists are rearranged in order of earliness of time. This list is written into the "list of overload amounts by problem analysis". Such a list may be stored as a table in the RAM.

Data including [[(generation of overload)=shop], [shop group name] and [list of overload amounts by problem analysis]] as one set is outputted as the analysis data 148.

Also, if the latest load accumulation graph is not above the earliest capacity accumulation graph and the shop group of interest is the last shop group, data including [[(generation of overload)=absence], [(problematical shop group=) absence] and [(list of overload amounts by problem analysis=) absence]] as one set is outputted as the analysis data 148.

Also, if the latest load accumulation graph is not above the earliest capacity accumulation graph and the shop group of interest is not the last shop group, the latest capacity accumulation graph is formed for each shop in the shop group of interest. Further, ascent is made to an upper stream shop group than the shop group by one shop group unit and the flow branches to step 2802 (steps 2806 and 2807).

In outputting the analysis data 148, data of accumulation graphs for each shop and for each shop group generated until the outputting of the analysis data 148 is also outputted as the analysis data 148.

After the problem area analysis device 137 has outputted the analysis data 148 to the data retention device 11 or the in-constraint adjustment formulation device 142 has outputted additional analysis data 156 to the data retention device 11, the adjustment formulation control device 143 sends judgement carry-out instruction data 160 to the constraint relaxation judgement device 138.

When receiving the judgement carry-out instruction data 160, the constraint relaxation judgement device 138 operates.

In the following, the operation of the constraint relaxation judgement device 138 will be explained referring to FIGS. 30, 31, 32, 33 and 45.

The additional analysis data 156 has quite the same data table construction as the overload data of the analysis data 148.

In the device 156, the analysis data 148 and the additional analysis data 156 are handled in the same manner. Therefore, explanation will be made with the handling of the analysis data 148 being made an object.

The constraint relaxation judgement device has a function of fetching the production plan data 146, the constraint condition data 147 and the analysis data 148 to produce constraint relaxation judgement data 149.

FIG. 45 shows a data table of constraint relaxation judgement data.

The constraint relaxation judgement data is composed of three items of [result of constraint relaxation judgement], [shop group subjected to judgement] and [list of overload amounts by judgement].

For [result of constraint relaxation judgement] is described the result of judgement as to whether or not there is a possibility that overload data indicated by the analysis data can be canceled by a change in shop which is an adjustment in constraint conditions. Namely, either "constraint relaxation is unnecessary" or "constraint relaxation is necessary" is described.

For [shop group subjected to judgement] is described the name of a shop group subjected to constraint relaxation judgement. The judgement of constraint relaxation is made about whether or not there is a possibility that the overload can be canceled by a change in shop without giving an influence onto the other.

In the present embodiment, the constraint relaxation judgement is first started with an overload in [list of overload amounts by problem analysis] at [problematical shop group] of the analysis data being made an object. However, when there is no possibility that the overload can be canceled in the shop group under consideration, an overload is newly set in a parent shop group of the shop group under consideration and the judgement is made as to whether or not there is a possibility that the overload can be canceled.

Accordingly, the [shop group subjected to judgement] is a shop group name when a conclusion is made in the constraint relaxation judgement. The [list of overload amounts by judgement] is a list of overload amounts in the [shop group subjected to judgement]. The list includes four items of [[shop name], [process completion date], [overload amount] and [acceptable amount]] for one overload area. Speaking of a data table construction, the item of [acceptable mount] is added to the [list of overload amounts by problem analysis] of the analysis data.

The [acceptable amount] will be mentioned later on. In the following, [(list of overload amounts by judgement=) list of overload amounts by problem analysis] or [(list of overload amounts by problem analysis=) list of overload amounts by judgement] means making substitution for each overload area with regard to the three remaining items of [shop name], [process completion date] and [overload amount] excepting the item of [acceptable amount].

Figure 30:
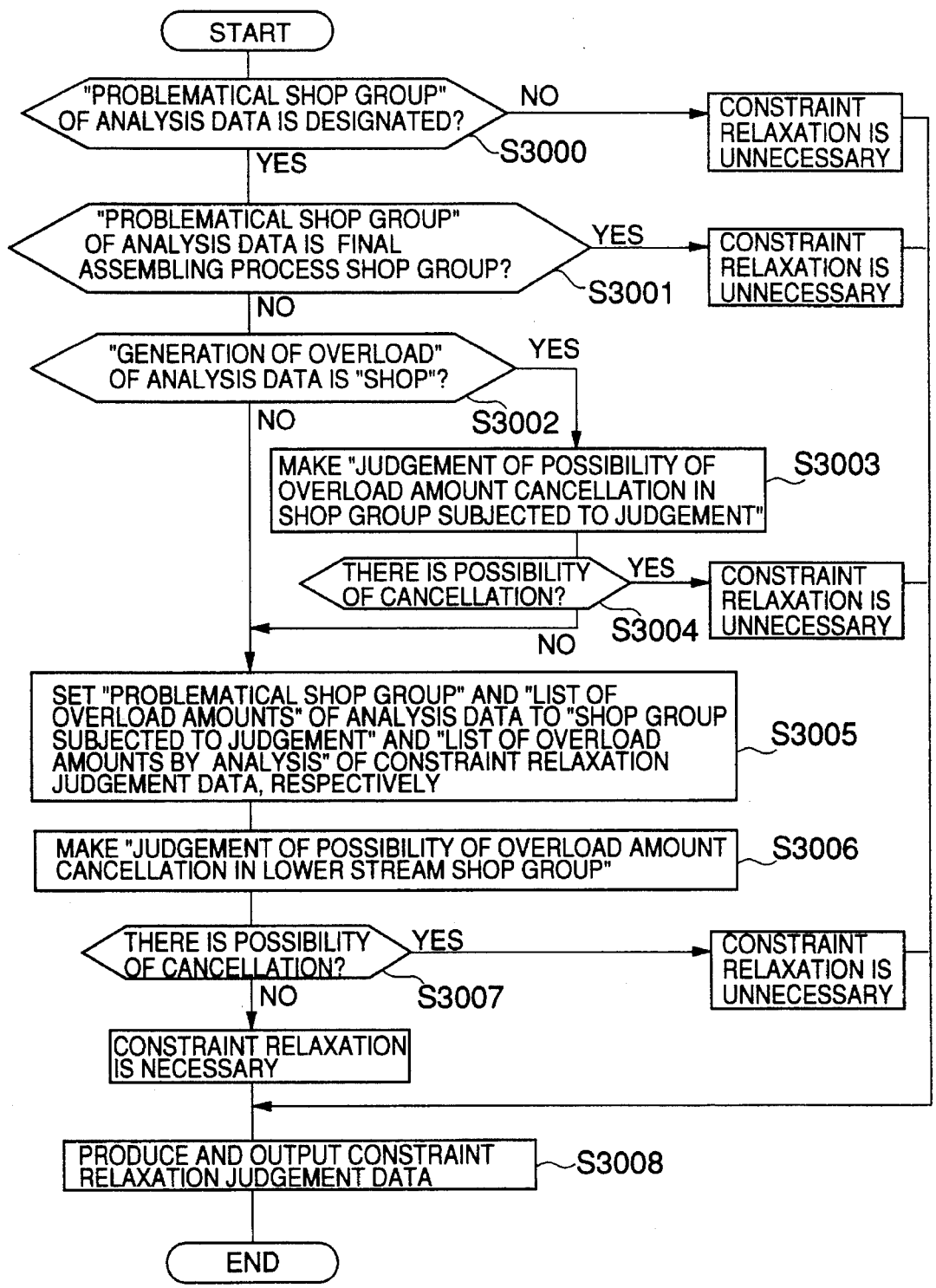
FIG. 30 is a flow chart of an example of a processing for constraint relaxation judgement.

Next, the flow of a processing for generation of the constraint relaxation judgement data 149 will be explained referring to FIG. 30.

In the following, explanation will be made of a constrain relaxation judgement processing.

First, the judgement is made of [problematical shop group] data forming the analysis data. Namely, in the case where a problematical shop group does not exist (step 3000), [[(result of constraint relaxation judgement=) constraint relaxation is unnecessary], [(shop group subjected to judgement=) absence] and [(list of overload amounts by judgement=) absence]] are outputted as the constraint relaxation judgement data 149 (step 3008).

Also, in the case where a problematical shop group exists and the problematical shop group is the final assembling process shop group (step 3001), [[(result of constraint relaxation judgement=) constraint relaxation is unnecessary], [(shop group subjected to judgement=) final assembling process shop group name] and [(list of overload amounts by judgement=) list of overload amounts by problem analysis]] are outputted as the constraint relaxation judgement data 149 (step 3008).

Further, in the case where a problematical shop group exists and the problematical shop group is not the final assembling process shop group and [generation of overload] of the analysis data is [shop] (step 3002), a processing for "judgement of possibility of overload amount cancellation in shop group subjected to judgement" is performed (step 3003). This judgement processing will be mentioned later on.

In the case where the result of judgement processing is "cancellation is possible" (step 3004), [[(result of constraint relaxation judgement=) constraint relaxation is unnecessary], [(shop group subjected to judgement=) problematical shop group] and [(list of overload amounts by judgement=) list of overload amounts by problem analysis]] are outputted as the constraint relaxation judgement data 149 (step 3008).

In cases other than the above cases, [problematical shop group] and [list of overload amounts by problem analysis] of the analysis data are respectively set to [shop group subjected to judgement] and [list of overload amounts by judgement] for initialization (step 3005).

Based on [shop group subjected to judgement] data, a processing for "judgement of possibility of overload amount cancellation in downstream shop group" is performed which is a processing for judgement whether or not there is a possibility that the overload of [list of overload amounts by judgement] can be canceled by a change in shop in a lower stream shop group (steps 3006 and 3007). This judgement method will be mentioned later on.

Also, in the case where there is a possibility of cancellation, [shop group subjected to judgement] and [list of overload amounts by judgement] newly set in the [judgement of possibility of overload amount cancellation in lower stream shop group] are used to output [[(result of constraint relaxation judgement=) constraint relaxation is unnecessary], [(name of shop group subjected to judgement) and [(list of overload amounts by judgement)]] as the constraint relaxation judgement data 149 (step 3008).

Further, if it is determined that there is no possibility of cancellation, [shop group subjected to judgement] and [list of overload amounts by judgement] newly set in the "judgement of possibility of overload amount cancellation in lower stream shop group" are used to output [[(result of constraint relaxation judgement=) constraint relaxation is unnecessary], [(name of shop group subjected to judgement) and [(list of overload amounts by judgement)]] as the constraint relaxation judgement data 149 (step 3008).

Next explanation will be made of the "judgement of possibility of overload amount cancellation in shop group subjected to judgement" of the "constraint condition relaxation judgement".

The judgement made here is not the strict judgement of a possibility but a judgement in level as to whether or not "there may be a possibility".

Namely, if an overload having a possibility of cancellation thereof exists even if all overloads in the [list of overload amounts by judgement] cannot be canceled, it is determined that there is a possibility.

Figure 31:
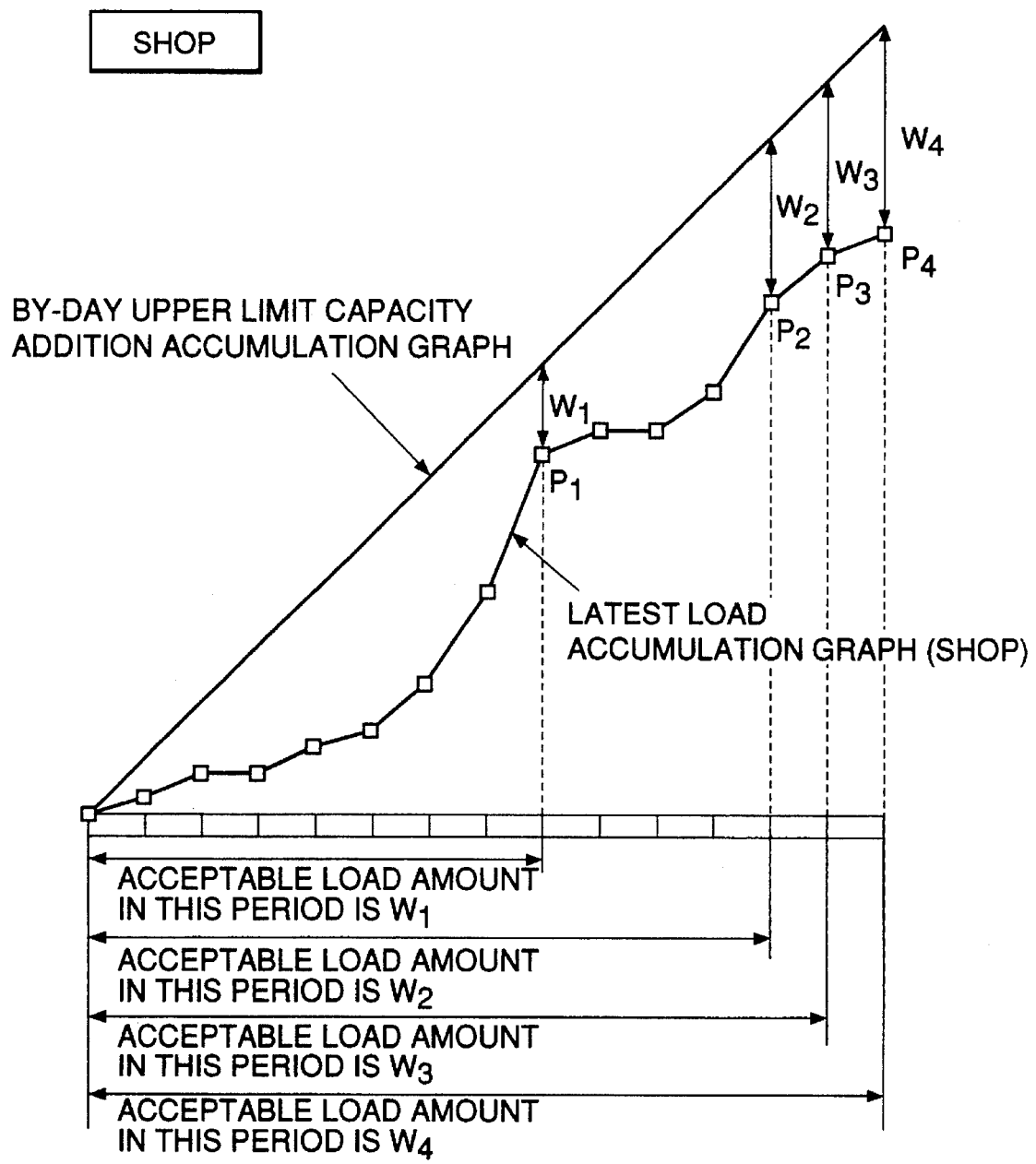
FIG. 31 is a diagram for explaining an acceptable load amount.

Now, prior to the explanation of "judgement of possibility of overload amount cancellation in shop group subjected to judgement", [acceptable load amount] relevant to this judgement and of a shop of interest will be explained referring to FIG. 31.

It is here assumed that when a load is moved with a change in shop, a capacity time is also changed by the corresponding load amount.

However, it is assumed that the upper limit total capacity time and the lower limit total capacity time in a period must be kept strictly as constraint conditions.

"Acceptable load amount" is a critical load amount with which the lateness for starting is not generated when a shop taking charge of a load is changed and which the corresponding shop can take charge of.

The "acceptable load amount" can be determined simply by use of accumulation graphs as follows.

In the following, explanation will be made of "calculation of acceptable load amount".

First, a "by-day upper limit capacity addition accumulation graph" (hereinafter abbreviated to "upper limit accumulation graph") of the accumulation graph data of the analysis data representing the accumulating amount of daily upper limit capacities at a shop of interest is compared with a load accumulation graph.

Next, provided that one of points on the broken line of the load accumulation graph from the first day of a plan period to the last day thereof nearest to the "upper limit accumulation graph" is a point $P_1$ and a distance of the point $P_1$ from the "upper limit accumulation graph" is $w_1$, an acceptable load amount from the first day to a day of the point $P_1$ is $w_1$.

Next, provided that one of points on the broken line of the load accumulation graph from the day of the point $P_1$ in the plan period to the last day thereof nearest to the "upper limit accumulation graph" is a point $P_2$ and a distance of the point $P_2$ from the "upper limit accumulation graph" is $w_2$, an acceptable load amount from the first day to a day of the point $P_2$ is $w_2$.

Subsequently, a similar processing is continued up to the last day of the plan period.

Also, the "judgement of possibility of overload amount cancellation in shop group subjected to judgement" is made in accordance with the following procedure.

First, the acceptable amount of each shop in [shop group subjected to judgement] is calculated from the first day of the plan period to the last day thereof (processing 1).

Next, [[shop name], [process completion date] and [overload amount]], which are the contents of [list of overload amounts by judgement], are fetched one by one in accordance with the list (processing 2).

Next, a total of acceptable amounts on the [process completion dates] at respective shops in the [shop group subjected to judgement] is made and a set of data of [[shop name], [process completion date] and [overload amount] in the [list of overload amounts by judgement] is added with the substitution of the value of total for [acceptable amount] data following the above data set (processing 3).

The processing 2 and the processing 3 are repeated until the description into the [list of overload amounts by judgement] reaches a completion point.

Next, a total of all [acceptable amounts] is made. If the value of total is not smaller than a predetermined proper threshold value, it is determined that "there is a possibility of cancellation". If the value of total is smaller than the threshold value, it is determined that "there is no possibility of cancellation" (processing 5).

Figure 32:
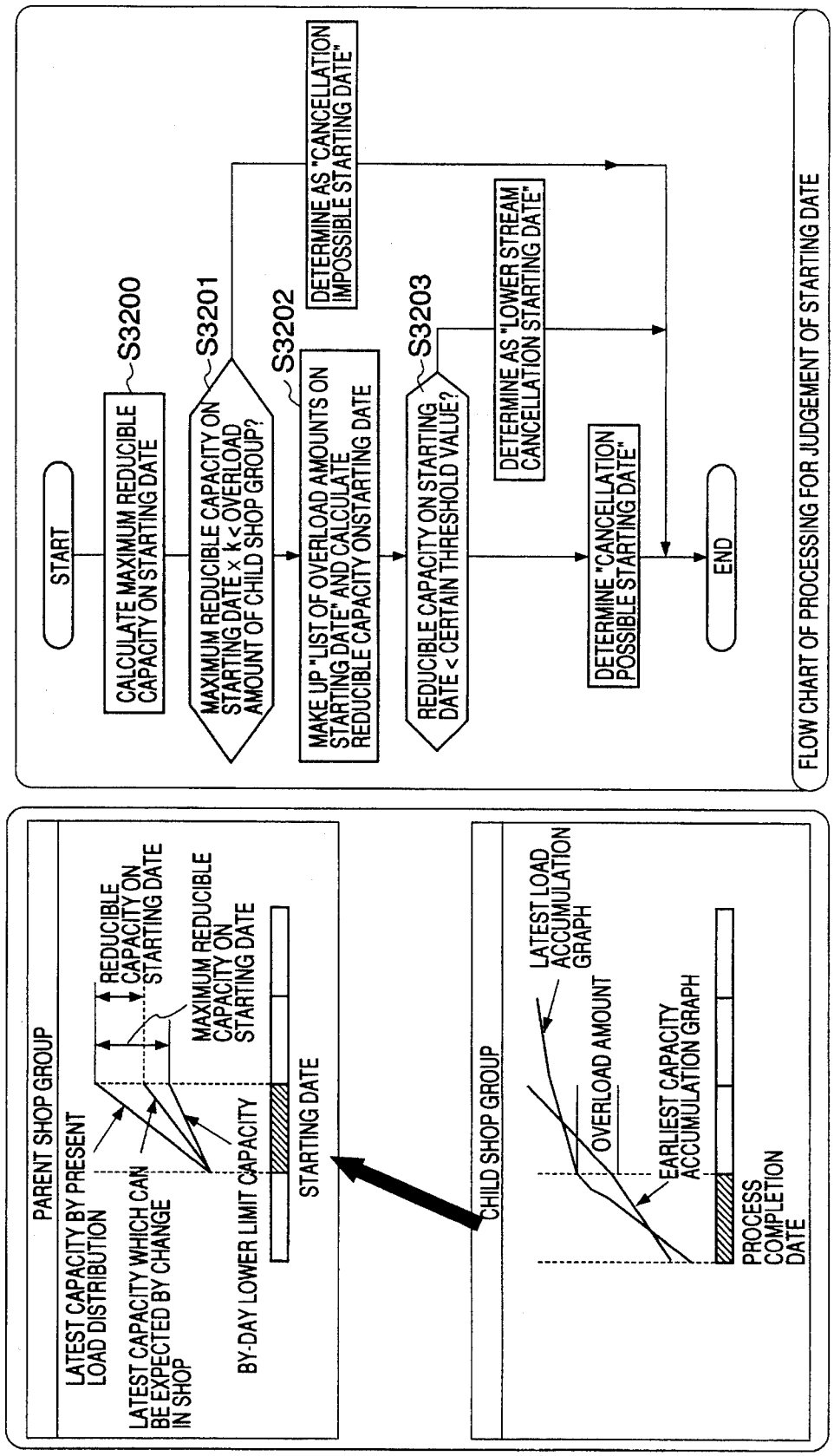
FIG. 32 is a diagram for explaining the judgement of a starting date.

Next, the processing for "judgement of possibility of overload amount cancellation in lower stream shop group" performed by the constraint relaxation judgement device 138 will be explained referring to FIGS. 32, 33 and 46.

Like the "judgement of possibility of overload amount cancellation in shop group subjected to judgement", the judgement made here is not the strict judgement of a possibility but a judgement as to whether or not "there may be a possibility".

Also, if an overload having a possibility of cancellation thereof exists even if all overloads in the [list of overload amounts by judgement] cannot be canceled, it is determined that there is a possibility.

First, explanation will be made of a relationship between a load amount of a certain shop group on a certain process completion date and a starting load amount of a parent shop group of the certain shop group on a starting date.

A load amount of a certain shop group on a certain process completion date is the multiplication of a starting load amount of a parent shop group of the certain shop group started on a starting date by a correction factor k such as the number (for example, the number of child parts required for manufacturing one parent part).

Accordingly, the cancellation of an overload amount on the certain process completion date by an adjustment at lower stream shop groups including the parent shop group is possible by reducing the starting load amount of the parent shop group.

It is herein assumed that the starting load amount is substantially equal to a capacity on the starting date.

This assumption is effective in the case where the variation in magnitude of each load for each item is not so large and the magnitude itself is substantially smaller than a capacity for one day.

According to this assumption, a difference between a capacity on a certain starting date at a certain shop group and a lower limit capacity on that date is a starting load amount which can be subtracted on that date, and the multiplication of this starting load amount by k is a load amount which can be subtracted on a process completion date in a child shop group.

"Judgement of starting date" is possible under this assumption. This will be explained referring to FIG. 32.

First, there are set [process completion date] and [overload amount at that time] at a shop group of interest.

Next, attention is directed to a starting date at a parent shop group of the shop group of interest.

If the multiplication of a difference between a capacity on the starting date and a lower limit capacity on that date by k is smaller than [overload amount at that time] (steps 3200 and 3201), the determination as "cancellation impossible starting date" is made. The difference will be termed "maximum reducible capacity on starting date".

Next, the multiplication of the maximum reducible capacity on starting date by k is larger than [overload amount at that time], the judgement is made as to whether or not the capacity on the starting date at the parent shop group can be reduced in that shop group (steps 3202 and 3203).

This judgement is made, for example, in accordance with the following procedure.

First, in order to turn the capacity on the starting date into the lower limit capacity in the parent shop group, a "list of overload amounts on starting date" is made up with data of a set of [[shop name], [process completion date] and [overload amount at that time]] for areas where an overload is generated at that shop group.

The significance of the earliest capacity accumulation graph only gives an allowable region of a load accumulation graph. The capacity of each shop is provided with the latest capacity accumulation graph in order to form the latest load accumulation graph.

Figure 43:
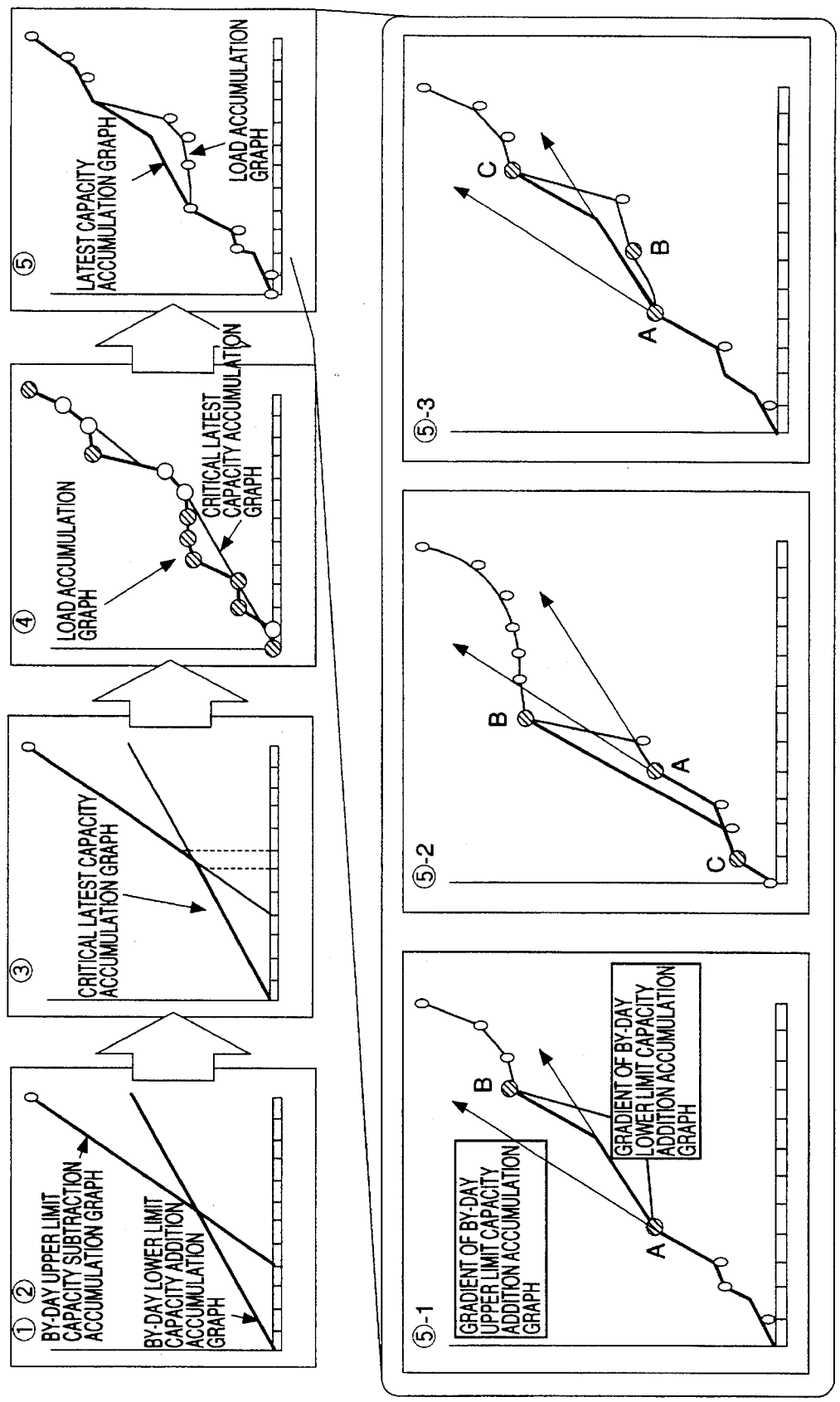
FIG. 43 is a diagram for explaining a method for forming the latest capacity accumulation graph.

The latest capacity accumulation graph depends upon the form of the latest load accumulation graph, as apparent from the explanation of a graph forming method made in conjunction with FIG. 43. Accordingly, in order to turn a capacity on a certain starting date at a certain shop group into the lower limit, it is necessary to change the form of the latest load accumulation graph for each shop in that shop group.

Overload amounts attendant upon the change in form are written into the "list of overload amounts on starting date" formed herein.

FIG. 46 shows the construction of the "list of overload amounts on starting date" in the form of a data table. The "list of overload amounts on starting date" is the same in construction as the [list of overload amounts by problem analysis] of the analysis data.

Next, which an overload described in the "list of overload amounts by problem analysis" can be reduced by is determined on the basis of a similar concept to the processing for "judgement of possibility of overload amount cancellation in shop group subjected to judgement". A capacity on a starting date capable of being reduced is called "reducible capacity on starting date".

If the "reducible capacity on starting date" is smaller than a certain predetermined threshold value, the starting date is determined as "lower stream cancellation starting date". If it is larger than the threshold value, the starting date is determined as "cancellation possible starting date".

Figure 33:
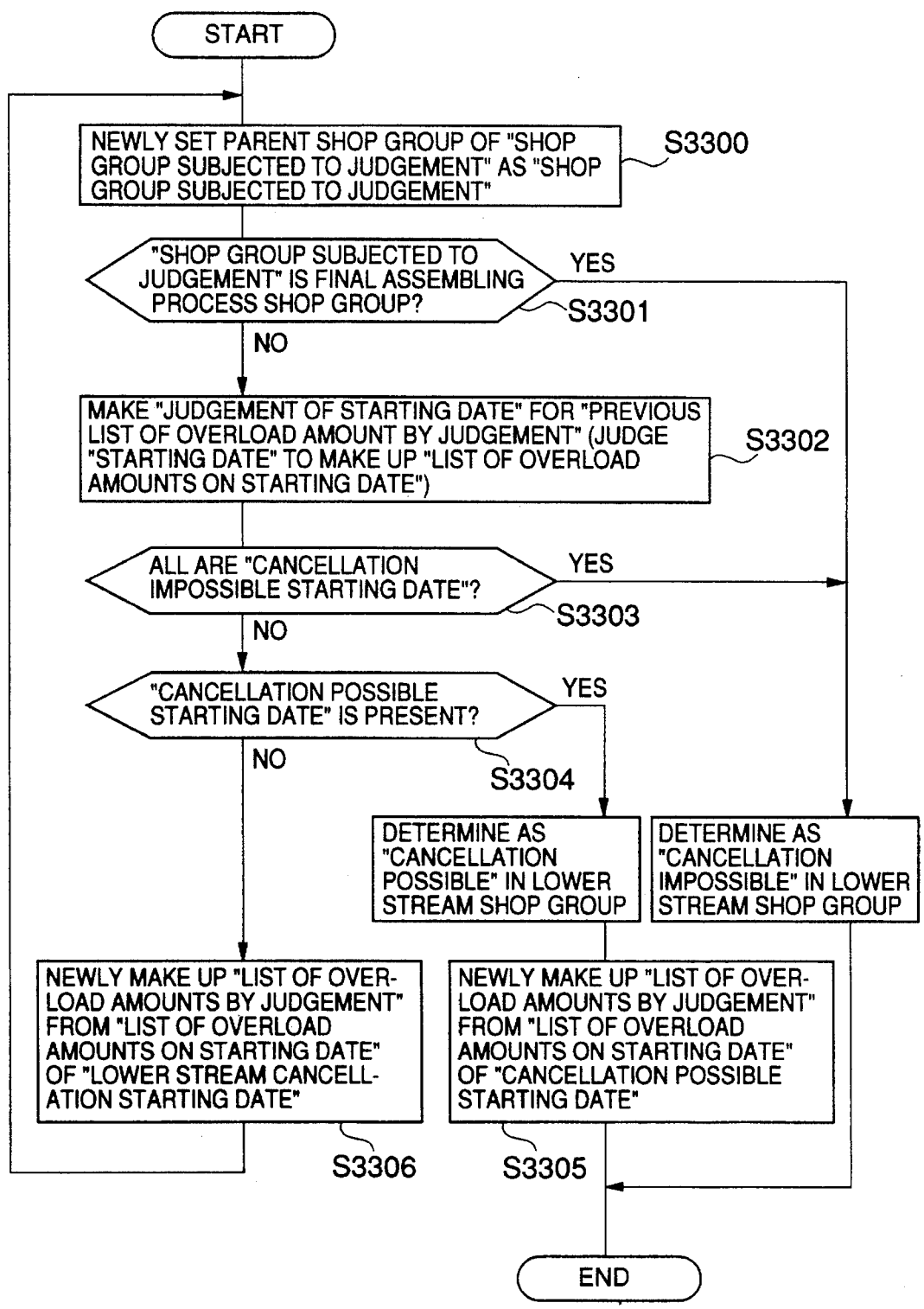
FIG. 33 is a flow chart of an example of a processing for judgement of the possibility of cancellation of an overload amount in a lower stream shop group.

Based on the foregoing explanation, the processing for "judgement of possibility of overload amount cancellation in lower stream shop group" will further be explained referring to FIG. 33.

First, a parent shop group of [shop group subjected to judgement] is newly set as [shop group subjected to judgement] (step 3300). The previous "shop group subjected to judgement" and "list of overload amounts by judgement" will be termed the "previous shop group subjected to judgement" and the "previous list of overload amounts by judgement", respectively.

Next, the judgement is made as to whether or not [shop group subjected to judgement] is the final assembling process shop group (step 3301).

If [shop group subjected to judgement] is the final assembling process shop group, it is determined that an overload amount is "cancellation impossible" in the "previous shop group subjected to judgement".

If [shop group subjected to judgement] is not the final assembling process shop group, the flow branches to step 3302.

In step 3302, [[shop name], [process completion date] and [overload amount at that time]] are fetched on by one from the "previous list of overload amounts by judgement" to make the "judgement of starting date" for all.

If the result of a processing for "judgement of starting date" is "cancellation impossible starting date" for all (step 3303), an overload is determined as being "cancellation impossible" in the "previous shop group subjected to judgement".

Also, if the result of the processing for "judgement of starting date" shows that "cancellation possible starting date" exists (step 3304), an overload is determined as being "cancellation possible" in the "previous shop group subjected to judgement".

At this time, a [list of overload amounts by judgement] is newly made up from the "list of overload amounts on starting date" of "cancellation possible starting date" (step 3305).

If "cancellation possible starting date" does not exist, a [list of overload amounts by judgement] is newly made up from the "list of overload amounts on starting date" of "lower stream cancellation possible starting date" (step 3306). Thereafter, the flow branches to step 3300 to repeat the processing.

The above is the explanation of the operation of the constraint relaxation judgement device 138.

The adjustment formulation control device 143 sends selection carry-out instruction data 161 to the efficient constraint relaxation selection device 139 in the case where the content of the constraint condition relaxation judgement data 149 is [constraint condition relaxation is necessary] and sends selection carry-out instruction data 162 to the efficient in-constraint adjustment selection device 5 in the case where it is [constraint condition relaxation is unnecessary].

Now, the operation of the efficient constraint relaxation selection device 139 will be explained referring to FIG. 34.

The efficient constraint relaxation selection device 139 takes in the selection carry-out instruction data 161 from the adjustment formulation control device 143 and operates.

The efficient constraint relaxation selection device 139 has a function of fetching in the production plan data 146, the constraint condition data 147 and the analysis data 148 to produce efficient constraint relaxation data 150.

Figure 47:
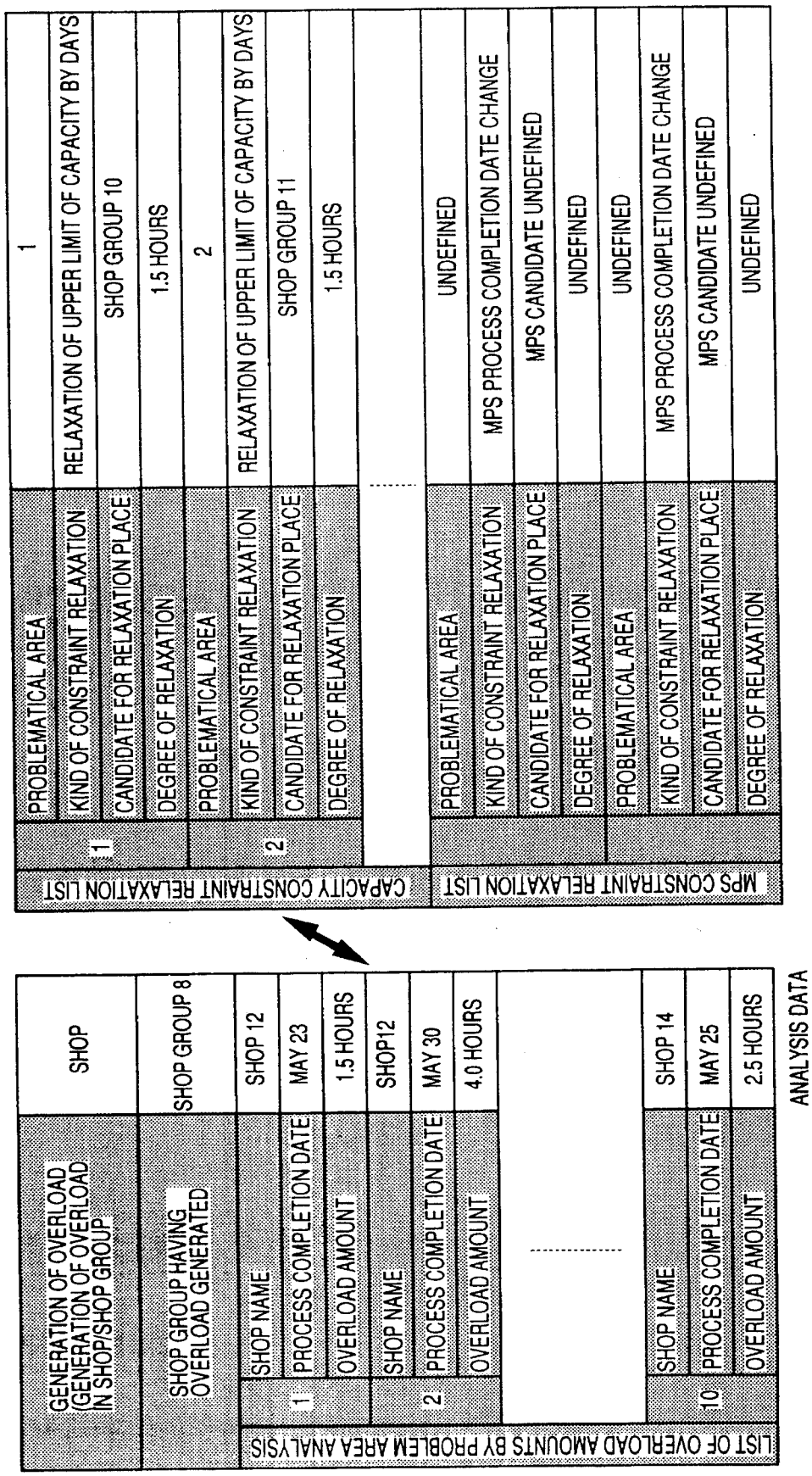
FIG. 47 is a diagram for explaining efficient constraint relaxation data.

FIG. 47 shows the construction of the efficient constraint relaxation data 150 in the form of a data table.

The efficient constraint relaxation data is generally composed of a "capacity constraint relaxation list" and an "MPS constraint relaxation list". The [capacity constraint relaxation list] is a list in which the relaxation of constraint for capacity is described. This list is lined with a plurality of sets each of which includes four items of [[problematical area], [kind of constraint relaxation], [candidate for relaxation place] and [degree of relaxation]].

[Problematical area] corresponds to one of overload areas in the [list of overload amounts by problem analysis] in the analysis data. A number of the [list of overload amounts by problem analysis] is described as [problematical area].

As [kind of constraint relaxation] is described "relaxation of upper limit of capacity by days" or "relaxation of upper limit of total capacity in period".

As [candidate for relaxation place] is described the name of a shop or shop group to be subjected to relaxation.

As [degree of relaxation] is described a time in the unit of hours corresponding to the relaxation of capacity to be made.

The data table construction of the "MPS constraint relaxation list" is also similar to that of the "capacity constraint relaxation list". In the present embodiment, however, it is assumed that as regards the constraint relaxation of MPS, the system formulates no detailed planning about what degree of constraint relaxation should be made in which MPS record.

The constraint relaxation of MPS can cancel a problematical overload surely so long as the degree of relaxation is made large. Therefore, as regards the constraint relaxation of MPS, the degree of relaxation is undefined and only the kind of an adjustment method for constraint relaxation of MPS is described as a candidate for efficient constraint relaxation.

Accordingly, in an initial state of the "MPS constraint relaxation list", the item of [kind of constraint relaxation] is prepared with two kinds of "MPS process completion date change" and "MPS production load change" and the other items of [problematical area] and so on are "undefined".

It is assumed that the efficient constraint relaxation selection device 139 generates only data of the constraint relaxation of capacity, that is, data including [candidate for relaxation place] and [degree of relaxation]. This merely shows one example of a processing. Though a processing concerning the constraint relaxation of MPS is omitted, it is easy to handle the "MPS constraint relaxation list" quite similarly to the "capacity constraint relaxation list" with regard to the table data construction, that is, as a list lined with a plurality of sets each of which includes four items of [[problematical area], [kind of constraint relaxation], [candidate for relaxation place] and [degree of relaxation]].

Next, explanation will be made of the flow of a processing for generating the efficient constraint relaxation data.

First, overload data of the analysis data 148, that is, three items of [[generation of overload], [problematical shop group] and [list of overload amounts by problem analysis]] are checked.

If [generation of overload] is [shop group], a "capacity constraint relaxation list" is made up from the earliest capacity accumulation graph of the [problematical shop group] and the "list of overload amounts by problem analysis" as follows.

First, a data set of [[shop name], [process completion date] and [overload amount]] is fetched from the "list of overload amounts by problem analysis" in accordance with the contents of the list.

A number of the "list of overload amounts by problem analysis" at that time is described as [problematical area].

Next, [kind of constraint relaxation] is determined from the gradient of a [process completion date] portion of the earliest capacity accumulation graph of the [problematical shop group].

The [kind of constraint relaxation] is determined as "relaxation of upper limit of capacity by days" if the gradient of the graph is formed on the basis of the upper limit of a capacity by days and as "relaxation of upper limit of total capacity in period" if it is not so.

Figure 34:
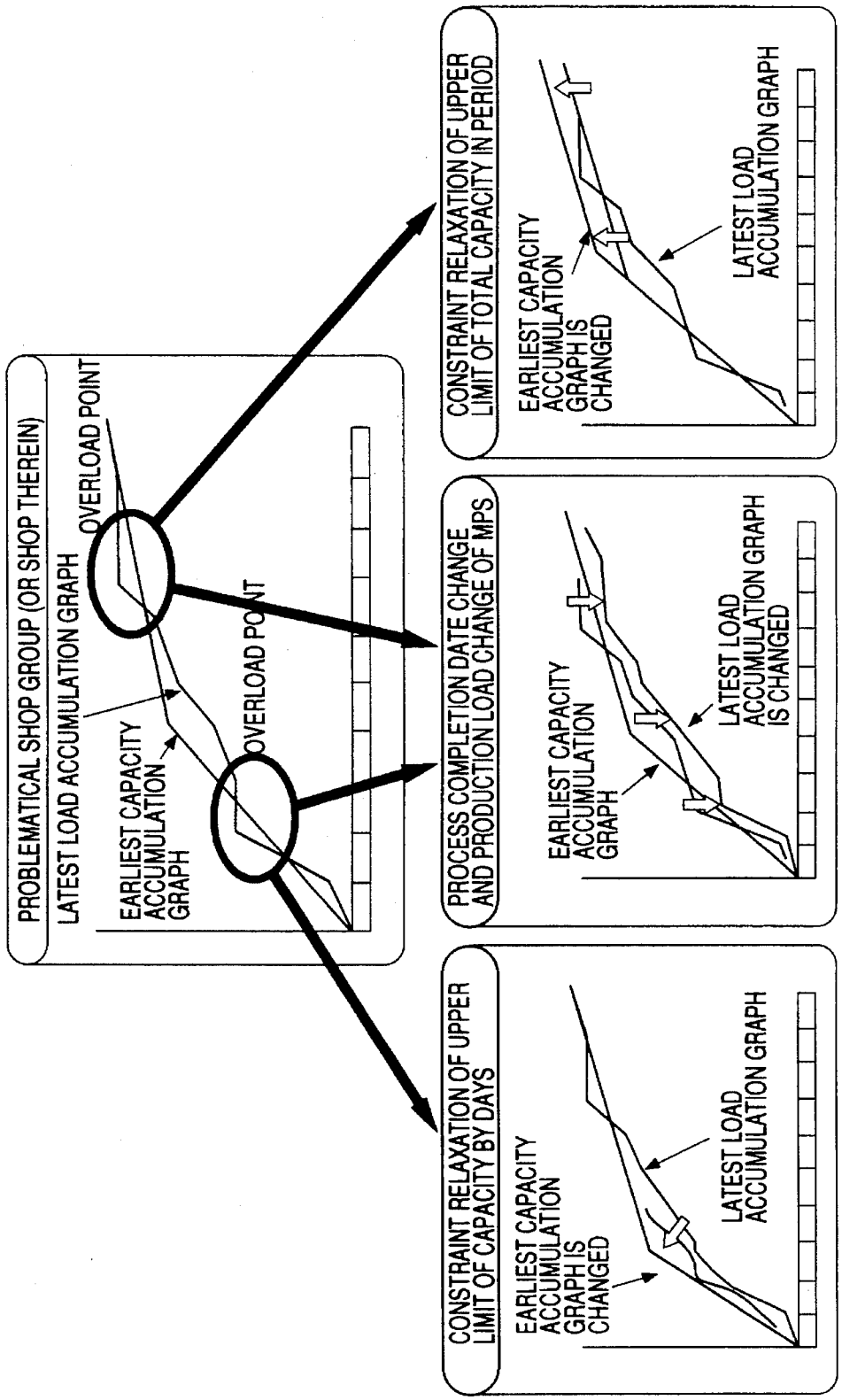
FIG. 34 is a diagram for explaining the selection of efficient constraint relaxation.

In FIG. 34, an overload is generated at two locations of the earliest capacity accumulation graph.

For an overload point on the left side, the [kind of constraint relaxation] is determined as "relaxation of upper limit of capacity by days" since the gradient of the graph on the overload point is formed on the basis of the upper limit of a capacity by days. For an overload point on the right side, the [kind of constraint relaxation] is determined as "relaxation of upper limit of total capacity in period" since the gradient of the graph on the overload point is not formed on the basis of the upper limit of a capacity by days.

The earliest capacity accumulation graph of a certain shop group is a patched-up version of a reverse explosion earliest capacity accumulation graph from a descendant shop group of the certain shop group and a self-earliest capacity accumulation graph. Therefore, a shop group having provided the earliest capacity accumulation graph, from which a portion of the earliest capacity accumulation graph of the certain shop group is formed by reverse explosion, is determined from [shop group]/[original shop group] in accumulation graph data of the analysis data 148, and the determined shop group is set as [candidate for relaxation place].

Further, if [kind of constraint relaxation] is "relaxation of upper limit of capacity by days", an amount obtained by leveling [overload amount] in the "list of overload amounts by problem analysis" by the number of days from the first day of a plan to [process completion date] is set as [degree of relaxation]. If [kind of constraint relaxation] is "relaxation of upper limit of total capacity in period", [overload amount] in the "list of overload amounts by problem analysis" is set as [degree of relaxation], as it is.

As shown in FIG. 34, the overload is canceled in such a manner that in the case of "relaxation of upper limit of capacity by days", the gradient of the earliest capacity accumulation graph becomes large so that the graph is swollen to the left and in the case of "relaxation of total capacity in period", a point of the right end of the earliest capacity accumulation graph is raised so that the graph is raised.

In this connection, FIG. 34 also shows that in the case of MPS change, the latest load accumulation graph is deformed so that the overload is canceled. A data set of [[kind of constraint relaxation], [candidate for relaxation place] and [degree of relaxation]] thus generated is written into a "capacity constraint relaxation list".

If [generation of overload] in the analysis data 148 is [shop], a "capacity constraint relaxation list" is made up from the earliest capacity accumulation graph and the "list of overload amounts by problem analysis" of each shop in [problematical shop group] as follows.

First, a data set of [[shop name], [process completion date] and [overload amount at that time]] is fetched from the list of overload amounts by problem analysis in accordance with the contents of the list. A number of the "list of overload amounts by problem analysis" at that time is described for [problematical area]. Next, the judgement as to [kind of constraint relaxation] is made from the gradient of a [process completion date] portion of the earliest capacity accumulation graph of a shop corresponding to [shop name].

The [kind of constraint relaxation] is determined as "relaxation of upper limit of capacity by days" if the gradient of the graph is formed from the upper limit of a capacity by days and as "relaxation of upper limit of total capacity in period" if it is not so.

That [shop name] is set as [candidate for relaxation place]. Further, if [kind of constraint relaxation] is "relaxation of upper limit of capacity by days", an amount obtained by leveling [overload amount] in the "list of overload amounts by problem analysis" by the number of days from the first day of a plan to [process completion date] is set as [degree of relaxation]. If [kind of constraint relaxation] is "relaxation of upper limit of total capacity in period", [overload amount] in the "list of overload amounts by problem analysis" is set as [degree of relaxation], as it is.

A data set of [[kind of constraint relaxation], [candidate for relaxation place] and [degree of relaxation]] thus produced is written into a "capacity constraint relaxation list".

After the "capacity constraint relaxation list" has been made up, this list is outputted as efficient constraint relaxation data 150 together with the "MPS constraint relaxation list" having already been written and prepared in the initial state, thereby completing the operation of the efficient constraint relaxation selection device.

In the case where an instruction by the person in charge of planning is "problem analysis", the efficient constraint relaxation data 150 as output data of the efficient constraint relaxation selection device 139 is transmitted to the data input/output device and is displayed in accordance with a predetermined format.

In this case, the operability can be improved by providing information to an operator, for example, by displaying predetermined matters on a CRT display screen.

In the case where an instruction by the person in charge of planning is "automatic adjustment formulation", the efficient constraint relaxation data 150 is sent to the undertaken constraint relaxation determination device 144.

When the efficient constraint relaxation data 150 is sent from the efficient constraint relaxation determination device 139 to the undertaken constraint relaxation determination device 144, the undertaken constraint relaxation determination device 144 operates.

Figure 48:
FIG. 48 is a diagram for explaining undertaken constraint relaxation data.
Figure 50:
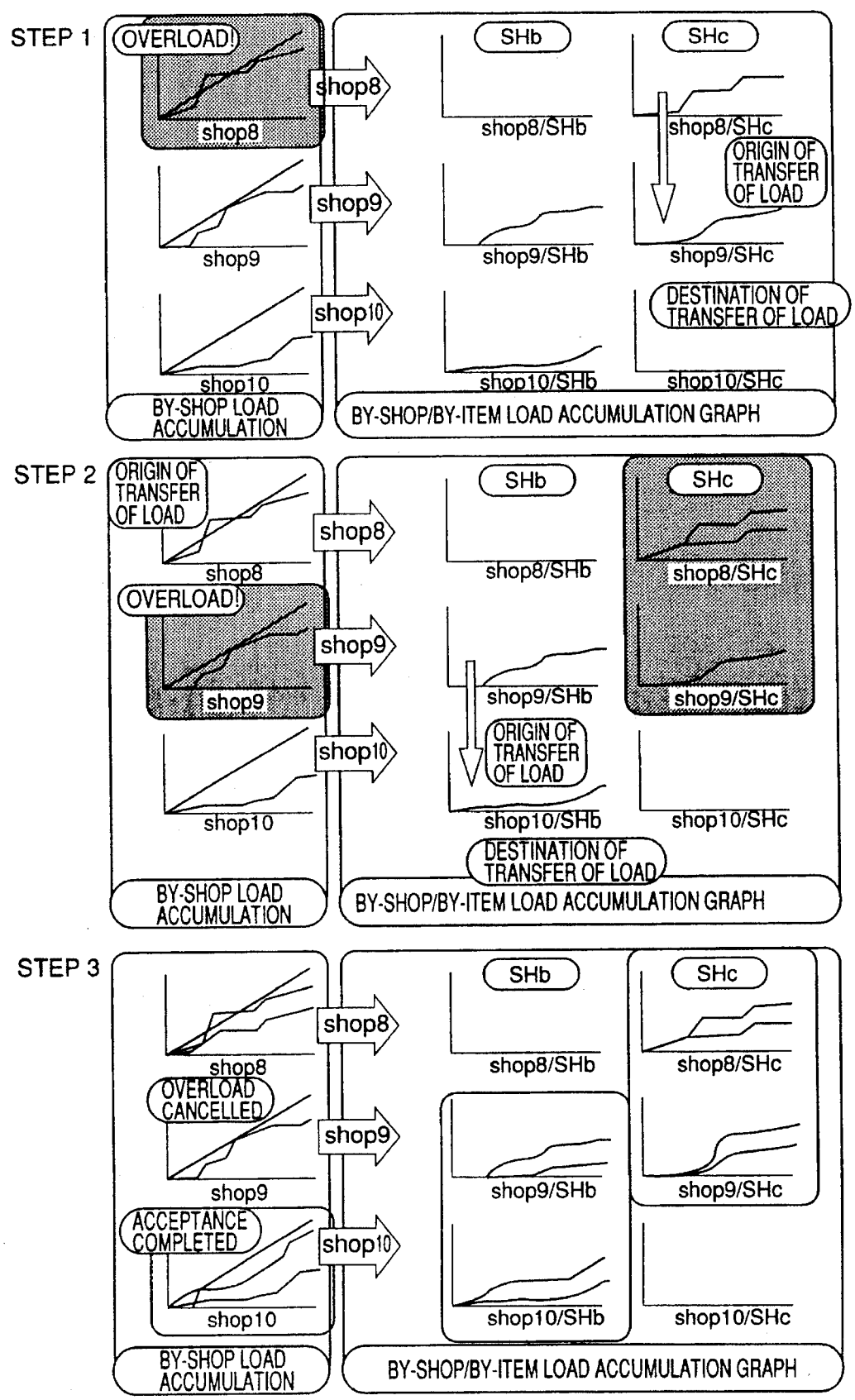
FIG. 50 is a diagram for explaining a path.

A processing performed by the undertaken constraint relaxation determination device will be explained using FIG. 48.

First, from the "capacity constraint relaxation list" of the efficient constraint relaxation data 150, the undertaken constraint relaxation determination device 144 extracts, for each [kind of constraint relaxation], that one of data sets each including four items of [[problematical area], [kind of constraint relaxation], [candidate for relaxation place] and [degree of relaxation]] which has the largest [degree of relaxation].

A list is made up which has the extracted data sets as members. This list is termed undertaken constraint relaxation candidate data. An "MPS constraint relaxation list" is added into the undertaken constraint relaxation candidate data as it is.

The undertaken constraint relaxation determination device has a constraint relaxation priority table stored therein. Each data set of [[kind of constraint relaxation] and [degree of relaxation]] and the priority of that set are described in the constraint relaxation priority table. After the undertaken constraint relaxation candidate data has been generated, reference is made to the constraint relaxation priority table to rearrange the members of the undertaken constraint relaxation candidate list in order of priority from a higher one.

A member having the highest priority is outputted as undertaken constraint relaxation data 151.

At the point of time when the undertaken constraint relaxation data 151 is outputted to the constraint relaxation adjustment formulation device 140, the operation of the undertaken constraint relaxation determination device is completed.

The constraint relaxation adjustment formulation device 140 operates when receiving the undertaken constraint relaxation data 151 from the undertaken constraint relaxation determination device 144 or receiving undertaken constraint relaxation data 151 from the data input/output device 12.

The constraint relaxation adjustment formulation device 140 has a function of fetching the production plan data 146, the constraint condition data 147, the analysis data 148 and the undertaken constraint relaxation data 151 to produce constraint relaxation adjustment formulation data 152. The constraint relaxation adjustment formulation data 152 and in-constraint adjustment formulation data 155 are stored with the quite same data table construction. FIG. 49 shows a data table construction as adjustment formulation data. The data table can be prepared on, for example, a disk device or a semiconductor RAM.

The adjustment formulation data is composed of items of [A1], [A2], ---, [B1], [B2], ---.

Specific contents of adjustment formulation by one kind of adjustment method are described in each item.

Adjustment formulations of [A1], [A2], --- in an adjustment formulation [A] series have a logical AND relationship between them. Namely, it is better that [A1] is carried out and [A2] is carried out and the other adjustment method is carried out.

Subsequent series including an adjustment formulation [B] series have a logical OR relationship with the adjustment formulation [A] series. Namely, it is better that the adjustment formulation [A] series is carried out or the adjustment formulation [B] series is carried out or the other adjustment formulation series is carried out.

In the present embodiment, however, since the undertaken constraint relaxation data 151 or the undertaken in-constraint adjustment data 154 is restricted to only one data by the undertaken constraint relaxation determination device 144 or the undertaken in-constraint adjustment determination device 145, formulations of the adjustment formulation [B] series and the subsequent series are not specifically carried out.

In the case where the undertaken constraint relaxation data 151 or the undertaken in-constraint adjustment data 154 has a plurality of data, the specific contents of adjustment are formulated for the respective data and are written into the adjustment formulation [B] series and the subsequent series.

The adjustment formulation data item such as [A1], [A2], --- has a data table construction including three kinds of data tables "capacity change type", "shop change type" and "MPS change type".

The "capacity change type" data table is composed of three items of [[kind of adjustment], [period] and [shop]].

"Capacity change" is described as [kind of adjustment], and dates in a plan period made an object are described as [period]. As [shop] are described a shop name and a capacity (or work time) of each date of the period.

The "shop change type" data table includes a list of sets each of which is composed of four items of [[kind of adjustment], [MRP No.], [process completion date], [origin of transfer] and [destination of transfer]].

"Shop change" is described as [kind of adjustment], and one shop change is represented by the four items of [[kind of adjustment], [MRP No.], [process completion date], [origin of transfer] and [destination of transfer]] which are respectively described with "MRP number" of a job subjected to shop change, a process completion date of that job, the present shop name for that job, and a shop name of the destination of change for that job.

In the present embodiment, no specific contents are formulated for constraint relaxation involving the change of MPS, as has already been mentioned. Accordingly, in the case where the undertaken constraint relaxation data 151 includes "MPS process completion date change" or the like, the representation is given referring to the situation of generation of overloads.

Namely, a data table in the case of "MPS change type" is one in which the item of [kind of adjustment] is added to the data table construction of overload data of the analysis data 148.

"MPS process completion date change" or "MPS production load change" is described as [kind of adjustment]. The explanation of the overload data of the analysis data 148 has already been made.

Next, explanation will be made of a method of generating the constraint relaxation adjustment formulation data 152 by the constraint relaxation adjustment formulation device 140. First, when [kind of constraint relaxation] of the undertaken constraint relaxation data 151 is "MPS process completion date" or "MPS production load change", the latest capacity heaped state of each shop is produced again from the latest capacity accumulation graph of each shop in the analysis data 148 and the result is used as "capacity change type" adjustment formulation [A1]. And, "MPS change type" adjustment formulation [A2] is generated from [kind of constraint relaxation] of the undertaken constraint relaxation data and overload data (that is, [[generation of overload], [problematical shop group] and [list of overload amounts by problem analysis]] of the analysis data 148. The adjustment formulations [A1] and [A2] are outputted as constraint relaxation adjustment formulation data 152.

Also, when [kind of constraint relaxation] of the undertaken constraint relaxation data 151 is "relaxation of upper limit of capacity by days" or "relaxation of upper limit of total capacity in period", the latest capacity heaped state of each shop is produced again from the latest capacity accumulation graph of each shop in the analysis data and a capacity heaped state of each shop is newly produced in accordance with the latest capacity heaped state and the contents of undertaken constraint relaxation data [[problematical area], [candidate for relaxation place], [degree of relaxation] and [capacity constraint relaxation list]]. The result is used as adjustment formulation [A1]. And, the adjustment formulation [A1] is outputted as constraint relaxation adjustment formulation data 152.

At the point of time when the constraint relaxation adjustment formulation data 152 is outputted, the operation of the constraint relaxation adjustment formulation device is completed.

After completion of the operation of the constraint relaxation adjustment formulation device 140, the data input/output device 12 is inputted with the constraint relaxation adjustment formulation data 152 from the constraint relaxation adjustment formulation device 140 and displays the data in accordance with a predetermined format, thereby completing the processing. In this case, the operability can be improved by providing information to an operator, for example, by displaying predetermined matters on a CRT display screen.

Next, the efficient in-constraint adjustment selection device 141 will be explained.

When receiving selection carry-out instruction data 162 from the adjustment formulation control device 143, the efficient in-constraint adjustment selection device 141 operates.

The efficient in-constraint adjustment selection device 141 has a function of fetching the production plan data 145, the constraint condition data 147, the analysis data 148 and the constraint relaxation judgement data 149 to produce efficient in-constraint adjustment data 153.

The efficient in-constraint adjustment data 153 includes a row of items of [kind of adjustment].

First, [shop group subjected to judgement] of the constraint relaxation judgement data 149 is checked. If it is "(shop group subjected to judgement=) absence", "only capacity allotment change adjustment" is written as [kind of adjustment] and is outputted as the efficient in-constraint adjustment data 153.

In the case where there is a shop group subjected to judgement, "capacity allotment change and shop change adjustment" is written as [kind of adjustment] and is outputted as the efficient in-constraint adjustment data 153. At the point of time when the efficient in-constraint adjustment data 153 is outputted, the operation of the efficient in-constraint adjustment selection device 141 is completed. In the case where an instruction by the person in charge of planning is "problem analysis", the efficient in-constraint adjustment data 153 as an output of the efficient in-constraint adjustment selection device 141 is sent to the data input/output device 153 and is displayed on, for example, a CRT.

In the case where an instruction by the person in charge of planning is "automatic adjustment formulation", the efficient in-constraint adjustment data 153 is sent to the undertaken in-constraint adjustment determination device 145.

When the efficient in-constraint adjustment data 153 is sent to the undertaken in-constraint adjustment determination device 145 from the efficient in-constraint adjustment selection device 141, the undertaken in-constraint adjustment determination device 145 operates.

The undertaken in-constraint adjustment determination device 145 first checks the efficient in-constraint adjustment data 153. If [kind of adjustment] of the efficient in-constraint adjustment data is one in number, the one is outputted as undertaken in-constraint adjustment data 154 as it is.

The undertaken in-constraint adjustment determination device has an in-constraint adjustment priority table stored therein. An adjustment method and the priority of that method are described in the in-constraint adjustment priority table. In the case where [kind of adjustment] is plural in number, reference is made to the in-constraint adjustment priority table to rearrange the adjustment methods in order of priority from a higher one. First, an adjustment method having the highest priority is outputted as undertaken in-constraint adjustment data 154.

At the point of time when the undertaken in-constraint adjustment data 154 is outputted to the in-constraint adjustment formulation device 142, the operation of the undertaken in-constraint adjustment determination device is completed.

In the present embodiment, since the efficient in-constraint adjustment selection device 141 only writes one [kind of adjustment] of the efficient in-constraint adjustment data 153, data is merely passed with a name thereof changed. However, in the case where a plurality of adjustment methods are selected through a processing by the efficient in-constraint adjustment selection device 141, the in-constraint adjustment priority table will be used effectively similarly to the undertaken constraint relaxation determination device 144.

When receiving the undertaken in-constraint adjustment data 154 from the undertaken in-constraint adjustment determination device 145 or the undertaken in-constraint adjustment data 154 from the data input/output device 12, the in-constraint adjustment formulation device 142 operates.

The in-constraint adjustment formulation device 142 has a function of fetching the production plan data 146, the constraint condition data 147, the analysis data 148, the constraint relaxation judgement data 149 and the undertaken in-constraint adjustment data 154 to produce the in-constraint adjustment formulation data 155.

As has already been mentioned, the data table construction of the in-constraint adjustment formulation data 155 is as shown in FIG. 49.

Next, explanation will be made of a method for producing the in-constraint adjustment formulation data 55.

First, in the case where [kind of adjustment] of the undertaken in-constraint adjustment data is "only capacity allotment change adjustment", the latest capacity heaped state of each shop is produced again from the latest capacity accumulation graph of each shop existing in the analysis data and is written into "capacity change type" adjustment formulation [A1].

And, the adjustment formulation [A1] is outputted as the in-constraint adjustment formulation data 155.

Also, in the case where [kind of adjustment] of the undertaken in-constraint adjustment data is "capacity allotment change and shop change adjustment", the latest capacity heaped state of each shop is produced again from the latest capacity accumulation graph of each shop in the analysis data in a manner similar to that in the case of "only capacity allotment change adjustment" and is left as "capacity change type" adjustment formulation [A1].

Next, "shop change type" adjustment formulation [A2] is produced from [[shop group subjected to judgement] and [list of overload amounts by judgement]] of the constraint relaxation judgement data 149 and the latest load accumulation graph for each shop in [shop group subjected to judgement] as follows.

First, the latest load accumulation graph for each shop is divided for each of items produced at each shop in [shop group subjected to judgement] to form a by-shop/by-item latest load accumulation graph.

Figure 35:
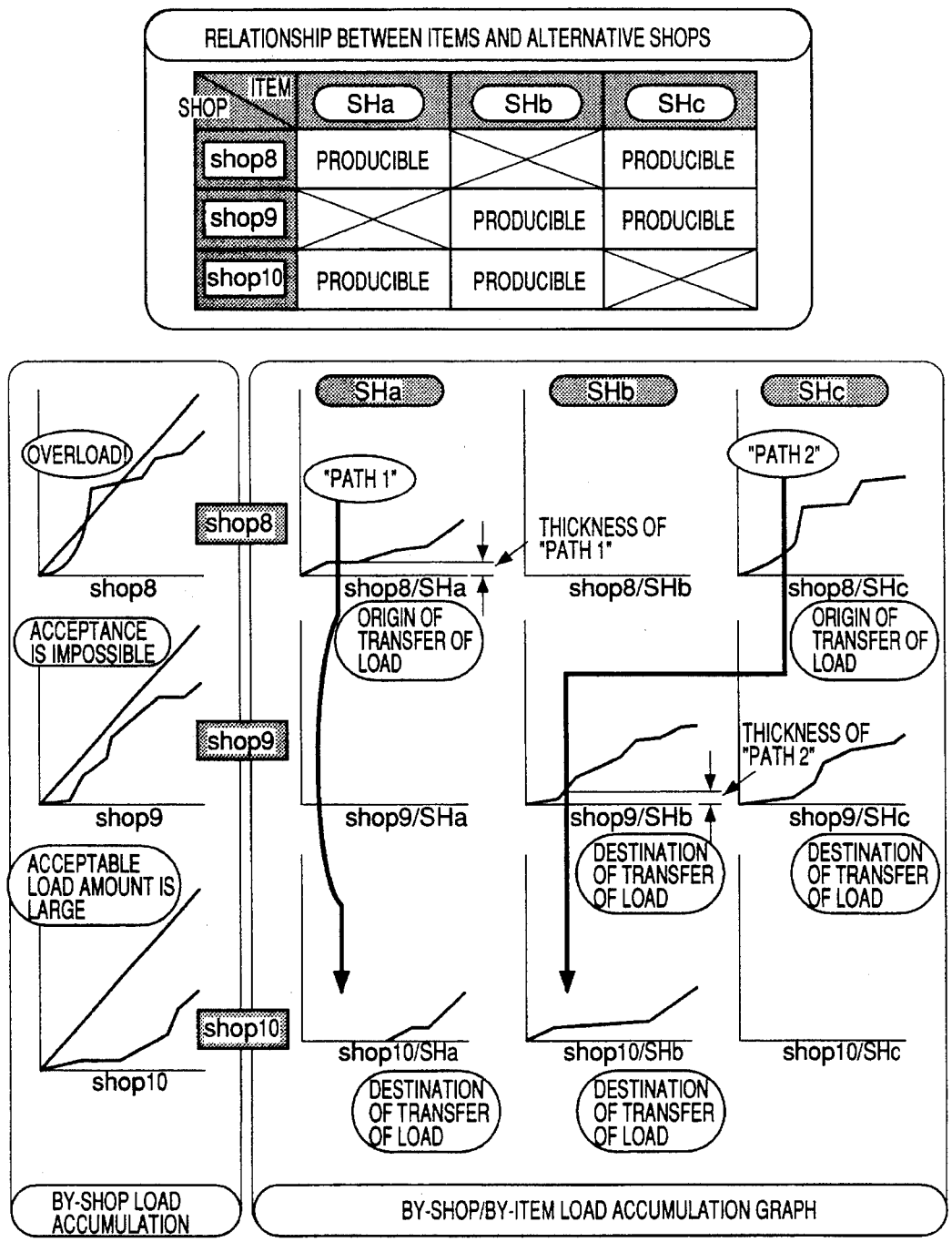
FIG. 35 is a diagram for explaining the shop change of a load by a "path"

FIG. 35 shows the case of shop group 4.

This shop group includes three shops including shops 8 to 10 and items produced at this shop group include three kinds of items including SHa, SHb and SHc. A relationship between shops and items is provided as a by-item alternative shop list, as shown in the upper portion of FIG. 35.

On the left side of the lower portion of FIG. 35 is written a by-shop/by-item latest load accumulation graph of each of shops 8 to 10. In the shown example, since there are three items, three by-shop/by-item latest load accumulation graphs obtained by dividing the content of a load for the respective items can be formed for each shop.

Nine by-shop/by-item latest load accumulation graphs can be formed as a whole, as shown by the right portion of FIG. 35. In the following, for example, a by-shop/by-item latest load accumulation graph for an item SHa at the shop 8 is represented by [shop 8/SHa].

After the by-shop/by-item latest load accumulation graphs have been formed, a data set of [[shop name], [process completion date] and [overload amount]] is taken out in accordance with the contents of the [list of overload amounts by judgement]. Next, "acceptable load amounts" of other shops on that [process completion date] are calculated and the shops are placed in order of magnitude of the acceptable load amount from a larger one to make up a "list of acceptable shops", and a shop change from a shop having [shop name] in the "list of overload amounts by judgement" to a shop in the "list of acceptable shops" is formulated.

When attention is directed to a certain shop, a "path" from the certain shop to another shop in a shop group to which the certain shop group belongs can be determined from an "item/alternative shop list" for items produced at that shop group.

The term "path" herein used means a path along which a load is transferred directly or indirectly when a production load is transferred.

Such a "path" can be represented as the permutation of by-shop/by-item latest load accumulation graphs through which a load passes when it moves.

The example shown in FIG. 35 is in a state in which an overload is generated at shop 8 and hence it is desired to transfer the load to another shop. However, it is impossible to transfer the load to shop 9 since if the load is accepted by shop 9, an overload will be generated newly at shop 9.

Thus, since shop 10 has an available capacity for acceptance of a load, it is considered to transfer the load from shop 8 to shop 10.

Two paths may be considered for transferring the load from shop 8 to shop 10.

One path is direct transfer of the load. In this path, attention is directed to items which can be produced by both shop 8 and shop 10. Namely, a load of item SHa is transferred to from shop 8 to shop 10. The representation as the permutation of by-shop/by-item latest load accumulation graphs is [shop 8/SHa], [shop 10/SHa] ("path 1").

The other path is indirect transfer of load. This will be explained referring to FIG. 50.

First or in step 1, a load of item SHc is transferred from shop 8 to shop 9. As a result, an overload is canceled at shop 8 but an overload is newly generated at shop 10.

The or in step 2, a load of item SHb is transferred from shop 9 to shop 10.

As a result, the overload at shop 9 is canceled and the acceptance of the load by shop 10 is completed with no problem, as shown in step 2.

Though a change in item is involved in the course of transfer, there results in the transfer of a load from shop 8 to shop 10. This is the indirect transfer of load.

The representation as the permutation of by-shop/by-item latest load accumulation graphs is [shop 8/SHc], [shop 9/SHc], [shop 9/SHb], [shop 10/SHb] ("path 2").

Considering a certain process completion date, the greatest load amount capable of being transferred through a "path" is the lowest value among accumulated load amounts of by-shop/by-item latest load accumulation graphs of the origins of transfer of load on that process completion date. This is termed the "thickness" of the "path" on the process completion date.

In this connection, there may be no or a plurality of "paths" to a certain shop.

The odd-numbered ones in the permutation of by-shop/by-item latest load accumulation graphs are the by-shop/by-item latest load accumulation graphs of the origins of transfer of load, and the lowest value among accumulated load amounts of the latter graphs on the process completion date is the "thickness" of this path.

In this connection, in the example shown in FIG. 35, the "path 2" is larger in "thickness" than the "path 1".

The shop change from a shop having [shop name] in the "list of overload amounts by judgement" to a shop in the "list of acceptable shops" is made as follows.

First, consider "paths" to a shop taken out from the "list of acceptable shops".

The "paths" on a process completion date" are arranged in order of thickness from a larger one to make up a "path list".

Next, one "path" is taken out sequentially in accordance with the "path list". A load to be transferred in the "path" is selected in order of leadtime from a larger one. A shop change for load is formulated within the range of "thickness" of the "path" and the contents of formulation are written into the adjustment formulation [A2].

Thereafter, the by-shop/by-item latest load accumulation graph is rewritten. This processing is performed until an overload is removed.

If [overload amount] in the "list of overload amounts by judgement" is not reduced, the next "path" is taken out.

If a path becomes absent, the next acceptable shop is taken out from the "list of acceptable shops".

If a shop becomes absent, the next [shop] having an overload generated is taken out from the "list of overload amounts by judgement".

This take-out is continued for all the contents of the "list of overload amounts by judgement", thereby completing the drawing-up of the "shop change type" adjustment formulation [A2].

And, the adjustment formulations [A1] and [A2] are outputted as in-constraint adjustment formulation data 155. At the point of time when the in-constraint adjustment formulation data 155 is outputted, the operation of the in-constraint adjustment formulation device is completed. There may be the case where the formulation of a shop change is impossible when there is no "path" from a shop in the "list of overload amounts by judgement" to the "list of acceptable shops" for that shop or when the thickness of a "path" is very small.

In that case, [[(generation of overload amount=) shop group], [(problematical shop group=) shop group subjected to judgement], [(list of overload amounts by problem analysis=) list of overload amounts by judgement]] may be outputted as additional analysis data 156. At the point of time when the additional analysis data 156 is outputted, the operation of the in-constraint adjustment formulation device is completed.

After the operation of the in-constraint adjustment formulation device 142 has been completed and if the output is the in-constraint adjustment formulation data 155, the data input/output device 12 is inputted with the in-constraint adjustment formulation data 155 and displays it on a display device such as CRT in accordance with a predetermined format (for example, a format in which the result is described in a table of a matrix form), thereby completing the processing.

If the content of the output is the additional analysis data 156, the adjustment formulation control device 143 sends an instruction to the constraint relaxation necessity judgement device 138 to repeat the processing again in accordance with the additional analysis data 156.

There may also be employed a construction in which the data input/output device 8 outputs adjustment formulation data 24 to an external production plan formulation system so that the adjustment for the contents of formulation is automatically carried out.

Various data outputted in the present system, for example, production plan data 146, constraint condition data 147, analysis data 148, efficient constraint relaxation data 150, undertaken constraint relaxation data 151, efficient in-constraint adjustment data 153, undertaken in-constraint adjustment data 154, and adjustment formulation results such as in-constraint adjustment formulation data 155 and constraint relaxation adjustment formulation data 152 (with no intention of the limitation to these data) can be displayed on a display screen. Thereby, a system can be structured which is easier to be handled by an operator.

According to the present invention as mentioned above, the following effects are provided.

First, since the presence/absence of the necessity of relaxation of constraint conditions can be judged in analyzing problems in an inexecutable production plan and adjusting the plan into an executable state, the person in charge of planning can avoid improper relaxation of constraint conditions in the course of replanning which may be carried out in the prior art. Further, the waste of the adjustment based on constraint condition relaxation by trial and error can be avoided even in the case where the relaxation of constraint conditions is necessary. As a result, a high-speed adjustment of a production plan becomes possible.

Second, since the problems in the inexecutable production plan are analyzed in broader aspects, a plan can be formulated taking the concrete contents of adjustment into consideration while avoiding the contents of adjustment which may result in a bad influence. Therefore, a load on the person in charge of planning can be reduced greatly. As a result, a high-speed adjustment of a production plan becomes possible.

[Embodiment 3]

First, explanation will be made of the function of a production planning device of the production planning system for formulating a macro production plan. Herein, consider, as an example of the macro production plan, the case where a production load in units of one month is determined taking the production capacity of all production processes such as assembly/work into consideration.

Figure 51:
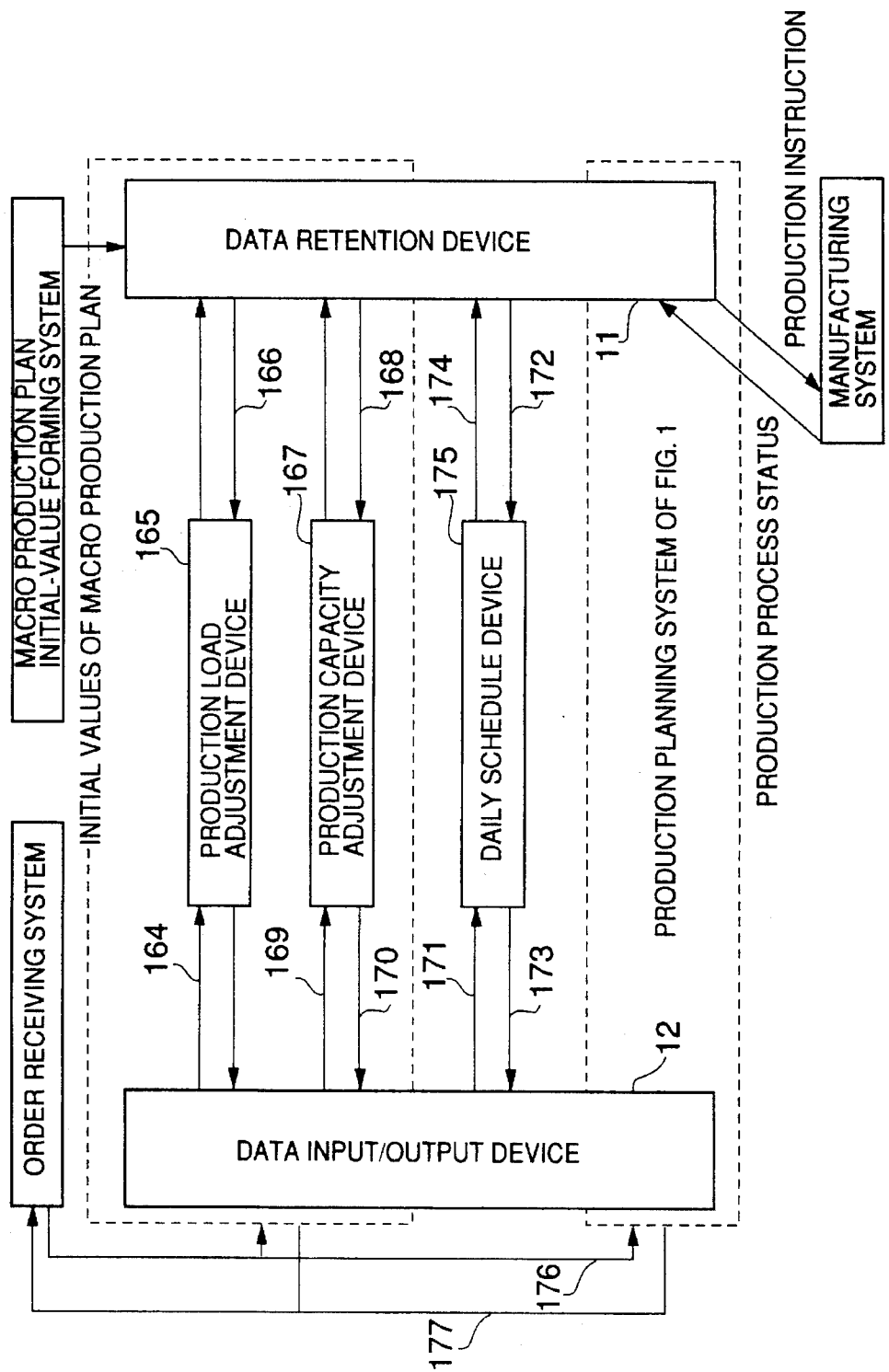
FIG. 51 is a block diagram showing the construction of an embodiment of a production planning system according to the present invention.

A block diagram of an embodiment of the production planning device is shown by FIG. 51.

A data input/output device 12 is a hitherto known data input/output device in a computer, for example, an interactive data input/output device provided with a Brawn tube display device, a keyboard and a mouse.

FIG. 52 shows an embodiment of the designation of a production plan on a display screen. In FIGS. 51 and 52, a product and a period made the objects of formulation of the production plan are set by picking the product as the object and the period as the object by a mouse. After the product as the object and the period as the object have been set, a "Production Load Read" command 163 among command menus is picked by the mouse to issue production load read/adjustment instruction 164 to a production load adjustment device 165. The production load adjustment device 165 inputs a production load 165 from a data detention device 11 and displays its value on the data input/output device 12.

An input/output display screen for the production load adjustment device 165 is shown by FIG. 53.

Figure 56:
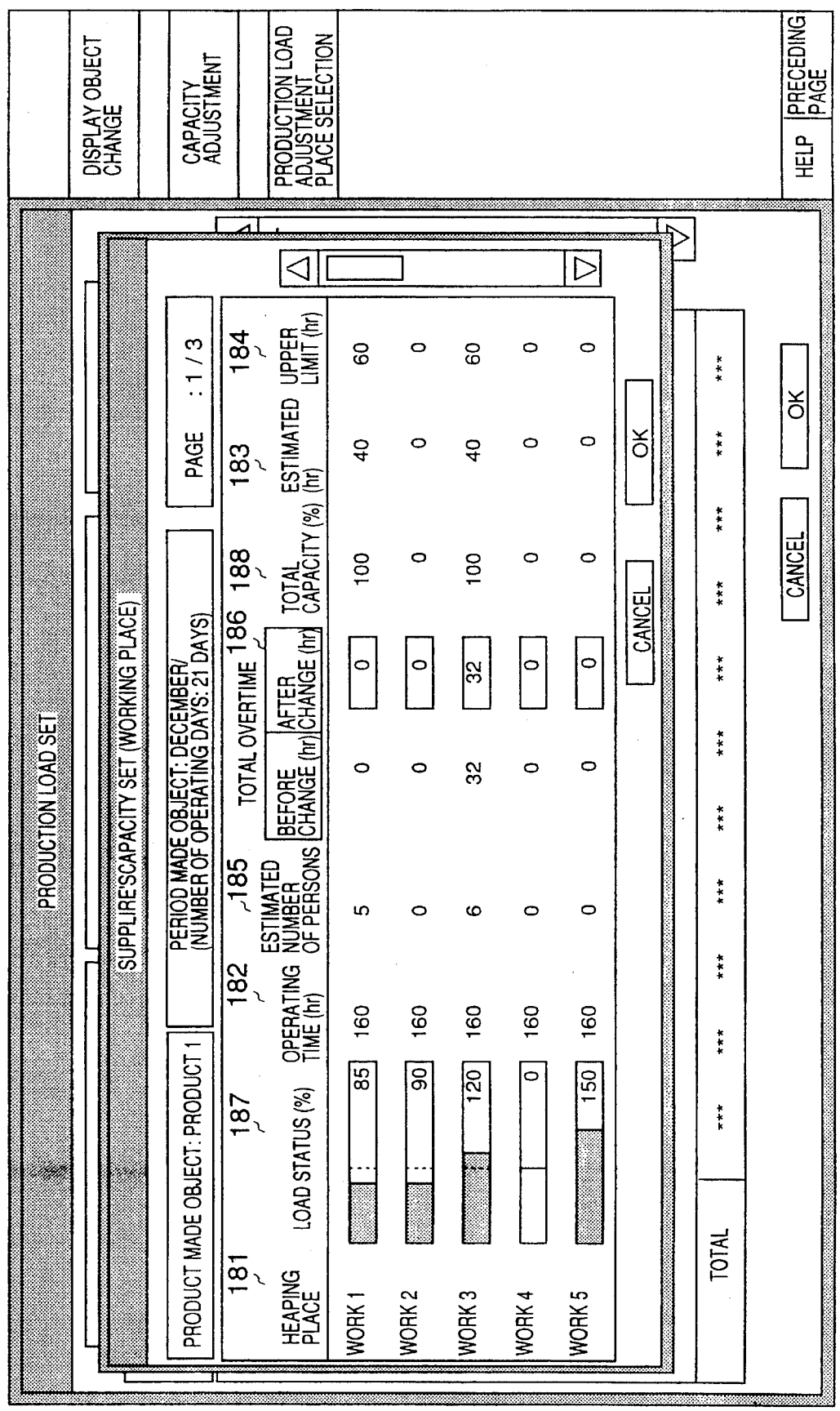
FIG. 56 shows the input/output display screen (3) of the production load adjustment device.

In FIGS. 51 and 53, a "Capacity Set (Assembly)" command menu 178, a "Capacity Set (Work)" command menu 179 or a "Supplier's Capacity Set" command menu 180 among the command menus is picked by the mouse to issue a production capacity adjust instruction 169 to a production capacity adjustment device 167. After receiving a production load, a production capacity of assembly/work/supplier, and so on from the data retention device 11, the production capacity adjustment device 167 calculates a load status or the proportion of the production load to the production capacity and displays the result on the data input/output device 12. An input/output display screen for the production capacity adjustment device 167 is shown by FIGS. 54, 55 and 56 (corresponding to assembly/work/supplier, respectively).

In FIGS. 51 and 54 to 56, heaping place 181, operating time 182, estimated number of persons, estimated (hr) 183 and upper limit (hr) 184 represent the name of a process, an operating time of each process in a plan period, the estimated number of persons for each process in the plan period, an estimated overtime of each process in the plan period and the upper limit of an overtime for each process in the plan period, respectively. Also, load status/total overtime of each process are calculated/displayed in accordance with the following procedure.

① Load status calculation data 168 such as by-type production load, by-type place order and work time in place is inputted from the data retention device 11.

② A necessary work time by places is calculated from the by-type production load, by-type place order and work time in place.

③ If the necessary work time is over the operating time, the time of (necessary overtime=necessary work time−operating time) is displayed as a total overtime/before change 185. If it is not so, 0 (zero) is displayed.

④ If the value of the total overtime/before change 185 is over an upper limit 184, the value of the upper limit 184 is displayed as a total overtime/after change 186. If it is not so, the value of the total overtime/before change 185 is displayed.

⑤ The percentage of the necessary work time to the operating time is calculated and the result is displayed as a load status 187 in the form of a bar graph and numeric value representation. In the bar graph representation, a color coding display is made in accordance with the cases of
1) necessary work time≦operating time,
2) operating time<necessary work time≦operating time+ upper limit, and
3) operating time+upper limit<necessary work time.
Alternatively, the bar graph may be represented with a different painting pattern. Also, the display may be flickered only in the case of 3) which becomes problematical.

⑥ The percentage of the necessary work time to (operating time+total overtime/after change) is calculated and is displayed as a total capacity 188.

By carrying out the above display, it becomes possible not only to grasp a load status and a necessary overtime of each process for a presently set production load at a look but also to clarify a problematical process in which the production load cannot be achieved even if an overtime work is done up to the upper limit of an overtime.

In the case where a production load is over a production capacity, it is necessary to adjust the production load or the production capacity so that a production plan is turned into an executable one.

The adjustment of a production capacity becomes possible by carrying out the following procedure in FIGS. 51 and 54.

① A total overtime/after change column of a heaping place to be subjected to a change in overtime is picked by the mouse to designate a location to be subjected to the change in overtime.

② A numeric value inputted from the keyboard to change the overtime.

③ The production capacity adjustment device 167 calculates the total capacity 188 again on the basis of the changed total overtime/after change in accordance with a production capacity adjust instruction 169 and sends the result 170 of production capacity adjustment and a daily schedule formulate instruction 171 to the data input/output device 12 and the data retention device 11.

In order to efficiently carry out the adjustment of a production load, it is effective to refer to the display of a load status. Namely, the necessity of adjusting the production load occurs in the case where a production capacity of a certain process is insufficient even if an overtime is taken into consideration. In other words, if only the production load of a product passed through a problematical process in the load status display is adjusted, it becomes possible to formulate a realizable production plan. Therefore, in the present embodiment, the production load is adjusted in accordance with the following procedure.

① In FIGS. 54 to 56, after a problematical heaping place 181 has been picked by the mouse, a "Production Load Adjustment Place Selection" command menu 189 among the command menus is picked by the mouse.

② A display screen for production load adjustment, in which only a product passed through the heaping place 181 selected at ①, is displayed as shown in FIGS. 57 to 59.

③ A production load/change amount column of a product name code to be subjected to a change in production load is picked by the mouse to designate a location to be subjected to the change in production load.

④ A numeric value is inputted from the keyboard to change the production load.

After the production load has been changed, the load status 187 is confirmed again. By repeating the above-mentioned production capacity adjustment and production load adjustment, it becomes possible to formulate a macro production plan which satisfies the constraint of a production capacity of all production processes such as assembly/work.

By formulating a production plan with a production load and a production capacity being taken into consideration in a macro production plan, the number of steps for correction in formulating a detailed production plan is reduced.

Next, explanation will be made of the function of a daily scheduler device which turns a macro production plan (or a plan in units of one month) into a detailed plan (or a plan in units of one day).

In FIG. 52, a "Production Frame Set" command menu 190 is picked by the mouse so that the data input/output device 12 outputs a daily schedule formulate instruction 171 to the daily scheduler device 175. The daily scheduler device 175 is inputted with data 172 for daily schedule formulation from the data retention device 11 to explode a macro production plan (or a plan in units of one month) into a detailed plan (or a plan in units of one day).

The data 172 for daily schedule formulation includes the following items:

① by-type production load: has already been determined by the production planning device;

② total overtime: beforehand prepared in the production planning device;

③ by-type assembling place: beforehand prepared in the data retention device 11;

④ factory calendar: beforehand prepared in the data retention device 11;

⑤ production frame setting standard: beforehand prepared in the data retention device 11; and ⑥ production pattern: beforehand prepared in the data retention device 11.

The production frame setting standard is such that an explosion method, in the case where a production plan of assembling processes in units of one month into a production plan in units of one day, is described for each assembling process. The following is considered as the production frame setting standard.

① Leveling

All types are produced every day and in a leveled manner within the limits of the possible.

② Production Pattern

The number of times of production (or a production pattern) in a month is registered for each type and the prevention of the chance of production of the same type from being one-sided is prevented within the limits of the possible while keeping the number of times of production.

③ Production Efficiency

After a by-day/by-type production load has been determined while the leveling of a preceding process which becomes problematical is taken into consideration, an inverse operation from the result is performed to determine a by-day/by-type production load of an assembling process.

By making it possible to designate a by-day explosion method which is the optimum for each assembling process, the number of correction of a production plan is reduced, thereby making it possible to formulate a production plan efficiently.

The procedure for an explosion for each day in the daily scheduler device will now be explained.

① Daily schedule formulating data of any assembling process is inputted.

② If the production frame setting standard of an assembling process made an object is "leveling" or "production pattern], an explosion for each day is made in accordance with the production frame setting standard.

③ If the production frame setting standard of the assembling process made an object is "production efficiency", a problematical process is exploded for each day so that a plan changing time becomes minimum and a production schedule for an assembling process of a product passed through the problematical process is determined from the result. A production schedule for an assembling process of a product, which is not passed through the problematical process, is exploded into the remaining part in accordance with "leveling" or "production pattern".

④ The above ① to ③ are repeated until an assembling process is out which has not been exploded for each day.

The production planning system shown in the embodiment 1 is used in order to make the detailed examination of the possibility of realization of a production plan exploded for each day by the procedure mentioned above. Namely, by using an output of the daily scheduler device as an initial value for the production planning system shown in the embodiment 1, it becomes possible to realize a system which formulates/adjusts a production plan consistently from a macro plan to a detailed plan.

Also, even in the case where an external request for plan change or estimation of a delivery date is made, a delivery date can be determined or estimated as the result of examination and adjustment of a production capacity either in the case of a macro production plan or in the case of a detailed production plan.

With the construction explained above, the present invention provides the following effects.

1) Since the necessity of a new design is automatically judged from a product specification and a production process for each product and a work load of the production process can be set accurately and rapidly and since a production plan can be formulated and adjusted while calculating a work load and a leadtime successively by use of the set data with a delivery date, a production process status, a production capacity and changes thereof being taken into consideration, a high-speed and high-precision answer to a request for the estimation of a delivery date becomes possible.

2) While the understanding of a problematical production chain becomes easy by displaying the problematical production chain, it becomes easy to have a decision making such as taking a countermeasure with an area having a larger degree of crowd.

3) By virtue of a production capacity adjusting function, it becomes possible for the person in charge of production planning not only to change a production capacity by a simple operation but also to on-line confirm which influence the change in production capacity gives on a production plan. As a result, it becomes possible to aid the person in charge of production planning to have a decision making when a production plan is to be executed.

4) By virtue of a product completion date adjusting function, it becomes possible for the person in charge of production planning not only to change a production completion date by a simple operation but also to on-line confirm which influence the change in production completion date gives on a production plan. As a result, it becomes possible to aid the person in charge of production planning to have a decision making when a production plan is to be executed.

5) By virtue of a production shop adjusting function, it becomes possible for the person in charge of production planning not only to change a production shop by a simple operation but also to on-line confirm which influence the change in production shop gives on a production plan. As a result, it becomes possible to aid the person in charge of production planning to have a decision making when a production plan is to be executed.

6) By virtue of a job starting order adjusting function, it becomes possible for the person in charge of production planning not only to change a job starting order by a simple operation but also to on-line confirm which influence the change in job starting order gives on a production plan. As a result, it becomes possible to aid the person in charge of production planning to have a decision making when a production plan is to be executed.

7) By virtue of a product production load adjusting function, it becomes possible for the person in charge of production planning not only to change a product production load by a simple operation but also to on-line confirm which influence the change in product production load gives on a production plan. As a result, it becomes possible to aid the person in charge of production planning to have a decision making when a production plan is to be executed.

8) In the case where an problem exists when an order receipt processing device sends a delivery date as the result of a production plan simulation to an order receiving system, it becomes possible to take a countermeasure by use of the present production planning system.

9) It is possible to avoid improper relaxation of constraint conditions in the course of replanning. Also, the waste of adjustment in constraint conditions by trial and error can be avoided even in the case where the relaxation of constraint conditions is necessary. Further, since a plan can be formulated taking the concrete contents of adjustment into consideration while avoiding the plan adjustment which may result in a bad influence, a high-speed adjustment of a production plan becomes possible.

10) It becomes possible to designate a by-day explosion which is optimum for each assembling process, and the number of correction of a production plan is reduced, thereby making it possible to formulate a production plan efficiently.

What is claimed is:

1. A production planning system comprising a data input/output device having a data input/output display and operation processing function, a leadtime forecasting device for forecasting a leadtime from a production capacity and a work load, a material requirement planning (MRP) explosion calculation device for performing an MRP calculation from the leadtime and from data for performing an MRP explosion calculation and outputting a result of the MRP calculation, a work load calculation device for calculating a work load from the result of the MRP calculation, an MRP calculation control device for controlling operation of said leadtime forecasting device, said MRP explosion calculation device and said work load calculation device, a problem area analysis device for analyzing and outputting a problematical area from an output of said MRP explosion calculation device in accordance with an instruction from said data input/output device, a production capacity adjustment device for changing a production capacity in accordance with an instruction from said data input/output device to make an output instruction to said MRP explosion calculation device, and a data retention device, whereby a possibility of execution of a production plan is judged by making a production schedule simulation through a calculation of a leadtime with a work load and a production capacity of each process being taken into consideration.

2. A production planning system according to claim 1, wherein said leadtime forecasting device includes means for determining a work load distribution from the work load and the production capacity and means for determining the leadtime from the work load distribution.

3. A production planning system according to claim 1, wherein said leadtime forecasting device includes means which is based on a pattern conversion method and is inputted with the work load and the production capacity to output the leadtime.

4. A production planning system according to claim 3, wherein said leadtime forecasting device includes means for automatically determining parameters for forecast on the basis of actual production data acquired from a manufacturing system.

5. A production planning system according to claim 1, further comprising at least one of a completion date adjustment device for adjusting a completion date of a product in accordance with an instruction from said data input/output device to make an output instruction to said MRP explosion calculation device, an alternative shop adjustment device for designating an alternative shop in accordance with an instruction from said data input/output device to make an output instruction to said MRP explosion calculation device, a job starting order adjustment device for adjusting a job starting order in accordance with an instruction from said data input/output device to make an output instruction to said MRP explosion calculation device, and a production load adjustment device for adjusting a production load in accordance with an instruction from said data input/output device to make an output instruction to said MRP explosion calculation device.

6. A production planning system according to claim 5, further comprising a specification check device for checking and correcting a client's requested specification and a design passage judgement device for judging the necessity of a new design from the result of an output of said specification check device to perform a parts explosion, whereby a delivery date is estimated by making the production schedule simulation through the parts explosion from said client's requested specification and the calculation of the leadtime with the work load and the production capacity of each process taken into consideration to judge whether or not the attainment of the delivery date is possible.

7. A production planning system according to claim 5, comprising a macro production load adjustment device for adjusting a macro production load, a macro production capacity adjustment device for adjusting a macro production capacity, and a daily scheduler device for formulating a daily production plan.

8. A production planning system according to claim 5, further comprising a production plan adjustment device having a countermeasure proposing function and an automatic countermeasure performing function.

9. A production planning system according to claim 8, comprising a macro production load adjustment device for adjusting a macro production load, a macro production capacity adjustment device for adjusting a macro production capacity, and a daily scheduler device for formulating a daily production plan.

10. A production planning system according to claim 5, further comprising at least one of displaying means for clarifying a problematical area from a by-period load/capacity status and a production chain for each manufacturing shop, displaying means for on-line displaying a capacity change status by the operation of said production capacity adjustment device and a production process status change associated with the capacity change, displaying means for on-line displaying a product completion date change status by the operation of said completion date adjustment device and a production process status change associated with the product completion date change, displaying means for on-line displaying an alternative shop change status by the operation of said alternative shop adjustment device and a production process status change associated with the alternative shop change, displaying means for on-line displaying a job starting order change status by the operation of said job starting order adjustment device and a production process status change associated with the job starting order change, and displaying means for on-line displaying a product production load change status by the operation of said production load adjustment device and a production process status change associated with the product production load change.

11. A production planning system according to claim 10, further comprising a production plan adjustment device having a countermeasure proposing function and an automatic countermeasure performing function.

12. A production planning system according to claim 10, further comprising a specification check device for checking and correcting a client's requested specification and a design passage judgement device for judging the necessity of a new design from the result of an output of said specification check device to perform a parts explosion, whereby a delivery date is estimated by making the production schedule simulation through the parts explosion from said client's requested specification and the calculation of the leadtime with the work load and the production capacity of each process taken into consideration to judge whether or not the attainment of the delivery date is possible.

13. A production planning system according to claim 10, comprising a macro production load adjustment device for adjusting a macro production load, a macro production capacity adjustment device for adjusting a macro production capacity, and a daily scheduler device for formulating a daily production plan.

14. A production plan adjusting system comprising:

a problem area analysis device for analyzing the distribution of each of a capacity and a load at each shop in a production plan on the basis of given production plan data and constraint condition data and detecting, in the case where an overload state in which a load exceeds a capacity is generated, a problematical area of generation of the overload state to produce analysis data;

a constraint relaxation judgement device for judging whether or not a plan in an inexecutable state is adjustable within a range of constraint conditions including the upper and lower limits of a total working time in a plan period and the upper and lower limits of a daily working time;

an efficient constraint relaxation selection device for selecting, when the adjustment within the range of constraint conditions is determined as being impossible, the kind of relaxation of the constraint conditions for effecting the cancellation of said overload state;

a constraint relaxation adjustment formulation device for formulating a first adjustment method based on the relaxation of the constraint conditions;

an efficient in-constraint adjustment selection device for selecting, when the adjustment within the range of constraint conditions is determined as being possible, a second adjustment method for effecting the cancellation of said overload state within the range of constraint conditions;

an in-constraint adjustment formulation device for formulating said second adjustment method within the range of constraint conditions; and an adjustment formulation control device for controlling the sequence of operations of said problematical area analysis device, said constraint relaxation judgement device, said efficient constraint relaxation selection device and said efficient in-constraint adjustment selection device;

whereby there is provided a function by which in order to turn an inexecutable production plan into an executable production plan, the allotted state of each of a capacity and a load at each shop is analyzed to make the analysis of a problematical area, thereby judging the necessity of the relaxation of the constraint conditions, and a production plan adjusting method with the relaxation of the constraint conditions taken into consideration and a production plan adjusting method within the range of constraint conditions are respectively formulated in the case where the relaxation of the constraint conditions is determined as being necessary and in the case where the relaxation of the constraint conditions is determined as being unnecessary.

15. A production plan adjusting system according to claim 14, wherein said data input/output device has a displaying function and displays either said production plan data, said constraint condition data or said analysis data.

16. A production plan adjusting system according to claim 14, wherein said data input/output device has a displaying function and displays either output data of said constraint relaxation adjustment formulation device, output data of said efficient constraint relaxation selection device, output data of said efficient in-constraint adjustment selection device or output data of said in-constraint adjustment formulation device.

17. A production plan adjusting system according to claim 14, wherein said problematical area analysis device includes means for forming a load accumulation graph as the accumulation of daily load amounts and a capacity accumulation graph as the accumulation of daily capacity amounts for each shop from the heaped state of a load and the heaped state of a capacity for each shop, means for forming the earliest capacity accumulation graph for each shop in the constraint conditions, said earliest capacity accumulation graph being a capacity accumulation graph formed so that the accumulation of all capacity amounts is completed earliest on a time axis, means for forming the latest load accumulation graph and the latest capacity accumulation graph for each shop in the constraint conditions, said latest load accumulation graph being a load accumulation graph formed so that the accumulation of all load amounts is completed latest on the time axis and said latest capacity accumulation graph being a capacity accumulation graph formed so that the accumulation of all capacity amounts is completed latest on a time axis, means for forming the earliest capacity accumulation graph for each shop group on the basis of the earliest capacity accumulation graph for each shop, means for forming the latest load accumulation graph for each shop group on the basis of the latest load accumulation graph for each shop, means for comparing the earliest capacity accumulation graph and the latest load accumulation graph for each shop group to determine a planned date of interest and an overload amount at that time, and means for comparing the earliest capacity accumulation graph and the latest load accumulation graph for each shop to determine a planned date of interest and an overload amount at that time.

18. A production plan adjusting system according to claim 17, wherein said means for forming the earliest capacity accumulation graph for each shop within the constraint conditions includes means for combining a by-day upper limit capacity addition accumulation graph formed by the addition of upper limit capacities by days toward the future from the first day of a production plan period at a shop of interest and a by-day lower limit capacity subtraction accumulation graph formed by the subtraction of lower limit capacities by days from an upper limit capacity in the production plan period heaped on the last day toward the past from the last day of the production plan period to form the earliest capacity accumulation graph in the shop of interest.

19. A production plan adjusting system according to claim 14, wherein said constraint relaxation judgement device includes means for judging whether or not there exists a shop group in which an overload state is generated, means for judging whether or not a shop group with a overload state generated is a shop group for the final assembling process, means for judging whether or not a planned date on which an overload state is generated at a certain shop group and an overload amount at that time can be removed by a shop change for a job in the certain shop group, and means for judging whether or not a planned date on which an overload state is generated at a certain shop group and an overload amount at that time can be removed by a shop change for a job in a shop group in a stream lower than the certain shop group.

20. A production plan adjusting system according to claim 19, wherein said means for judging whether or not a planned date on which an overload state is generated at a certain shop group and an overload amount at that time can be removed by a shop change for a job in the certain shop group, includes means for determining an acceptable load amount for each shop in the certain shop group from a by-day upper limit capacity addition accumulation graph formed by the accumulation of upper limit capacities by days for that shop in accordance with the lapse of time and a load accumulation graph formed by the accumulation of loads by days for that shop in accordance with the lapse of time, said acceptable load amount being a load amount capable of being accepted at that shop, and means for comparing an overload amount when an overload state is generated and the acceptable load amount at each shop to judge whether or not the removal of the overload amount is possible by a shop change for a job in the certain shop group.

21. A production plan adjusting system according to claim 14, further comprising an undertaken in-constraint adjustment determination device having a function of determining an adjustment method to be undertaken on the basis of data of efficient in-constraint adjustment which is output data of said efficient in-constraint adjustment selection device.

22. A production plan adjusting system according to claim 21, wherein said undertaken in-constraint adjustment determination device includes means for selecting at least one adjustment method to be formulated among at least one or more adjustment methods which are in a plurality of adjustment methods each provided with a predetermined priority and which exist within the range of constraint conditions.

23. A production plan adjusting system according to claim 21, wherein said data input/output device has a displaying function and displays output data of said undertaken in-constraint adjustment determination device.

24. A production plan adjusting system according to claim 14, further comprising an undertaken constraint relaxation determination device having a function of determining the contents of the constraint condition relaxation to be undertaken on the basis of data of efficient constraint relaxation which is output data of said efficient constraint relaxation selection device.

25. A production plan adjusting system according to claim 24, wherein said undertaken constraint relaxation determination device includes means for selecting at least one among a plurality of candidate sets each of which includes one set of a constraint condition in the production plan and the content of relaxation of that constraint condition and is provided with a predetermined priority.

26. A production plan adjusting system according to claim 24, wherein said data input/output device has a displaying function and displays output data of said undertaken constraint relaxation determination device.

27. A production plan adjusting system according to claim 24, further comprising an undertaken in-constraint adjustment determination device having a function of determining an adjustment method to be undertaken on the basis of data of efficient in-constraint adjustment which is output data of said efficient in-constraint adjustment selection device.

28. A production plan adjusting system according to claim 27, wherein said undertaken in-constraint adjustment determination device includes means for selecting at least one adjustment method to be formulated among at least one or more adjustment methods which are in a plurality of adjustment methods each provided with a predetermined priority and which exist within the range of constraint conditions.

29. A production plan adjusting system according to claim 27, wherein said data input/output device has a displaying function and displays output data of said undertaken in-constraint adjustment determination device.

* * * * *